US006090195A

United States Patent [19]
Andersen et al.

[11] Patent Number: 6,090,195
[45] Date of Patent: *Jul. 18, 2000

[54] COMPOSITIONS USED IN MANUFACTURING ARTICLES HAVING AN INORGANICALLY FILLED ORGANIC POLYMER MATRIX

[75] Inventors: Per Just Andersen; Simon K. Hodson, both of Santa Barbara, Calif.

[73] Assignee: E. Khashoggi Industries, LLC, Santa Barbara, Calif.

[*] Notice: This patent is subject to a terminal disclaimer.

[21] Appl. No.: 09/133,912

[22] Filed: Aug. 13, 1998

Related U.S. Application Data

[60] Division of application No. 08/218,971, Mar. 25, 1994, Pat. No. 5,830,305, which is a continuation-in-part of application No. 08/095,662, Jul. 21, 1993, Pat. No. 5,385,764, which is a continuation-in-part of application No. 07/982,383, Nov. 25, 1992, abandoned, which is a continuation-in-part of application No. 08/105,741, Aug. 10, 1993, Pat. No. 5,766,525, which is a continuation-in-part of application No. 08/105,352, Aug. 10, 1993, Pat. No. 5,676,905, which is a continuation-in-part of application No. 08/152,354, Nov. 19, 1993, Pat. No. 5,508,072, which is a continuation-in-part of application No. 07/929,898, Aug. 11, 1992, abandoned.

[51] Int. Cl.$^7$ .............................. C04B 14/38; C08L 3/02
[52] U.S. Cl. .............................. 106/162.51; 106/162.9; 106/164.01; 106/206.1; 106/217.01; 106/287.35; 106/400
[58] Field of Search ........................ 106/162.51, 162.9, 106/164.01, 206.1, 217.01, 287.35, 400; 536/102

[56] References Cited

U.S. PATENT DOCUMENTS

| | | | |
|---|---|---|---|
| 3,253,978 | 5/1966 | Bodendorf et al. | 162/152 |
| 3,697,366 | 10/1972 | Harlock et al. | 161/159 |
| 4,076,846 | 2/1978 | Nakatsuka et al. | 426/62 |
| 4,210,490 | 7/1980 | Taylor | 162/175 |
| 4,220,576 | 9/1980 | Tatard | 260/26.4 R |
| 4,225,383 | 9/1980 | McReynolds | 162/156 |
| 4,243,480 | 1/1981 | Hernandez et al. | 162/141 |
| 4,248,664 | 2/1981 | Atkinson et al. | 162/145 |
| 4,269,657 | 5/1981 | Gomez | 162/135 |
| 4,271,228 | 6/1981 | Foster et al. | 428/281 |
| 4,306,059 | 12/1981 | Yokobayashi et al. | 536/1 |
| 4,308,093 | 12/1981 | Bodendorf et al. | 162/152 |
| 4,373,992 | 2/1983 | Bondoc | 162/145 |
| 4,377,440 | 3/1983 | Gåsland | 162/101 |
| 4,378,271 | 3/1983 | Hargreaves et al. | 162/145 |
| 4,394,930 | 7/1983 | Korpman | 220/444 |
| 4,410,571 | 10/1983 | Korpman | 427/385.5 |
| 4,445,970 | 5/1984 | Post et al. | 162/135 |
| 4,487,657 | 12/1984 | Gomez | 162/158 |
| 4,497,662 | 2/1985 | Chisholm et al. | 106/92 |
| 4,508,595 | 4/1985 | Gåsland | 162/158 |
| 4,529,653 | 7/1985 | Hargreaves et al. | 428/450 |
| 4,529,662 | 7/1985 | Lancaster et al. | 428/450 |
| 4,533,581 | 8/1985 | Asaumi et al. | 428/64 |
| 4,545,854 | 10/1985 | Gomez et al. | 162/135 |
| 4,588,443 | 5/1986 | Bache | 106/97 |
| 4,613,627 | 9/1986 | Sherman et al. | 521/68 |
| 4,623,150 | 11/1986 | Moehlman et al. | 273/362 |
| 4,636,345 | 1/1987 | Jensen et al. | 264/122 |
| 4,673,438 | 6/1987 | Wittwer et al. | 106/126 |
| 4,707,221 | 11/1987 | Beer et al. | 162/158 |
| 4,735,660 | 4/1988 | Cane | 106/203 |
| 4,749,583 | 6/1988 | Branch | 426/549 |
| 4,799,961 | 1/1989 | Friberg | 106/93 |
| 4,846,932 | 7/1989 | Karita et al. | 162/127 |
| 4,863,655 | 9/1989 | Lacourse et al. | 264/53 |
| 4,889,594 | 12/1989 | Gavelin | 162/130 |
| 4,912,069 | 3/1990 | Ruben | 501/148 |
| 4,921,250 | 5/1990 | Ayers | 273/58 R |
| 4,923,665 | 5/1990 | Andersen et al. | 264/259 |
| 4,925,530 | 5/1990 | Sinclair et al. | 162/164.1 |
| 4,943,349 | 7/1990 | Gomez | 162/158 |
| 5,017,268 | 5/1991 | Clitherow et al. | 162/146 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |
| 5,106,880 | 4/1992 | Miller et al. | 521/54 |
| 5,108,677 | 4/1992 | Ayres | 264/112 |
| 5,110,525 | 5/1992 | Kolsky et al. | 264/122 |
| 5,126,013 | 6/1992 | Wiker et al. | 162/156 |
| 5,139,615 | 8/1992 | Conner et al. | 162/145 |
| 5,153,037 | 10/1992 | Altieri | 428/35.6 |

(List continued on next page.)

FOREIGN PATENT DOCUMENTS

| | | |
|---|---|---|
| 0030408 A1 | 6/1981 | European Pat. Off. . |
| 0265745 A2 | 5/1988 | European Pat. Off. . |
| 0556774 A2 | 8/1993 | European Pat. Off. . |
| 0609983 A2 | 8/1994 | European Pat. Off. . |
| 5-105815 | 4/1993 | Japan . |
| 5-171049 | 7/1993 | Japan . |
| 5-246417 | 9/1993 | Japan . |
| 5-230401 | 12/1993 | Japan . |
| 6-32386 | 2/1994 | Japan . |
| 6-135487 | 5/1994 | Japan . |
| 2050459 B | 1/1981 | United Kingdom . |
| WO 91/12186 | 8/1991 | WIPO . |
| WO 94/18384 | 8/1994 | WIPO . |
| WO 96/30186 | 10/1996 | WIPO . |

*Primary Examiner*—Blaine Copenheaver
*Attorney, Agent, or Firm*—Workman, Nydegger & Seeley

[57] ABSTRACT

Compositions, methods, and systems for manufacturing articles, particularly containers and packaging materials, having a highly inorganically filled matrix. Suitable inorganically filled mixtures are prepared by mixing together an organic polymer binder, water, one or more aggregate materials, fibers, and optional admixtures in the correct proportions in order to form an article which has the desired performance criteria. The inorganically filled mixtures are molded to fashion a portion of the mixture into a form stable shape for the desired article. Once the article has obtained form stability, such as by heating to remove water by evaporation, the article is removed from the mold and allowed to harden to gain strength. The articles may have properties substantially similar to articles presently made from traditional materials like paper, paperboard, polystyrene, plastic, or metal. They have especial utility in the mass production of containers, particularly food and beverage containers.

48 Claims, 26 Drawing Sheets

U.S. PATENT DOCUMENTS

| | | | |
|---|---|---|---|
| 5,160,368 | 11/1992 | Begovich | 106/154.1 |
| 5,162,126 | 11/1992 | Thörner et al. | 426/128 |
| 5,185,382 | 2/1993 | Neumann et al. | 521/84.1 |
| 5,194,206 | 3/1993 | Koch et al. | 264/115 |
| 5,206,087 | 4/1993 | Tokiwa et al. | 428/403 |
| 5,208,267 | 5/1993 | Neumann et al. | 521/79 |
| 5,242,078 | 9/1993 | Haas et al. | 220/574 |
| 5,248,702 | 9/1993 | Neumann et al. | 521/84.1 |
| 5,252,271 | 10/1993 | Jeffs | 264/54 |
| 5,256,711 | 10/1993 | Tokiwa et al. | 524/47 |
| 5,262,458 | 11/1993 | Bastioli et al. | 524/52 |
| 5,266,368 | 11/1993 | Miller | 428/35.6 |
| 5,277,762 | 1/1994 | Felegi, Jr. et al. | 162/145 |
| 5,280,055 | 1/1994 | Tomka | 524/47 |
| 5,288,318 | 2/1994 | Mayer et al. | 106/213 |
| 5,288,765 | 2/1994 | Bastioli et al. | 521/84.1 |
| 5,290,350 | 3/1994 | Besnard et al. | 106/214 |
| 5,294,299 | 3/1994 | Zeuner et al. | 162/145 |
| 5,308,879 | 5/1994 | Akamatu et al. | 521/84.1 |
| 5,310,070 | 5/1994 | Haas et al. | 220/4.24 |
| 5,317,037 | 5/1994 | Golden et al. | 523/128 |
| 5,317,119 | 5/1994 | Ayers | 219/734 |
| 5,320,669 | 6/1994 | Lim et al. | 106/157 |
| 5,340,558 | 8/1994 | Friedman et al. | 423/328.1 |
| 5,346,541 | 9/1994 | Goldman et al. | 106/163.1 |
| 5,360,586 | 11/1994 | Wyatt et al. | 264/54 |
| 5,360,828 | 11/1994 | Morrison | 521/64 |
| 5,362,776 | 11/1994 | Barenberg et al. | 524/35 |
| 5,362,777 | 11/1994 | Tomka | 524/47 |
| 5,367,067 | 11/1994 | Frische et al. | 536/45 |
| 5,372,877 | 12/1994 | Kannankeril | 428/283 |
| 5,376,320 | 12/1994 | Tiefenbacher et al. | 264/50 |
| 5,378,418 | 1/1995 | Berger et al. | 264/83 |
| 5,382,285 | 1/1995 | Morrison | 106/122 |
| 5,389,322 | 2/1995 | Kim et al. | 264/112 |
| 5,427,614 | 6/1995 | Wittwer et al. | 106/213 |
| 5,428,150 | 6/1995 | De Bock et al. | 536/102 |
| 5,462,980 | 10/1995 | Bastioli et al. | 524/47 |
| 5,500,089 | 3/1996 | Huang et al. | 162/226 |
| 5,501,774 | 3/1996 | Burke | 162/164.1 |
| 5,506,277 | 4/1996 | Griesbach, III | 521/84.1 |
| 5,512,090 | 4/1996 | Franke et al. | 106/154.1 |
| 5,512,378 | 4/1996 | Bastioli et al. | 428/484 |
| 5,569,514 | 10/1996 | Ayers | 428/35.7 |
| 5,576,049 | 11/1996 | Haas et al. | 427/389.9 |
| 5,618,341 | 4/1997 | Andersen et al. | 106/287.35 |
| 5,662,731 | 9/1997 | Andersen et al. | 106/206.1 |
| 5,679,145 | 10/1997 | Andersen et al. | 106/162.5 |
| 5,711,908 | 1/1998 | Tiefenbacher et al. | 264/232 |
| 5,749,954 | 5/1998 | Law et al. | 106/282 |
| 5,868,824 | 2/1999 | Andersen et al. | 106/162.51 |

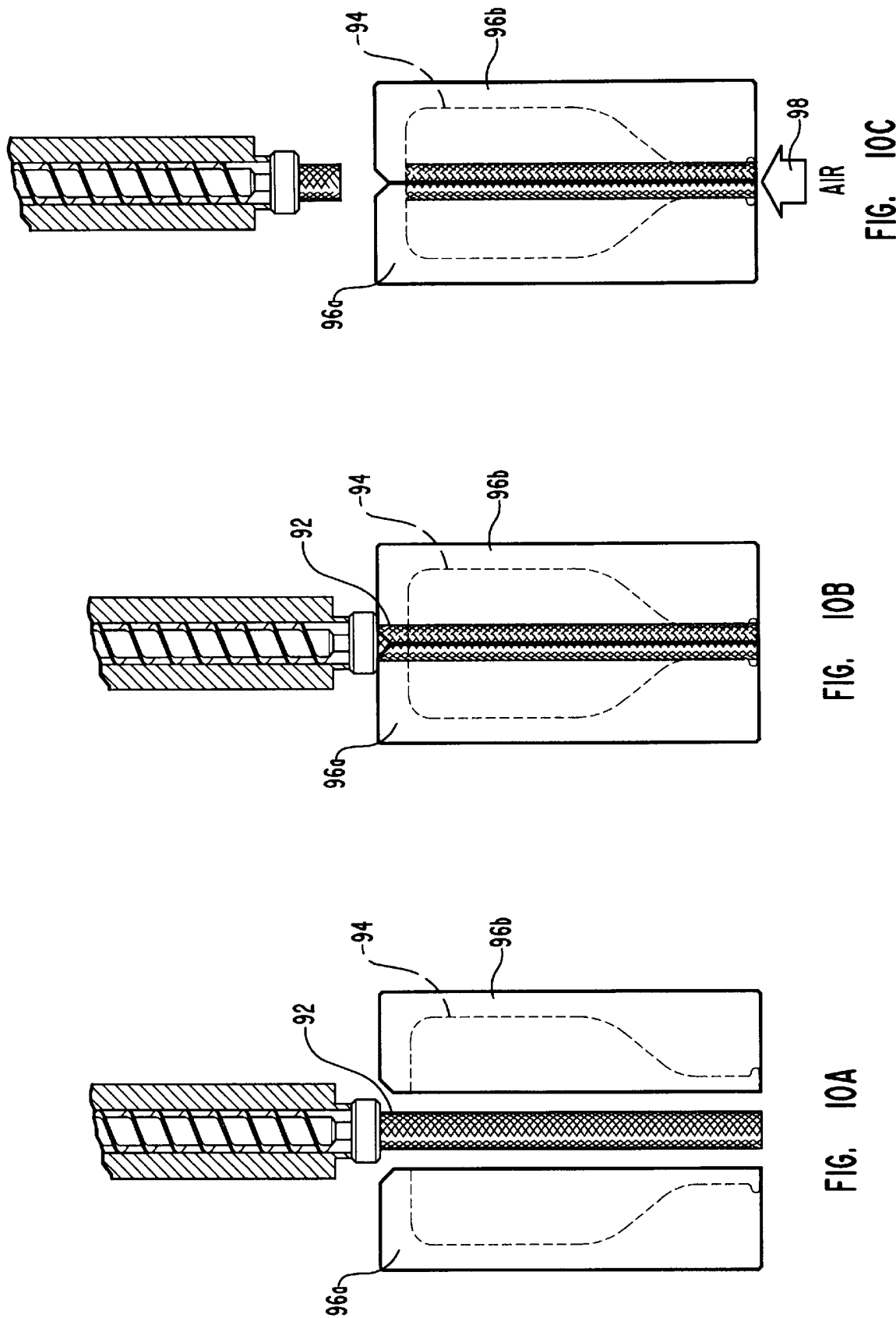

COMPOSITIONS USED IN MANUFACTURING ARTICLES HAVING AN INORGANICALLY FILLED ORGANIC POLYMER MATRIX

RELATED APPLICATIONS

This application is a division of copending U.S. application Ser. No. 08/218,971, filed Mar. 25, 1994, U.S. Pat. No. 5,830,305 which is a continuation-in-part of U.S. application Ser. No. 08/095,662, filed Jul. 21, 1993, U.S. Pat. No. 5,385,764, and also a continuation-in-part of U.S. application Ser. No. 07/982,383, filed Nov. 25, 1992, abandoned, and also a continuation-in-part of U.S. patent application Ser. No. 08/105,741, U.S. Pat. No. 5,766,525 filed Aug. 10, 1993, and also a continuation-in-part of U.S. application Ser. No. 08/105,352, filed Aug. 10, 1993, U.S. Pat. No. 5,676,905, and also a continuation-in-part of U.S. application Ser. No. 08/152,354, filed Nov. 19, 1993, U.S. Pat. No. 5,508,072, and also a continuation-in-part of U.S. application Ser. No. 07/929,898, filed Aug. 11, 1992, abandoned. For purposes of disclosure of the present invention, each of the applications identified in this section is incorporated herein by specific reference.

BACKGROUND OF THE INVENTION

1. The Field of the Invention

The present invention relates to compositions and methods for molding articles having a highly inorganically filled organic polymer matrix. Molded articles having such a matrix can vary greatly in thickness, stiffness, flexibility, toughness, and strength and include a variety of shapes and usages, such as containers and other packaging materials. Such articles are less expensive and are more environmentally friendly than articles made from conventional materials (such as paper, plastic, polystyrene, glass or metal) and are especially useful in the manufacture of disposable food and beverage containers used in the fast food industry, as well as packaging materials in general.

2. The Relevant Technology

A. Articles of Manufacture.

Materials such as paper, paperboard, plastic, polystyrene, and metals are presently used in enormous quantity in the manufacture of articles such as containers, separators, dividers, lids, tops, cans, and other packaging materials. Advanced processing and packaging techniques presently allow an enormous variety of liquid and solid goods to be stored, packaged, or shipped in such packaging materials while being protected from harmful elements.

Containers and other packaging materials protect goods from environmental influences and distribution damage, particularly from chemical and physical influences. Packaging helps protect an enormous variety of goods from gases, moisture, light, microorganisms, vermin, physical shock, crushing forces, vibration, leaking, or spilling. Some packaging materials also provide a medium for the dissemination of information to the consumer, such as the origin of manufacture, contents, advertising, instructions, brand identification, and pricing.

Typically, most containers and other packaging materials (including disposable containers) are made from paper, paperboard, plastic, polystyrene, glass, or metal materials. Each year over 100 billion aluminum cans, billions of glass bottles, and thousands of tons of paper and plastic are used in storing and dispensing soft drinks, juices, processed foods, grains, beer, etc. Outside of the food and beverage industry, packaging containers (and especially disposable containers) made from such materials are ubiquitous. Paper-based articles made primarily from tree derived paper pulp are also manufactured each year in enormous quantities. In the United States alone, approximately 5½ million tons of paper are consumed each year for packaging purposes, which represents only about 15% of the total annual domestic paper production.

B. The Impact of Paper, Plastic. Glass and Metal.

Recently there has been a debate as to which of the conventional materials (e.g., paper, paperboard, plastic, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material.

Polystyrene products, particularly containers and other packaging materials, have more recently attracted the ire of environmental groups. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and a probable carcinogen), residual quantities of benzene can be found in styrene. More potentially damaging has been the use of chloro-fluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, and pentanes) are still significantly harmful and their elimination would be beneficial.

As a result, there has been widespread pressure for companies to stop using polystyrene products in favor of more environmentally safe materials. Some environmental groups have favored a temporary return to the use of more "natural" products such as paper or other products made from wood pulp, which are believed to be biodegradable. Nevertheless, other environmental groups have taken the opposite view in order to minimize the cutting of trees and depletion of forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times as much electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7,8-tetrachlorodibenzo[b,e][1,4]-dioxin, is a highly toxic contaminant, and is extremely dangerous even in very low quantities. Toxic effects of dioxin in animals and humans include anorexia, severe weight loss, hepatoxicity, hematoporphyria, vascular lesions, chloracne, gastric ulcers, porphyrinuria, porphyria, cutanea tarda, and premature death. Most experts in the field believe that dioxin is a carcinogen.

Another drawback of the manufacture of paper and paper board is the relatively large amount of energy that is required to produce paper. This includes the energy required to process wood pulp to the point that the fibers are sufficiently delignified and frayed that they are essentially self-binding under the principles of web physics. In addition, a large amount of energy is required in order to remove the water within conventional paper slurries, which contain water in an amount of up to about 99.5% by volume. Because so much water must be removed from the slurry, it is necessary to literally suck water out of the slurry even before the drying process is begun. Moreover, much of the water that is sucked out during the dewatering processes is usually discarded into the environment.

The manufacturing processes of forming metal sheets into containers (particularly cans made of aluminum and tin), blowing glass bottles, and shaping ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment. While glass can be recycled, that portion that ends up in landfills is essentially non-degradable. Broken glass shards are very dangerous and can persist for years.

Some of these pollution problems are being addressed; however, the result is the use of more energy, as well as the significant addition to the capital requirements for the manufacturing facilities. Further, while significant efforts have been expended in recycling programs, only a portion of the raw material needs come from recycling—most of the raw materials still come from nonrenewable resources.

Even paper or paperboard, believed by many to be biodegradable, can persist for years, even decades, within landfills where they are shielded from air, light, and water—all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, paperboard, polystyrene, plastic, and metals is that each of these requires relatively expensive organic starting materials, some of which are nonrenewable, such as the use of petroleum in the manufacture of polystyrene and plastic. Although trees used in making paper and paperboard are renewable in the strict sense of the word, their large land requirements and rapid depletion in certain areas of the world undermines this notion. Hence, the use of huge amounts of essentially nonrenewable starting materials in making articles therefrom cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking: Can we discover or develop an alternative material which will solve most, if not all, of the various environmental problems associated with each of these presently used materials?

C. Inorganic Materials.

Man has made great use of essentially nondepletable inorganic materials such as clay, natural minerals, or stone for millennia. Clay has found extensive use because of its ready moldability into a variety of articles including containers, tiles, and other useful articles. However, some of the drawbacks of clay include the time it takes for clay to harden, the need to fire or sinter clay in order for it to achieve its optimum strength properties, and its generally large, heavy, and bulky nature. Unfired clay, in particular, has low tensile strength and is very brittle. Nevertheless, clay has found some use in the manufacture of other materials as a plentiful, inexhaustible, and low-cost filler, such as in paper or paperboard. However, because of the brittle and non-cohesive nature of clay when used as a filler, clay has generally not been included in amounts greater than about 20% by weight of the overall paper material.

Man has also made extensive use of stone in the manufacture of buildings, tools, containers, and other large, bulky objects. An obvious drawback of stone, however, is that it is very hard, brittle, and heavy, which limits its use to large, bulky objects of relatively high mass. Nevertheless, smaller or crushed stone can be used as an aggregate material in the manufacture of other products, such as hydraulically settable, or cementitious materials.

Hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive.

For example, cement is a hydraulically settable binder derived from clay and limestone, and it is essentially non-depletable and very inexpensive compared to the other materials discussed above. Hydraulic cement can be mixed with water and an aggregate material such as crushed stone or pebbles in order to create concrete. However, concrete has found commercial application only in the manufacture of large, bulky structural objects.

Although hydraulically settable materials have heretofore found commercial application only in the manufacture of large, bulky structural type objects, hydraulically settable mixtures have been created using a microstructural engineering approach which can be molded or shaped into relatively small, thin-walled articles. Indeed, such mixtures, which were developed by the inventors hereof, have been found to be highly moldable, which allows them to be directly molded into a wide variety of articles, including containers, more particularly food or beverage containers. Hydraulically settable mixtures and methods used to directly mold articles therefrom are set forth more fully in copending U.S. patent application Ser. No. 08/105,352, entitled "Methods and Systems for Manufacturing Containers and Other Articles of Manufacture From Hydraulically Settable Mixtures," and filed Aug. 10, 1993, in the names of Per Just Andersen, Ph.D., and Simon K. Hodson, now issued as U.S. Pat. No. 5,676,905. Such mixtures can also be preliminarily molded into wet, unhardened sheets which are then remolded into the desired article. This technology is set forth in copending U.S. patent application Ser. No. 08/105,741, entitled "Methods and Systems for Manufacturing Articles From Sheets of Unhardened Hydraulically Settable Compositions," and filed Aug. 10, 1993, in the names of Per Just Andersen, Ph.D. and Simon K. Hodson, now issued as U.S. Pat. No. 5,766,525. Together these two applications comprise the "Andersen-Hodson Technology."

Although the hydraulically settable binder is believed to impart a significant amount of strength, including tensile and (especially) compressive strengths, the hydraulically settable binders have been found in lower quantities to act less as a binding agent and more like an aggregate filler. As a result, studies have been conducted to determine whether compositions which do not necessarily use a hydraulically settable binder (or which only use such a binder in low enough quantities so that it will act mainly as an aggregate material) but which incorporate high concentrations of inorganic material can be manufactured. Such highly inorganically filled compositions or materials would likewise have the advantages of hydraulically settable materials over prior art paper, plastic, polystyrene, or metal materials in terms of their low cost, low environmental impact, and the ready availability of abundant starting materials. Highly inorganically filled compositions having properties similar to their hydraulically settable counterparts and methods for manufacturing sheets therefrom are set forth in copending U.S. patent application Ser. No. 08/152,354, entitled "Sheets Having A Highly Inorganically Filled Organic Polymer Matrix," and filed Nov. 19, 1993, in the names of Per Just Andersen, Ph.D., and Simon K. Hodson, now issued as U.S. Pat. No. 5,508,072. Such compositions and methods for manufacturing sheets therefrom also comprise the "Andersen-Hodson Technology."

Due to the more recent awareness of the tremendous environmental impacts of using paper, paperboard, plastic, polystyrene, and metals for a variety of single-use, mainly disposable, articles such as containers and other packaging materials made therefrom (not to mention the ever mounting political pressures), there has been an acute need (long since recognized by those skilled in the art) to find environmentally sound substitute materials. In particular, industry has sought to develop highly inorganically filled materials for these high waste volume articles.

In spite of such economic and environmental pressures, extensive research, and the associated long-felt need, the technology simply has not existed for the economic and feasible production of highly inorganically filled, organic polymer bound materials which could be substituted for paper, paperboard, plastic, polystyrene, or metal containers or other articles. Some attempts have been made to fill conventional paper with inorganic materials, such as kaolin and/or calcium carbonate, although there is a limit (about 20–35% by volume) to the amount of inorganics that can be incorporated into these products. However, in order to create highly filled sheets using conventional dewatering methods it is necessary to use expensive flocculating agents and complicated flocculation techniques in order to prevent the higher concentrations of fillers from simply passing through the sheet-forming wire. In addition, there have been attempts to fill certain plastic packaging materials with clay in order to increase the breathability of the product and improve the ability of the packaging material to keep fruits or vegetables stored therein fresh. In addition, inorganic materials are routinely added to adhesives and coatings in order to impart certain properties of color or texture to the final product.

Nevertheless, inorganic materials only comprise a fraction of the overall material used to make such products, rather than making up the majority of the packaging mass. Because highly inorganically filled materials essentially comprise such environmentally neutral components as rock, sand, clay, and water, they would be ideally suited from an ecological standpoint to replace paper, paperboard, plastic, polystyrene, or metal materials as the material of choice for such applications. Inorganic materials also enjoy a large advantage over synthetic or highly processed materials from the standpoint of cost.

Such materials not only use significant amounts of non-depletable components, they do not impact the environment nearly as much as do paper, paperboard, plastic, polystyrene, or metal. Another advantage of highly inorganically filled materials is that they are far less expensive than paper, paperboard, plastic, polystyrene, or metals. As set forth above, highly inorganically filled material require far less energy to manufacture.

Based on the foregoing, what is needed are improved compositions and methods for manufacturing highly inorganically filled organic polymer mixtures that can be molded into containers and other articles presently formed from paper, paperboard, polystyrene, plastic, glass, or metal. It would be a significant improvement in the art if such compositions and methods yielded highly inorganically filled articles which had properties similar to paper, paperboard, polystyrene, plastic, or metal materials. It would also be a tremendous improvement in the art if such articles could be formed using existing manufacturing equipment and techniques presently used to form such articles from paper, paperboard, polystyrene, plastic, or metal materials.

It would be another improvement in the art if such compositions and methods for manufacturing articles did not result in the generation of wastes involved in the manufacture of paper, paperboard, plastic, polystyrene, or metal materials.

It would yet be a further advancement in the art if the compositions contain less water which has to be removed during the manufacturing process (as compared to paper manufacturing) in order to shorten the processing time and reduce the initial equipment capital investment.

In addition, it would be a significant improvement in the art if such articles were readily degradable into substances which are commonly found in the earth.

From a practical point of view, it would be a significant improvement if such materials and methods made possible the manufacture of containers and other articles at a cost that is comparable or even superior to existing methods of manufacturing paper, paperboard, plastic, polystyrene, or metal products. Specifically, it would be desirable to reduce the energy requirements, conserve valuable natural resources, and reduce initial capital investment costs for making products having the desirable characteristics of paper, plastic, polystyrene or metals.

From a manufacturing perspective, it would be a significant advancement in the art of shaping highly inorganically filled materials to provide compositions and methods for mass producing highly inorganically filled articles which can rapidly be formed and substantially dried within a matter of minutes from the beginning of the manufacturing process.

It would also be a tremendous advancement in the art to provide compositions and methods which allow for the production of highly inorganically filled materials having greater flexibility, tensile strength, toughness, moldability, and mass-producibility compared to conventional materials having a high content of inorganic filler.

Such compositions and methods are disclosed and claimed herein.

SUMMARY AND OBJECTS OF THE INVENTION

The present invention relates to novel methods and systems for manufacturing articles of manufacture from inorganically filled moldable materials, which can generally be described as multi-component, multi-scale, fiber-reinforced, micro-composites. It has been found that lightweight, strong, and environmentally compatible (and if desired, flexible or insulating) articles such as containers and packaging materials can be readily and inexpensively mass produced from inorganically filled moldable materials, including inorganic binders, through innovative processes developed through materials science and microstructural engineering approaches.

The materials science and microstructural engineering approaches of the present invention allow one to build into the microstructure of the moldable compositions of the present invention the desired physical characteristics and properties, while at the same time remaining cognizant of costs and other complications involved in the large scale manufacturing systems. In doing so, many of the problems have been overcome which have historically limited the use of most moldable materials.

As discussed in greater detail hereinafter, the materials science and microstructural engineering approaches, instead of the traditional trial-and-error, mix-and-test approach, specifically allow for the design of moldable materials with the properties of high tensile and flexural strength, high insulation, low weight, low cost, and low environmental impact desired for articles, including containers and packing materials. Control of the design of the moldable compositions on the microstructural level has come, in part, from the discovery that during formation of an article, either (a) the rheology of the composition should be chemically modified to give moldability and rapid form stability, or (b) the concentration of water in the composition should be reduced by processing or by adding energy.

The result is the ability to mass produce, on a commercially viable scale, a wide variety of containers and other articles (including many which are disposable) from moldable materials at a cost that is usually competitive with, and in most cases even superior to, the cost involved in using other materials. The major components within the moldable materials of the present invention include a water-dispensable organic polymer binder (polysaccharide, protein or synthetic organic materials), inorganic aggregates (like perlite, sand, hollow glass spheres, silica, vermiculite, clay, mica, and even waste concrete products), fibers (typically wood or plant), water, and admixtures such as dispersants and set accelerators (in the case where a hydraulically settable binder is used).

The inorganic aggregates will typically have a concentration in a range from about 30% to about 98% by volume of total solids in the mixture, more preferably from about 50% to about 90%, and most preferably from about 60% to about 80%. Depending on the density of the inorganic aggregates, it may be useful to express the preferred concentration ranges in terms of weight percent rather than volume percent. Expressed in terms of weight percent., the inorganic aggregates will preferably have a concentration in a range from about 20% to about 95% by weight of total solids in the mixture, more preferably in a range from about 30% to about 80% by weight, and most preferably in a range from about 40% to about 70% by weight. To this mixture, other components, such as organic aggregates and dispersants, can be selectively added.

The preferred structural matrix of the containers and other articles manufactured according to the present invention is formed from the interaction between inorganic aggregate particles, a water-dispersible organic binder, and fibers. These are made into a highly moldable, workable, and uniform mixture by adding an appropriate amount of water and thoroughly mixing the components together. Preferably, the amount of added water is just enough to provide adequate workability and moldability, while maintaining a mixture that is form stable; that is, a mixture which will maintain its shape after being molded into the desired shape, including post-molding handling of the article. Solidification occurs by removing at least some of the water by evaporation, usually by applying heat.

It will be understood that it is the combination of the organic polymer binder into which the inorganic aggregates are dispersed which gives the articles made therefrom their basic structural component, or the "inorganically filled, organic polymer matrix." The organic polymer binder is the main component which holds the other solids within the matrix together, although the other components, such as the fibrous component or the inorganic aggregate, may also interact with themselves and/or the organic polymer binder to add compressive and tensile strength, flexibility, toughness, insulating ability, and other desired properties to the material.

In order to design the desired specific functional properties into the moldable mixture and/or the hardened structural matrix for a specific article, a variety of additives can be included within the moldable mixture such as dispersants, one or more aggregate materials, fibers, air entraining agents, blowing agents, or reactive metals. The identity and quantity of any additive will depend on the desired properties or performance criteria of both the moldable mixture and the final hardened article made therefrom.

Organic binders are simply polymers that when added to water under certain conditions form long chains that intertwine and encapsulate the components of the mixture. As water is removed from the mixture, these long chains solidify and bind the structural matrix. Because of the nature of these organic binders, however, they also function to modify the rheology of an unhardened, moldable mixture.

Organic binders can be added to increase the cohesive strength, "plastic-like" behavior, and the ability of the moldable mixture to retain its shape when molded or extruded. They act as thickeners and increase the yield stress of the moldable mixture, which is the amount of force necessary to deform the mixture. This creates high form stability in the molded or extruded product. Suitable organic binders include a variety of cellulose-, starch-, and protein-based materials (which are generally highly polar), as well as synthetic organic polymers, which assist in bridging the individual particles together.

Dispersants, on the other hand, act to decrease the viscosity and the yield stress of the mixture by dispersing the individual aggregates and binding particles. This allows for the use of less water while maintaining adequate levels of workability. Suitable dispersants include any material which can be adsorbed onto the surface of the inorganic aggregate particles and which act to disperse the particles, usually by creating a charged area on the particle surface or in the near colloid double layer.

It may be preferable to include one or more aggregate materials within the moldable mixture in order to add bulk and decrease the cost of the mixture. Aggregates often impart significant strength properties and improve workability. An example of one such aggregate is ordinary sand or clay, which is completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight, rocklike materials. These aggregates are likewise environmentally neutral and relatively inexpensive.

Fibers may be added to the moldable mixture in order to increase the compressive, tensile, flexural, and cohesive strengths of the wet material as well as the hardened articles made therefrom. The fibers should preferably have high tear and burst strengths (i.e., high tensile strength), examples of which include abaca, southern pine, southern hardwood, flax, bagasse (sugar cane fiber), cotton, and hemp. Fibers with a high aspect ratio work best in imparting strength and toughness to the moldable material.

Although the highly inorganically filled articles may also include organic components, such as cellulose-based fibers and an organic binder, such components represent a much smaller fraction of the overall mass of the articles compared to paper-based articles, and together will make up usually less than about 70% by volume of the total solids of the hardened inorganically filled article; preferably, this fraction will be less than about 50% by volume of the solids, and more preferably less than about 30%. In most cases, it will be preferable for the fibrous component to be included in an amount of from about 0.5% to about 60% by volume of the total solids of the hardened article, more preferable from about 2% to about 40%, and most preferably from about 5% to about 20%. The organic polymer binder will preferably be included in an amount in the range from about 1% to about 60% by volume of the total solids of the hardened article, more preferably from about 2% to about 30%, and most preferably from about 5% to about 20%. The combined total of fibers and organic binder will be less than about 70%, and generally much lower.

Finally, hydraulically settable materials such as hydraulic cement, gypsum hemihydrate, and calcium oxide can be added to the moldable mixture in order to affect the rheology, workability, and to create a mixture with earlier form stability in the wet state. Such materials have an internal drying effect because they can chemically react with and bind significant amounts of water within the mixture depending on their concentration. In addition, hydraulic cements such as portland gray cement, increase the cohesiveness of the moldable mixture. If included in large enough amounts, the hydraulically settable materials can aid in binding the other components within the organic polymer matrix. In lower amounts, they act mainly as a filler or an aggregate material.

One significant aspect of the present invention is that the articles of the present invention can be economically and mass-producibly manufactured. The articles disclosed herein are not intended to be handmade at the rate of a few at a time, but are intended to be made at the rate of hundreds, thousands, or tens of thousands per hour. The creation of new materials that can be rapidly processed in such a manner (that is, similar to paper, plastic, or metals) comes from utilization of one of the following approaches during the manufacturing process: (a) chemically modifying the moldable mixture in order to give the mixture workability and then rapid form stability, or (b) reducing the water content ratio during the formation process (such as by the addition of energy in the form of heat or pressure). The application of these principles will become readily apparent from the following methods of manufacture.

There are several steps and methods for manufacturing the articles of the present invention. The first step, which is universal to all methods, is the preparation of the moldable mixture. The mixture is prepared by combining the water-disposable organic polymer binder and water with selected materials such as aggregate dispersants and fibers to create a mixture having the desired rheological properties, which will later have the desired ultimate strength, weight, insulation, and low cost. Some of the components may be combined under high shear mixing; however, fragile or lightweight aggregates are often added under low shear mixing to prevent their being crushed.

The second step is the molding or forming of the mixture into the desired shape of the article. Preferred processes include die press molding, injection molding, blow molding, jiggering, wet sheet molding, and the like. The die press molding process comprises positioning the mixture between a male die and a female die having complementary shapes. The dies are then mated so as to mold the mixture into the shape of the dies. In injection molding, the mixture is injected under high pressure into a closed mold, thereby forming the mixture into the shape of the mold. Once the mixture has obtained form stability, the mold is opened and the article removed for drying.

There are two types of blow molding processes: injection blow molding and extrusion blow molding. In injection blow molding the mixture is positioned onto a core rod which is then positioned into a closed mold. Air is then blown through the core rod so as to expand the mixture against the wall of the mold, forming the desired article. Extrusion blow molding is accomplished by extruding the mixture into a tube that is captured between two halves of a mold. A blow pin is then injected into the tube through which air passes, thereby expanding the mixture against the walls of the mold and into the desired shape of the article.

Jiggering is similar to clay molding in which a potter wheel is used. The process requires a rotating spindle on which is placed an open mouthed mold. A quantity of the mixture is placed at the bottom of the spinning mold. A spinning roller head is then used to press the mixture against the side walls of the mold, forming the mixture into the desired article. Once the mixture is formed, the excess material is removed from the edge of the mold and the article is allowed to obtain form stability.

The wet sheet molding process involves first molding the mixture into a sheet and then remolding the sheet into a desired article. The moldable mixture having the desired characteristics (prepared according to the procedure described above) is extruded through a die, for example, an auger- or piston-type extruder, into relatively thin sheets of a predetermined thickness. In some embodiments, a vacuum may be attached to the auger to remove excess air from the mixture.

The extruded sheets are then "rolled" by passing them between a set of reduction rollers to form sheets with a more uniform thickness and a smoother surface. In some cases, it may be preferable to pass the sheets through a series of sets of rollers having progressively smaller distances (or nips) therebetween to obtain a rolled sheet having a progressively thinner thickness.

In addition, by using a pair of rollers having different orientations in the "Z" direction (or normal to the surface of the sheet), such as by using a flat roller paired with a conical roller, a percentage of the fibers can be oriented in the "X" (or width-wise) direction. In this way, a sheet having bidirectionally oriented fibers can be manufactured. This is thought to occur because the conical roller can widen the sheet in the "X" direction. Sheets having bidirectionally aligned fibers produce articles having a more uniform strength.

The sheet, or a portion thereof, is then fashioned into a desired shape of a container or article. This is preferably accomplished by pressing the sheet between a male die of a desired shape and a female die having a substantially complementary configuration of the male die shape. Alternative types of dies that can be used include split dies and progressive dies. The articles can also be formed by applying one of many vacuum forming techniques to the sheets.

To economically produce the articles, the fashioned article must quickly obtain form stability. In one embodiment, the forming apparatus, including dies, molds, and rollers, is heated to a predetermined temperature so as to rapidly dry the surface of the article, thereby imparting form stability to the article. Heating the forming apparatus also functions to form a steam barrier that minimizes the adhering of the article to the forming apparatus. Additional methods, such as cooling the forming apparatus or adding a nonhydrating liquid to the mixture that rapidly evaporates, can also be used to quickly impart form stability to the articles. Still other methods used to impart form stability include the addition of gypsum hemihydrate, calcium oxide, hydraulic cement, accelerators, or increased organic binder to the mixture or limiting the amount of water in the mixture.

Once the articles have obtained sufficient form stability, they can be removed from the dies. Removal from the dies is typically accomplished by airveying, or sucking the articles off the mold. Air can be blow between the molded articles and the dies to assist in removal. Alternatively, various templates or stripper rings can be used to lift the articles off the mold.

Finally, the articles are passed through a drying apparatus to drive off additional amounts of water within the article, thereby increasing the strength and improving the form stability of the article. The heat imparted by the drying apparatus also increases the rate of drying of the organic binder. Once the article has obtained sufficient strength, the article can be packaged and shipped.

Before, during, or after any of the above molding processes, coatings may be applied to the surface of a substantially dried sheet or article for a number of reasons, such as to make the article more waterproof, more flexible, or to give it a glossier surface. Coatings based upon materials such as soybean and Methocel®, alone or in combination with polyethylene glycol, can be applied to the surface in order to permanently soften the sheet or article, or hinge within the article.

Elastomers, plastic, or paper coatings can aid in preserving the integrity of a fold or hinge (if used), whether or not the underlying hardened structural matrix fractures upon bending at the hinge. It may be also desirable to print or emboss the sheets or articles with indicia, logos, or other printed material.

Additional embodiments of the present invention include the addition of air voids in order to add insulating properties to the articles. These air voids are created by the incorporation of gas through various techniques into the mixture—one method being the mechanical incorporation of air voids during the mixing process, and another being the incorporation of a gas which is chemically generated in situ within the mixture.

The compositions of the present invention can be varied to yield products of substantially different character. For example, very lightweight products (similar to that of polystyrene foam) with rigid walls can be manufactured. For convenience, this first type of product is sometimes herein referred to as a "foam-like" product.

Alternatively, products that have an appearance more like that of a pottery or ceramic product can be made according to the present invention. However, the products of the present invention are much lighter, typically having a bulk specific gravity less than about 1.5, whereas pottery or ceramic products typically have a bulk specific gravity of 2 or greater. This second type of product of the present invention is sometimes herein referred to as a "clay-like" product, because it is a zero-slump, form stable moldable material that still has excellent workability properties.

A key feature of the microstructural engineering design of the present invention is the materials science optimization of each desired property (including minimization of cost). It is only because of the unique microstructural engineering of the present invention that the moldable mixtures can be molded into a thin-walled, complex, lightweight product such as a food and beverage container and still maintain its shape without external support while still wet until hardening can be accomplished.

Indeed, the economic viability of mass producing articles such as food and beverage containers from moldable materials is only possible because the mixture is self-supporting while still wet and will maintain its molded state throughout the drying or hardening process. In addition, the compositions of the present invention importantly provide mixtures that rapidly reach a sufficiently high tensile and compressive strength so that the molded containers and other articles can be handled and manipulated using conventional means.

Unlike the manufacture of plastic or polystyrene, highly inorganically filled materials utilize little or no petroleum-based products or derivatives as starting materials. Thus, although some amount of fossil fuel is necessary to generate the energy used in manufacturing the highly inorganically filled materials, only a fraction of the petroleum used in the manufacture of polystyrene or plastic products will be consumed overall. In addition, the energy requirements of the present invention are much less than the energy requirements of paper product manufacturing where extensive dewatering is necessary.

As compared to the manufacture of thin-walled metal products (such as aluminum and tin cans), the highly inorganically filled materials of the present invention do not result in the continued use of rapidly depleting natural resources. Furthermore, the lower temperature and simplicity of processing conditions of the present invention reduce the costs of energy and the initial capital investment.

Finally, another advantage of the highly inorganically filled materials of the present invention (as well as containers or other articles made therefrom) is that their disposal impacts the environment far less than paper, paperboard, plastic, polystyrene, glass, or metal products. The highly inorganically filled materials of the present invention are both readily recyclable and, even if not recycled, will readily degrade when exposed to moisture, pressure, and other environmental forces into a fine granular powder which has a composition that is complementary to the components of the earth. In contrast, a polystyrene, plastic, or metal cup or can thrown into a lake or stream will last for decades, perhaps even centuries, while a container or other article made from an inorganically filled material will quickly break down into an essentially dirt-like powder—the time of dissolution being largely dependent on the mix design of the starting mixture.

If the highly inorganically filled articles are discarded into a landfill, they will break down into a fine, mainly inorganic, powder under the weight of the other garbage present. If discarded onto the ground, the forces of water and wind, and even fortuitous compressive forces such as from cars running over them or people stepping on them, will cause the inorganically filled waste materials to be reduced to a largely inorganic, harmless granular powder in a short period of time relative to the time it usually takes for the typical disposable paper or polystyrene container or other article to decompose under the same circumstances. Whatever organic substances remain after the degradation of the article are minimal and will is preferably be biodegradable.

From the foregoing, an object of the present invention is to provide improved compositions, methods, and systems for manufacturing inorganically filled articles of manufacture that are presently formed from, e.g., paper, paperboard, polystyrene, plastic, or metals.

Another object and feature of the present invention is to provide compositions, methods, and systems which yield inorganically filled articles that have properties similar to those of paper, paperboard, polystyrene, plastic, or metals.

A further object of the present invention is to provide moldable mixtures which can be formed into a variety of articles using the same or similar manufacturing apparatus and techniques as those presently used to form such objects from, e.g., paper, paperboard, plastic, polystyrene, or metals.

Yet another object and feature of the present invention is to provide compositions, methods, and systems for manufacturing articles from moldable mixtures which do not result in the generation of wastes involved in the manufacture of paper, paperboard, polystyrene, or metal materials.

A further object of the present invention is to provide compositions which contain less water which has to be removed during the manufacturing process (as compared to paper manufacturing) in order to shorten the processing time and reduce the initial equipment capital investment.

Still a further object and feature is that the articles are readily degradable into substances which are nontoxic and commonly found in the earth.

Another object of the present invention is to provide compositions, methods, and systems which make possible the manufacture of articles at a cost comparable to and even superior to existing methods of manufacturing articles from existing materials.

Still another object and feature of the present invention is to provide methods and systems of manufacture which are less energy intensive, conserve valuable natural resources, and require lower initial capital investments compared to those used in making articles from existing materials.

An additional object and feature of the present invention is to provide compositions, methods, and systems for mass producing articles from moldable mixtures which can rapidly be formed and substantially dried within a matter of minutes from the beginning of the manufacturing process.

Finally, another feature and object is to provide compositions and methods which allow for the production of highly inorganically filled materials having greater flexibility, tensile strength, toughness, moldability, and mass-producibility compared to conventional materials having a high content of inorganic filler.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly characterized above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIGS. 10A–F illustrate the processing stages in extrusion blow molding;

DETAILED DESCRIPTION OF THE PREFERRED EMBODIMENTS

Figure 1:
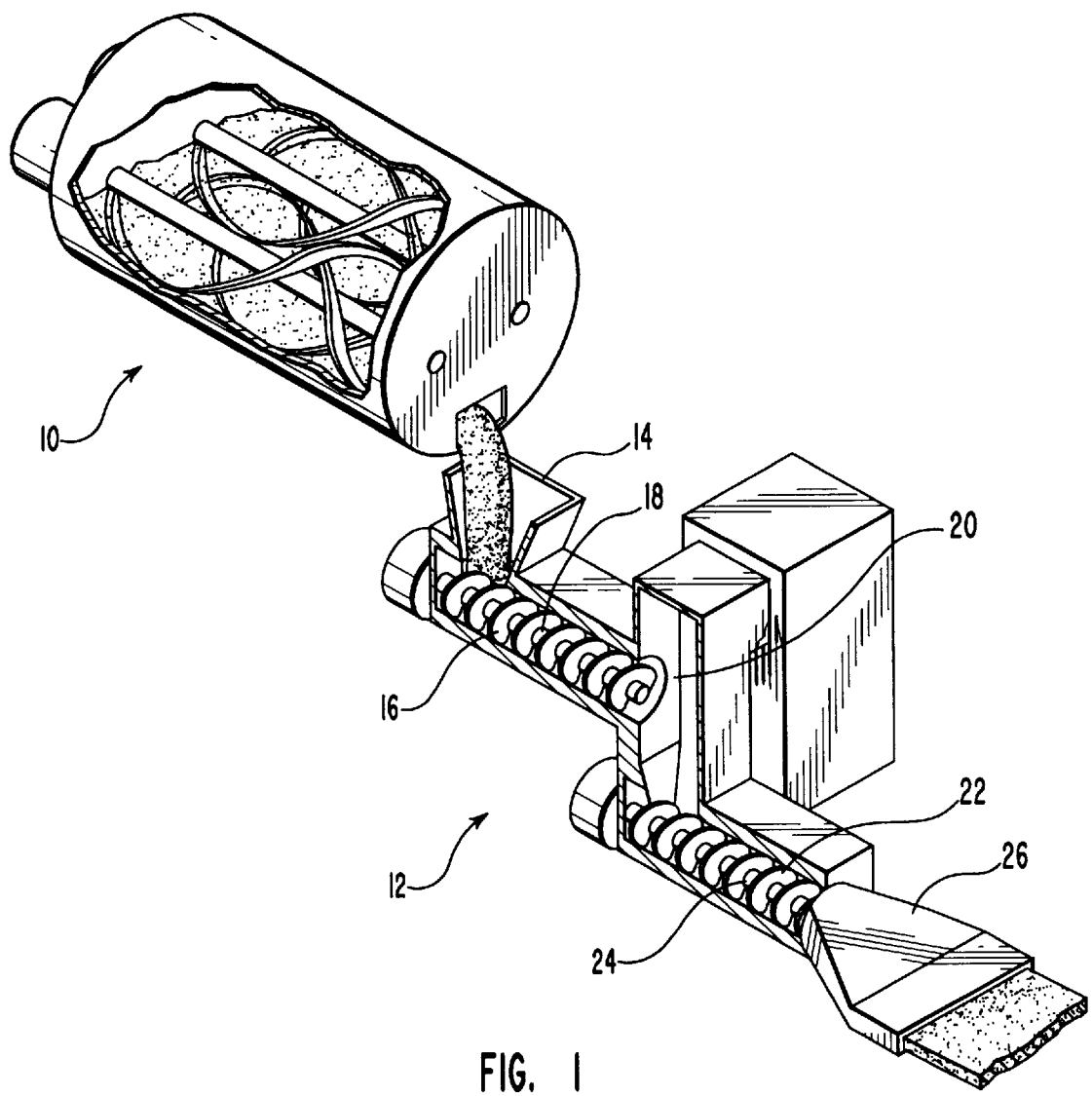
FIG. 1 is a comprehensive view of the system used for preparing the moldable mixtures of the present invention, including a mixer and a twin auger extruder.

The present invention relates to novel methods for the manufacture of highly inorganically filled compositions, which can generally be described as multi-component, multi-scale, fiber-reinforced, micro-composites. By carefully incorporating a variety of different materials (including inorganics and fibers) capable of imparting discrete yet synergistically related properties, it is possible to create a unique class or range of micro-composites having remarkable properties of strength, toughness, environmental soundness, mass-producibility, and low cost.

The term "multi-component" shall refer in the specification and the appended claims to the fact that the inorganically filled materials used to make the articles of the present invention typically include three or more chemically or physically distinct materials or phases, such as fibers, inorganic aggregate materials, organic aggregate materials, organic polymer binders, hydraulically settable inorganic aggregates, water, other liquids, entrapped gases, or voids. Each of these broad categories of materials imparts one or more unique properties to the final article made therefrom (as well as the mixture used to form the article). Within these broad categories it is possible to further include different components (such as two or more inorganic aggregates or fibers) which can impart different, yet complementary, properties to the structure of the article. This allows for the specific engineering of desired properties within the structure of the article in conjunction with the manufacturing process.

The multi-component (and hence, multi-property) nature of the inorganically filled materials of the present invention is a significant departure from conventional materials such as plastic, polystyrene, or metal, which are essentially single component systems. Thin-walled articles made from single component materials are generally limited to having the particular properties of the material from which they are made (e.g., material that is brittle generally cannot be bent or folded without damaging the material; material that is flexible often cannot support its own weight). In contrast, the multi-component nature of the materials of the present invention allows for the introduction of multiple properties within the articles made therefrom.

The term "multi-scale" shall refer in the specification and the appended claims to fact that the compositions and materials of the present invention are definable at different levels or scales. Specifically, within the inorganically filled materials of the present invention there is typically a macro-component composition in the range from about 10 nanometers to as high as about 10 mm, a micro-component composition in the range of about 1 micron to about 100 microns, and a submicron component. Although these levels may not be fractal, they are usually very similar to each other, and homogeneous and uniform within each level.

The term "fiber-reinforced" is self-explanatory, although the key term is "reinforced", which clearly distinguishes the highly inorganically filled materials of the present invention from conventional paper or paper products. Conventional paper relies on "web" physics, or intertwining of fibers, to provide the structural matrix and mass, as well as the binding, of the paper. However, the matrix of the inorganically filled materials of the present invention relies on the bond or interaction between the inorganic aggregate, the organic polymer binder, and the fibers. The fibers act primarily as a reinforcing component to specifically add tensile strength and flexibility.

Finally, the term "micro-composite" shall refer in the specification and the appended claims to the fact that the inorganically filled materials are not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the matrix has a direct correlation to the tensile strength of the fibrous component; the insulation of the matrix has a direct correlation to the total porosity and insulating character of the aggregate material, etc.).

In light of these definitions and principles, materials that include a water-dispersible organic polymer binder, fibers (both organic and inorganic), and an inorganic aggregate can be combined and molded into a variety of containers and other articles having properties similar to those made from conventional materials. The highly inorganically filled materials of the present invention can substitute for materials such as paper, paperboard, plastic, polystyrene, glass, and even metal. The compositions and methods of the present invention are particularly useful in the mass production of disposable containers and packaging, such as those used in fast food industry.

Because of the high concentration of inorganic components (e.g., inorganic aggregate materials, fibers, or both), the materials of the present invention generally have a much higher ash content as well as a much lower BTU content compared to paper, plastic, or polystyrene materials.

I. General Discussion.

A. Articles of Manufacture.

The terms "article" and "article of manufacture" as used in this specification and the appended claims are intended to include all goods that can be formed by molding an inorganically filled mixture. Examples of such articles include food and beverage containers and packaging containers generally. Articles within the scope of this invention also include such disparate objects as loudspeaker membranes and cones, luggage shells, automobile trunk wells, glove compartments, door liners, model airplanes, book covers, game boards, toys, venetian blinds, rain gutters, mailing tubes, shirt packaging forms, appliance shells, and temporary car window shades.

The term "container" as used in this specification and the appended claims is intended to include any article, receptacle, or vessel utilized for storing, dispensing, packaging, portioning, or shipping various types of products or objects (including, but not limited to, food and beverage products). Examples of such containers include boxes, cups, "clam shell" containers, vending plates, jars, bottles, plates, breakfast platters, bowls, trays, cartons, cases, crates, frozen food trays, milk cartons, carriers for beverage containers, dishes, egg cartons, lids, cutlery, or other types of holders.

In addition to integrally formed containers, containment products used in conjunction with containers are also intended to be included within the term "container". Such articles include, for example, lids, liners, partitions, wrappers, cushioning materials, utensils, and any other product used in packaging, storing, shipping, portioning, serving, or dispensing an object within a container.

The articles within the scope of the present invention can have greatly varying thicknesses depending on the particular application for which the article is intended. They can be as thin as about 0.05 mm and as thick as 2 cm or more where strength, durability, and or bulk are important considerations. For thicker-walled packaging materials, the bulk specific gravity will generally be lower than for thin-walled objects.

The phrases "mass producible" or manufactured in a "commercial" or "economic" manner are intended in the specification and the appended claims to refer to the capability of rapidly producing articles at a rate that make their manufacture economically comparable to articles made from conventional materials, such as paper, paperboard, polystyrene, plastic or metal. The present invention is directed to innovative compositions which solve the prior art problems of incorporating a high percentage of inorganic aggregates into the matrices of articles which can be rapidly manufactured by machine, rather than individual hand manufacture of one product at a time (such as "throwing pots").

The containers and other articles made from inorganically filled materials are intended to be competitive in the marketplace with such articles currently made of various materials such as paper, plastic, polystyrene, or metals. Hence, the articles of the present invention must be economical to manufacture (i.e., the cost will usually not exceed a few cents per item). Such cost restraints thus require automated production of thousands of the articles in a very short period of time. Hence, requiring the articles of the present invention to be economically mass produced is a significant limitation on the qualities of the materials and products.

B. Microstructural Engineering Design.

The highly inorganically filled materials of the present invention have been developed from the perspective of microstructural engineering in order to build into the microstructure of the highly inorganically filled material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design highly inorganically filled materials with those properties of strength, weight, insulation, cost, and environmental neutrality that are necessary for appropriate containers and other articles in a significantly more efficient manner.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements, historically have low flexural strength, while elastomers have high flexural strength and elongation before rupture.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using highly inorganically filled materials for a variety of products, such as in the manufacture of containers and other packaging materials.

Nevertheless, once it is realized that highly inorganically filled materials have such a wide utility and can be designed and microstructurally engineered, then their applicability to a variety of possible products becomes obvious. Such materials have an additional advantage over other conventional materials in that they gain their properties under relatively gentle and nondamaging conditions. (Other materials require high energy, severe heat, or harsh chemical processing that significantly affects the material components.) Moreover, certain conventional materials, or components thereof, can be incorporated into the highly inorganically filled materials of the present invention with surprising synergistic properties or results.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to a food and beverage container, for example, those primary constraints include minimal weight, strength (both compressive and tensile), and toughness requirements, while simultaneously keeping the cost comparable to that of paper, plastic, polystyrene or metal counterparts.

As discussed above, one of the problems with materials having high concentrations of inorganic materials in the past has been that they are typically poured into a form, worked, and then allowed to set, harden, and cure over a long period of time—even days or weeks. Such time periods are certainly impractical for the economic mass production of disposable containers and similar products.

As a result, an important feature of the present invention is that when the highly inorganically filled mixture is molded into a desired article, it will maintain its shape (i.e., support its own weight subject to minor forces, such as gravity and movement through the processing equipment) without external support while still in a wet state. Further, from a manufacturing perspective, in order for production to be economical, it is important that the molded article rapidly (in a matter of minutes, or even seconds) achieve sufficient strength so that it can be handled using ordinary manufacturing procedures, even though the highly inorganically filled mixture may still be in a wet state and not fully hardened.

Another advantage of the microstructural engineering and materials science approach of the present invention is the ability to develop compositions in which cross-sections of the structural matrix are more homogeneous than have been typically achieved in the prior art. Ideally, when any two given samples of about 1–2 mm$^3$ of the inorganically filled structural matrix are taken, they will have substantially similar amounts of voids, aggregates, fibers, any other additives, and properties of the matrix.

In its simplest form, the process of using materials science in microstructurally engineering and designing an inorganically filled material comprises characterizing, analyzing, and modifying (if necessary): (a) the aggregates, (b) the predicted particle packing, (c) the system rheology, (d) the average fiber length and packing density, and (e) the processing and energy of the manufacturing system. In characterizing the aggregates, the average particle size is determined, the natural packing density of the particles (which is a function of the shape of the particles) is determined, and the strength of the particles is ascertained.

With this information, the particle packing can be predicted according to mathematical models. It has been established that the particle packing is a primary factor for designing desired requirements of the ultimate product, such as workability, form stability, shrinkage, bulk density, insulating capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, the water-dispersible binder, plasticizers, dispersants, or other materials), the viscosity and yield stress can be chemically modified. The micro-rheology can also be modified physically by changing the shape and size of the particles: e.g., chopped fibers, plate-like mica, round-shaped silica fume, or hydraulically settable inorganic aggregate particles will interact with the lubricants differently.

Finally, the manufacturing process can be modified to manipulate the balance between workability and form stability. As applied to the present invention, this becomes important in significantly increasing the yield stress during formation of the article by either chemical additives (such as by adding a particular water-dispersible binder) or by adding energy to the system (such as by heating the molds). Indeed, it is this discovery of how to manipulate the inorganically filled compositions in order to quickly increase the form stability of the compositions during the formation process that make the present invention such a significant advancement in the art.

From the following discussion, it will be appreciated how each of the component materials within the inorganically filled mixture, as well as the processing parameters, contributes to the primary design constraints of the particular article to be manufactured so that it can be economically mass produced. Specific compositions are set forth in the examples given later in order to demonstrate how the maximization of the performance of each component accomplishes the combination of desired properties.

C. Moldable Mixtures.

The terms "inorganically filled moldable mixture," "inorganically filled mixture," or "moldable mixture" as used in the specification and the appended claims have interchangeable meanings and shall refer to a mixture that can be molded into the articles which are disclosed and claimed herein. Such mixtures are characterized by having a high concentration of inorganic filler or aggregate (from about 30% to about 98% by volume of the total solids of the mixture), water, a water-dispersible binder, and a fibrous material. As used in the specification and the appended claims, the term "total solids" as used in the specification and the appended claims will include all solids, whether they are suspended or dissolved in the inorganically filled mixture. The volume of the total solids does not include the interstitial voids between the solids, but is calculated by subtracting out the volume of the interstitial voids. The mixtures may also include other admixtures such as plasticizers, lubricants, dispersants, hydraulically settable inorganic aggregates, and air void forming agents.

Moldable mixtures are characterized as having a low viscosity along with relatively high yield stress and internal cohesion, which makes them highly workable and form stable immediately or shortly after being molded into the desired shape. The terms "inorganically filled moldable mixture, "inorganically filled mixture," or "moldable mixture" as used in the specification and the appended claims shall refer to the mixture regardless of the extent of drying or hardening that has taken place. Such mixtures shall include mixtures that are highly workable and which are not dried as well as mixtures which are partially dried (although a certain amount of water will usually remain within the articles as bound water within the water-dispersible binder).

After the moldable mixture has been formed into the desired shape, the resulting article made therefrom will have a "highly inorganically filled organic polymer matrix", "highly inorganically filled matrix", or "inorganically filled matrix". These terms as used in this specification and the appended claims are interchangeable and shall refer to such matrices regardless of the extent of drying or hardening that has taken place, the only limitation being that the article made therefrom is form stable. Nevertheless, a highly filled inorganic matrix can refer to a fresh article as well as an article that has been partially dried.

Both the moldable mixture and the inorganically filled matrix formed therefrom constitute "highly inorganically filled materials", "inorganically filled materials", or "highly inorganically filled composites". These terms as used in this specification and the appended claims are interchangeable and shall refer to materials or composites without regard to the extent of wetting, setting, drying, or hardening that has taken place. They shall include materials and composites in a fresh (i.e., unhardened) state, as well as semi-dry or hardened materials after they have been molded into containers or other articles.

The terms "wet" or "fresh" as used in this specification and the appended claims are interchangeable and shall refer to an inorganically filled material, whether unmolded or molded, which has a moisture content sufficient to allow it to be molded or shaped without fracturing or unduly damaging the structural matrix. A partially dried article that nevertheless can be molded without significantly damaging the structural matrix shall be within the meaning of the terms "wet" or "fresh."

The term "form stable" as used in this specification and the appended claims means that the article is still wet, yet is mechanically self-supporting without significant deformation, i.e., it can maintain its shape against the force of gravity without any exterior support (such as a mold). Form stable articles can also withstand process handling shortly after formation without significant deformation. In addition to the mixture design and processing, the form stability of an article can be effected by the shape, structure and wall thickness of an article. Obtaining an optimal form stability for a particular article can be achieved by controlling the yield stress of the mixture through mixture design and processing. The form stability of an article can be optimized by altering the yield stress of a mixture, as an increase or decrease in yield stress results in a corresponding increase or decrease in form stability of an article molded therefrom.

The terms "dry" or "hardened" as used in this specification and the appended claims are interchangeable and refer to an inorganically filled material having a structural matrix which will be harmed or fractured if further molded. It will be understood, however, that molded articles that are only partially dry or which still retain a portion of water but which will be damaged if further molded shall fall within the definition of "dry" or "hardened." This is particularly true in light of the tendency of the inorganically filled materials to absorb moisture from ambient air so that they are rarely totally dry.

D. Water-Dispersible Organic Polymer Binders.

The terms "water-dispersible organic polymer binder," "water-dispersible organic binder," "organic polymer binder," and "organic binder" shall refer in the specification and the appended claims to organic polymer materials capable of being at least partially dissolved in water, or showing sufficient affinity for water that they can form an aqueous phase, emulsion, or suspension, and which will, upon the removal of the water, be capable of binding or holding together the non-water soluble components of the inorganically filled material, including fibers and aggregate materials.

The moldable mixtures used to manufacture the highly inorganically filled articles of the present invention develop strength properties through the drying out of a substantially solvated water-dispersible organic binder. The moldable mixtures first develop workability and flow properties by adding an amount of water to the mixture sufficient to lubricate the solid inorganic aggregate particles and fibers, and to solvate, or at least disperse, the water-dispersible organic binder. Thereafter, the removal of water, such as by evaporation, allows the water-dispersible binder to develop its maximum strength properties.

For example, certain starch-based materials can be purchased as tiny granules which are in a powder-like form. The starch based binder is "activated" by dissolving and gelating the starch binder in water by heating the dispersion above the gelation temperature. After the water has been removed, such starch based materials can, by themselves, have tensile strengths of up to about 40–50 MPa. Through careful microstructural engineering, the highly inorganically filled containers and other articles can have varying tensile strengths, even approaching 50 MPa in some cases.

The water-dispersible organic binder not only binds the individual aggregate particles and fibers together within the mixture upon drying or hardening (thereby forming a structural or highly inorganically filled matrix), but they also have the general tendency of affecting the rheology of the moldable mixture. In fact, the water-dispersible organic binders disclosed herein have been used in cementitious and other hydraulically settable mixtures as rheology-modifying agents, although it has been understood that they may also impart a degree of binding to the final hardened material if included in large enough amounts.

The various water-dispersible organic binders contemplated by the present invention can be roughly organized into the following categories: (1) polysaccharides and derivatives thereof, (2) proteins and derivatives thereof, and (3) synthetic organic materials. Polysaccharide water-dispersible organic binders can be further subdivided into (a) cellulose-based materials and derivatives thereof, (b) starch-based materials and derivatives thereof, and (c) other polysaccharides.

Suitable cellulose-based binders include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and shall not be listed here, but other cellulose materials which have the same or similar properties as these would also work well. Some cellulose-based binders can also be cross-polymerized in solution; an example of this is Cellosize®, a hydroxyethylcellulose product available from Union Carbide. Cellosize® can be cross-linked in water with dialdehydes, methylol ureas, or melamine-formaldehyde resins, thereby forming a less water-soluble binder.

Suitable starch-based binders include, for example, amylopectin, amylose, seagel, starch acetates, starch hydroxyethyl ethers, ionic starches, long-chain alkylstarches, dextrins, amine starches, phosphates starches, and dialdehyde starches.

Other natural polysaccharide-based binders include, for example, alginic acid, phycocolloids, agar, gum arabic, guar gum, locust bean gum, gum karaya, and gum tragacanth.

Suitable protein-based binders include, for example, Zein® (a prolamine derived from corn), collagen (derivatives extracted from animal connective tissue such as gelatin and glue), and casein (the principle protein in cow's milk).

Finally, suitable synthetic organic binders that are water dispersible include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, and latex (which is a broad category that includes a variety of polymerizable substances formed in a water emulsion; an example is styrene-butadiene copolymer).

The water-dispersible organic binders within the moldable mixtures of the present invention are preferably included in an amount such that a hardened article will contain from about 1% to about 60% organic binder by volume of the total solids within the hardened article, more preferably from about 2% to about 30%, and most preferably from about 5% to about 20%.

E. Water.

As set forth above, water is added to the moldable mixture in order to solvate, or at least disperse, the water-dispersible organic binder within the mixture. In many cases, some of the water actually reacts with and becomes chemically bound within the organic binder. In other cases it may be more loosely bound to the organic binder, often by means of hydrogen bonding. Certain amounts of water may also react with other admixtures within the mixture, such as hydraulically settable inorganic aggregates or binders, or other materials which chemically react with water.

The water also serves the function of creating a moldable mixture having the desired rheological properties, including viscosity and yield stress. These properties are general ways of approximating the "workability" or flow properties of the moldable mixture. In order for the moldable mixture to have adequate workability, water must generally be included in quantities sufficient to wet each of the inorganic aggregate particles, fibers, or other solid particles, to solvate or at least disperse the organic binder, and to at least partially fill the interstices or voids between the particles. In some cases, such as where a dispersant or a lubricant is added, adequate workability can be maintained while using less water initially.

The amount of water that is added to the moldable mixture must be carefully balanced so that the mixture is sufficiently workable, while at the same time recognizing that lowering the initial water content increases the form stability of the article in the wet state and the final strength of the hardened article. Less water results in a stronger final product because the total porosity is reduced during the molding processes. Moreover, if less water is initially included in the moldable mixture, less water must be removed in order to cause the molded article to harden.

The appropriate rheology to meet these needs can be defined in terms of yield stress. The yield stress of the moldable mixture will preferably be in the range from about 2 kPa to about 5 MPa, more preferably in the range from about 100 kPa to about 1 MPa, and less preferably in the range from about 200 kPa to about 700 kPa. The desired level of yield stress can be adjusted and optimized to the particular molding process being used to form the container or other article.

In some cases it may be desirable to initially include a relatively high amount of water in light of the fact that excess water can later be removed by heating the molded article during or shortly after the molding process. Nonetheless, one of the important features of the present invention as compared to the manufacture of conventional paper products is that the amount of water initially within the moldable mixture is far less than the amount normally found in fiber slurries used to make conventional paper products. This results in a mixture having far greater yield stress and form stability compared to paper-making slurries. The result is that the total amount of water that must be removed from the moldable mixture to obtain a self-supporting material (i.e., a form stable material) is much less in the case of the mixtures of the present invention compared to the slurries used to manufacture conventional paper products. In fact, conventional paper-making slurries have virtually no form stability until they have been dewatered to a significant degree.

As set forth more fully below, the sizes of the individual aggregate particles and fibers can be selected in order to increase the particle packing density of the resulting moldable mixture. The amount of water that must be added in order to obtain a moldable mixture having a particular rheology or yield stress will, to a large extent, depend on the particle-packing density. For example, if the particle-packing density of the moldable mixture is 0.65, water will be included in an amount of roughly 35% by volume in order to substantially fill the interstitial voids between the particles. On the other hand, a moldable mixture having a particle-packing density of 0.95 will only require water in an amount of about 5% by volume in order to substantially fill the interstitial voids. This is a seven-fold decrease in the amount of water which must be added in order to substantially fill the interstitial voids, which influences the rheology and workability of the moldable mixture.

In light of the foregoing, the amount of water which should be added to the mixture will depend to a large extent on the level of particle packing density within the mixture, the amount of water-dispersible binder that is added, and the desired rheology of the resultant moldable mixture. Hence, the amount of water that will be added to form the moldable mixture will range from as little as 5% to as high as 50% by volume of the moldable mixture. The exact amount of water will greatly vary depending on the volume and identity of other components and admixtures within the mixture. One skilled in the art will be able to adjust the level of water to obtain adequate workability for any given manufacturing process.

Due to the wide variations in the densities of the various components that may be added to the inorganically filled mixture, such as the inorganic aggregate, optional organic aggregate, fibers, water-dispersible organic polymer binders, and the like, it may be more accurate in some cases to express the water concentration within the inorganically filled mixture in terms of weight percent rather than volume percent. Expressed in terms of weight percent, the concentration of water that will be added to the inorganically filled mixtures of the present invention will preferably have a concentration in a range from about 10% to about 80% by weight of the inorganically filled mixture, more preferably in a range from about 25% to about 70% by weight, and most preferably in a range from about 40% to about 60% by weight.

It is preferable in most cases to include the minimum amount of water that is required to give the moldable mixture the desired level of workability, and thereby reduce the amount of water that must be removed from the article. Decreasing the amount of water that must be removed generally reduces the cost of manufacture, since removing water requires energy. Nevertheless, the compositions of the present invention include far less water, even at the upper ranges of water inclusion, compared to slurries used to make paper products, which generally contain 95–99.5% water by volume.

F. Aggregates.

The term "aggregate" as used in this specification and the appended claims includes both inorganic and organic particles having varying particle size distributions and being generally insoluble in water. Although most aggregates within the scope of the present invention are insoluble in water, some aggregates within the scope of this invention are slightly soluble in water and some aggregates can be formed in situ by precipitation or polymerization.

Inorganic materials commonly used in the paper industry, as well as more finely ground aggregate materials used in the concrete industry, may be used in the moldable mixtures of the present invention. Nevertheless, the size of the aggregate or inorganic filler materials will often be many times larger than inorganic filler materials used in the paper industry. While the average diameter of the particles within the inorganic fillers used in the paper industry will usually be less than 2 microns, the average particle diameter of the aggregate materials used in the present invention can, in some cases, be up to 100 microns or larger depending on the wall thickness of the resulting article.

Not only are the inorganic filler materials used in the paper industry required to be much smaller than the aggregate particles used in the moldable mixtures of the present invention, but they also are generally more uniformly sized in the former compared to the latter. In fact, it is often preferable to use a wide range of particle sizes in the present invention in order to increase the particle-packing density of the moldable mixture. Uniformly sized particles typically have a packing density of about 0.624. The result is that the inorganic materials used in the present invention will generally cost far less than the inorganic filler materials used in the paper industry.

It is far more expensive to maintain the extremely small particle size tolerances required in the paper industry, as well as to maintain a general uniformity of particle size. The greatly increased range of particle sizes also allows for a much larger variety of inorganic aggregate materials to be used in the present invention compared to the manufacture of paper products. Hence, the aggregate materials of the present invention may be selected to impart a much larger variety of properties to the final article.

Whereas in paper products the inorganic filler is added mainly to affect the color and the surface quality of the resulting paper product, the aggregate materials employed in the present invention can be added to increase the strength (tensile and, especially, compressive strength), increase the modulus of elasticity and elongation, decrease the cost by acting as an inexpensive filler, decrease the weight, and/or increase the insulation ability of the resultant highly inorganically filled article. In addition, plate-like aggregates, such as mica and kaolin, can be used in order to create a smooth surface finish in the articles of the present invention. Typically, larger aggregates, such as calcium carbonate, give a matte surface, while smaller particles give a glass surface. The advantage of the present invention over the manufacture of conventional paper products is that any of these materials may be added directly into the matrix.

Examples of useful aggregates include perlite, vermiculite, sand, gravel, rock, limestone, sandstone, glass beads, aerogels, xerogels, seagel, mica, clay, synthetic clay, alumina, silica, fly ash, fumed silica, fused silica, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, hydrated or unhydrated hydraulic cement particles, pumice, exfoliated rock, and other geologic materials. Partially hydrated and hydrated cement, as well as silica fume, have a high surface area and give excellent benefits such as high initial cohesiveness of the freshly formed article.

Even discarded inorganically filled materials, such as discarded containers or other articles of the present invention can be employed as aggregate fillers and strengtheners. It will also be appreciated that the containers and other articles of the present invention can be easily and effectively recycled by simply adding them to fresh moldable mixtures as an aggregate filler.

Both clay and gypsum are particularly important aggregate materials because of their ready availability, extreme low cost, workability, ease of formation, and because they can also provide a degree of binding and strength if added in high enough amounts. "Clay" is a term that refers to materials found in the earth that have certain chemical compositions and properties. The predominant clays include silica and alumina (used for making pottery, tiles, brick, and pipes) and kaolinite. The kaolinic clays are anauxite, which has the chemical formula $Al_2O_3 \cdot SiO_2 \cdot H_2O$, and montmorillonite, which has the chemical formula $Al_2O_3 \cdot SiO_2 \cdot H_2O$. However, clays may contain a wide variety of other substances, such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the inorganically filled composites of the present invention.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a moldable mixture.

Even hydraulic cement, such as portland cement, can be added as an inorganic filler material within the moldable mixtures of the present invention. Not only are hydraulic cements relatively inexpensive and plentiful, but they also can impart a degree of binding to the inorganically filled matrix if included in high enough amounts. In addition, hydraulic cement chemically reacts with water, thereby causing an internal drying effect within the moldable mixture which effectively removes at least some of the water within the mixture without the need for evaporation. The same is true for gypsum hemihydrate and calcined clay. Prehydrated cement particles may also be added as an aggregate filler. One difference between unhydrated and prehydrated cement is that the latter has a distinctly different morphology, including microgel and platelets.

In addition, hydraulic cement can effect the rheology of the moldable mixture, at least in part by chemically reacting with the water, thereby diminishing the amount of water available to lubricate the aggregate particles and fibers. In addition, it has been found that portland grey cement increases the internal cohesion of the moldable mixture, perhaps because of the increase in amount of aluminates within this type of cement. Finally, although the mechanism is not clear, it appears that hydraulic cement may interact to some degree with the large number of hydroxyl groups present on many organic polymer binders. The hydroxyl groups of such binders will, at a minimum, have hydrogen bonding-like interactions with the highly polar hydraulic cement gel products, being known to adsorb onto the surface of cement particles.

Because of the nature of the moldable mixtures and articles made therefrom, it is possible to include lightweight aggregates having a high amount of interstitial space in order to impart an insulation effect with the molded articles. Examples of aggregates which can add a lightweight characteristic to the moldable mixture include perlite, vermiculite, glass beads, hollow glass spheres, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the paper and cement industries, a wide variety of other aggregates, including fillers, strengtheners, metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be added to the moldable mixtures within the scope of the present invention. Even materials such as seeds, starches, gelatins, and agar-type materials can be incorporated as aggregates. Although these later aggregates are organic (and readily biodegradable), they are included in this section because they act primarily as a filler not as a binder. Another class of aggregates that may be added to the inorganically filled mixture includes gels and microgels such as silica gel, calcium silicate gel, aluminum silicate gel, and the like. These can be added in solid form as any ordinary aggregate material might, or they may be precipitated in situ. Because they tend to absorb water, they can be added to reduce the water content (which will increase the yield stress) of the moldable mixture.

In addition, the highly hygroscopic nature of silica-based gels and microgels allows them to be used as moisture regulation agents within the final hardened article. By absorbing moisture from the air, the gels and microgels will cause the inorganically filled articles to retain a predetermined amount of moisture under normal ambient conditions. (Of course, the rate of moisture absorption from the air will correlate with the relative humidity of the air). Controlling the moisture content of the articles allows for more careful control of the elongation, modulus of elasticity, bendability, foldability, flexibility, and ductility of the articles.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

It is often preferable, according to the present invention, to include a plurality of differently sized and graded aggregates capable of more completely filling the interstices between the aggregate particles and fibers within the moldable mixture. Optimizing the particle packing density reduces the amount of water that is required to obtain the desired level of workability by eliminating spaces which would otherwise be filled with interstitial water, often referred to as "capillary water."

In order to optimize the packing density, differently sized aggregates with particle sizes ranging from as small as about 0.05 microns to as large as about 2 mm may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired rheological properties of the moldable mixtures while in a wet state, as well as the final strength and weight properties of the final hardened inorganically filled composite.

In certain preferred embodiments of the present invention, it may be desirable to maximize the amount of the aggregates within the moldable mixture in order to maximize the properties and characteristics of the aggregates (such as qualities of strength, low density, or high insulation). The use of particle packing techniques may be employed within the highly inorganically filled material in order to maximize the amount of such aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference. The advantages of such packing of the aggregates can be further understood by reference to the examples which follow, in which hollow glass spheres of varying sizes are mixed in order to maximize the amount of the insulating spheres within the moldable mixture.

In embodiments in which it is desirable to obtain a container or other article having high insulation capability, it may be preferable to incorporate into the highly inorganically filled matrix a lightweight aggregate which has a low thermal conductivity, or "k-factor" (defined as W/m·K). The k-factor is roughly the reciprocal of the expression commonly used in the United States to describe the overall thermal resistance of a given material, or "R-factor," which is generally defined as having units of hr·ft$^{2.\circ}$ F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question, or hr·ft$^{2.\circ}$ F./BTU·in.

For purposes of this specification, the insulation ability of a given material will here and after be expressed only in terms of the IUPAC method of describing thermal conductivity, i.e., "k-factor." (The conversion of thermal resistance expressed in British units (hr·ft$^{2.\circ}$ F./BTU·in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixed design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties to the container or other article, is within the scope of the present invention.

In light of the foregoing, the amount of aggregate which will be added to the moldable mixture will depend on a variety of factors, including the quantity and identities of the other added components, as well as the particle packing density of the aggregates themselves. The inorganic aggregate will preferably be included in an amount as low as about 30% by volume of the total solids content of the hardened article, and as high as about 98%, more preferably in the range from about 50% to about 90%, and most preferably in the range from about 60% to about 80% by volume of the total solids.

Depending on the density of the inorganic aggregates, it may be useful to express the preferred concentration ranges in terms of weight percent rather than volume percent. Expressed in terms of weight percent, the inorganic aggregates will preferably have a concentration in a range from about 20% to about 95% by weight of total solids in the inorganically filled mixture, more preferably in a range from about 30% to about 80% by weight, and most preferably in a range from about 40% to about 70% by weight.

As set forth above, differently sized aggregate materials may be added in varying amounts in order to affect the particle-packing density of the moldable mixture. Depending upon the natural packing density of each aggregate material, as well as the relative sizes of the particles, it is possible that the resulting volume of the combined aggregates will be less than the sum of the volumes of the aggregates before they were mixed.

G. Fibers.

As used in the specification and the appended claims, the terms "fibers" and "fibrous materials" include both inorganic fibers and organic fibers. Fibers are a particular kind of aggregate which may be added to the moldable mixture to increase the cohesion, elongation ability, deflection ability, toughness, fracture energy, and flexural, tensile, and on occasion compressive strengths of the resulting inorganically filled material. Fibrous materials reduce the likelihood that the highly inorganically filled containers or other articles will shatter when cross-sectional forces are applied.

Fibers which may be incorporated into the inorganically filled matrix preferably include naturally occurring organic fibers, such as cellulosic fibers extracted from hemp, cotton, plant leaves, wood, or stems, or inorganic fibers made from glass, graphite, silica, ceramic, or metal materials.

Preferred fibers of choice include glass fibers, abaca, bagasse, wood fibers (both hard wood or soft wood, examples of which include southern hardwood and southern pine, respectively), and cotton. Recycled paper fibers can be used, but they are somewhat less desirable because of the fiber disruption that occurs during the original paper manufacturing process. Any equivalent fiber, however, which imparts strength and flexibility is also within the scope of the present invention. For purposes of illustration, abaca fibers are available from Isarog Inc. in the Philippines, while glass fibers, such as Cemfill®, are available from Pilkington Corp. in England.

These fibers are preferably used in the present invention due to their low cost, high strength, and ready availability. Nevertheless, any equivalent fiber which imparts compressive and tensile strength, as well as toughness and flexibility (to the extent needed), is certainly within the scope of the present invention. The only limiting criteria is that the fibers impart the desired properties without adversely reacting with the other constituents of the inorganically filled material and without contaminating the materials (such as food) stored or dispensed in articles made from inorganically filled material containing such fibers.

The fibers used in making the containers and other articles of the present invention preferably have a high length to width ratio (or "aspect ratio") because longer, narrower fibers can impart more strength to the inorganically filled structural matrix without significantly adding bulk and mass to the composite materials. The fibers should have an average aspect ratio of at least about 10:1, preferably at least about 100:1, and most preferably greater than about 200:1. Nevertheless, fibers having a smaller aspect ratio are generally more easily placed within the article and yield an article with more uniformity and fewer defects.

The amount of fibers added to the moldable mixture will vary depending upon the desired properties of the final product, with tensile strength, toughness, flexibility, and cost being the principal criteria for determining the amount of fiber to be added in any mix design. The concentration of fibers within the final hardened article will preferably be in the range from about 0.5% to about 60% by volume of the total solids content, more preferably from about 2% to about 40%, and most preferably from about 5% to about 20%. (In light of these ranges and those given with respect to the organic polymer binder, the total amount of organics (fibers plus binder) within the hardened article will preferably be less than about 70% by volume of the total solids content, more preferably less than about 50%, and most preferably less than about 30%.)

It has been found that when the fiber content of the material is less than about 20% by volume of the total solids slight increases of fiber concentration tend to dramatically increase the strength, toughness, and bending endurance of the finished article. Adding fibers above about 20% by volume will produce a less dramatic increase in the strength and flexibility of the article, although such increases may be economically justified in some circumstances.

It will be appreciated, however, that the strength of the fiber is a very important feature in determining the amount of the fiber to be used. The greater the tensile strength of the fiber, the less the amount of fiber that must be used to obtain a given tensile strength in the resulting article. Of course, while some fibers have a high tensile, tear and burst strength, other types of fibers with a lower tensile strength may be more elastic. Fibers with a smaller aspect ratio are more easily placed and yield an article with fewer defects, while a larger aspect ratio increases the strength-imparting effect of the fiber. A combination of two or more fibers may be desirable in order to obtain a resulting product that maximizes multiple characteristics, such as higher tensile strength, higher elasticity, or better fiber placement.

It should also be understood that some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture. For example, a mixture of southern hard wood and southern pine allows for better dispersion of the fibers throughout the moldable mixture, yielding an article with good fiber dispersion and excellent folding endurance. In any event, as set forth more fully above, the fibers used in the present invention preferably do not undergo the intense processing of fibers used to make paper products. Because of this, they maintain far more of their original strength.

Finally, it is known that certain fibers and inorganic fillers are able to chemically interact and bind with certain starch-based organic polymer binders, thereby adding another dimension to the materials of the present invention. For example, it is known that many fibers and inorganic fillers are anionic in nature and have a negative charge. Therefore, in order to maximize the interaction between the organic binder and the anionic fibers and inorganic materials, it may be advantageous to add a positively charged organic binder, such as a cationic starch.

Better water resistance can be obtained by treating the fibers with rosin and alum ($Al_2(SO_4)_3$) or $NaAl(SO_4)_2$, the latter of which precipitates out the rosin onto the fiber surface making it highly hydrophobic. The aluminum floc that is formed by the alum creates an anionic adsorption site on the fiber surface for a positively charged organic binder, such as a cationic starch.

H. Dispersants.

The term "dispersant" shall refer in the specification and the appended claims to the class of materials which can be added to reduce the viscosity and yield stress of the moldable mixture. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987). For purposes of disclosure, the foregoing Master's Thesis is incorporated herein by specific reference.

Dispersants generally work by being adsorbed onto the surface of the aggregate particles and/or into the near colloid double layer of the particles, particularly if hydraulic cement particles are added. This creates a negative charge on or around the surfaces of the particles, causing them to repel each other. This repulsion of the particles adds "lubrication" by reducing the friction or attractive forces that would otherwise cause the particles to have greater interaction. This increases the packing density of the material somewhat and allows for the addition of less water while maintaining the workability of the moldable mixture.

Nevertheless, due to the nature of the coating mechanism of the dispersant, the order in which the dispersant is added to the mixture can often be critical. If certain water-dispersable organic polymer binders (such as Tylose®) are used, the dispersant should be added to a mixture containing water and at least part of the inorganic aggregates first and the binder should be added second. Otherwise, the dispersant will be less able to become adsorbed onto the surface of the aggregate particles because the Tylose® will first be irreversibly adsorbed, thereby forming a protective colloid on the surface and thereby preventing the dispersant from being adsorbed.

A preferred dispersant is sulfonated naphthalene-formaldehyde condensate, an example of which is marketed under the trademark WRDA 19, which is available from W. R. Grace, Inc. Other dispersants which can also work well include sulfonated melamine-formaldehyde condensate, lignosulfonate, and polyacrylic acid. The amount of added dispersant will generally range up to about 5% by weight of the water, more preferably in the range from about 0.5% to about 4%, and most preferably within the range from about 1% to about 2%.

The dispersants contemplated within the present invention have sometimes been referred to in the concrete industry as "superplasticizers." In order to better distinguish dispersants from other rheology-modifying agents, which often act as plasticizers, the term superplasticizer" will not be used in this specification.

I. Interstitial Voids.

The terms "interstitial voids," and "air voids" as used in this specification and the appended claims include empty spaces within the matrix of an article. Where insulation, not strength, is the overriding factor (i.e., whether it is desired to insulate hot or cold materials), it may be desirable to incorporate tiny voids within the structural matrix of the articles in addition to lightweight aggregates in order to increase the insulating properties of the containers or other articles. The incorporation of voids into the moldable mixture is carefully calculated to impart the requisite insulation and lightweight characteristics without undue degradation of the strength of the article. Where insulation is not important, it is desirable to minimize the air voids in order to maximize strength and minimize volume.

In certain embodiments, air voids may be introduced by high shear, high speed mixing of the moldable mixture, with a foaming or stabilizing agent added to the mixture to aid in the incorporation and retention of air voids. Suitable foaming and air entraining agents include commonly used surfactants. One currently preferred surfactant is a polypeptide alkylene polyol, such as Mearlcrete® Foam Liquid.

In conjunction with the surfactant, it is generally necessary to stabilize the entrained air within the moldable mixture using a stabilizing agent like Mearlcel 3532®, a synthetic liquid anionic biodegradable solution. Both Mearicrete® and Mearicel® are available from the Mearl Corporation in New Jersey. Another foaming and air-entraining agent is vinsol resin. In addition, the organic polymer binder can act to stabilize the entrained air. Different air-entraining agents and stabilizing agents impart different degrees of foam stability to the inorganically filled mixture, and they should be chosen in order to impart the properties that are best suited for a particular manufacturing process.

Foam stability helps maintain the dispersion, and prevents the agglomeration, of the air voids within the unhardened moldable mixture. Failure to prevent the coalescence of the air voids actually decreases the insulation effect, and it also greatly decreases the strength of the hardened inorganically filled material. Raising the pH, increasing the concentration of soluble alkali metals such as sodium or potassium, adding a stabilizing agent such as a polysaccharide, and carefully adjusting the concentrations of surfactant and water within the moldable mixture all help to increase the foam stability of the mixture.

During the process of molding and/or hardening the moldable mixture, it is often desirable to heat the moldable mixture in order to increase the volume of the air void system. Heating also aids in rapidly removing significant amounts of the water from the moldable mixture, thereby increasing the strength of the fresh article. When heating is appropriate, it has been found desirable for the heating to be within a range from about 100° C. to about 250° C. The upper limit is set by the possibility that adverse reactions might occur within the moldable mixture, such as the burning of the fibers or organic binder. If properly controlled, heating will not result in the cracking of the structural matrix of the article, or yield imperfections in the surface texture of the article.

Another foaming agent is a mixture of citric acid and bicarbonate or bicarbonate that has been processed into small granules or particles and coated with wax, starch, or water soluble coatings. This can be used in void formation two ways: (1) to react with water and form $CO_2$ gas in order to create a cellular foam structure within the inorganically filled matrix or (2) to pack the particles as part of the matrix and after hardening the matrix remove the foam particles by heating the product above 180° C., which causes an endothermic decomposition of the particles, leaving behind a well controlled cellular lightweight structure.

In other applications, where the viscosity of the moldable mixture is high, such as is required in certain molding processes, it is much more difficult to obtain adequate numbers of air voids through high shear mixing. In this case, air voids may alternatively be introduced into the moldable mixture by adding an easily oxidized metal, such as aluminum, magnesium, zinc, or tin to a mixture that is either naturally alkaline (such as a mixture containing hydraulic cement or calcium oxide) or one that has been made alkaline by the addition of a strong base, such as sodium hydroxide. This reaction results in the evolution of tiny hydrogen bubbles throughout the moldable mixture.

It may further be desirable to heat the mixture in order to initiate the chemical reaction and increase the rate of formation of hydrogen bubbles. It has been found that heating the molded product to temperatures in the range of from about 50° C. to about 100° C., and preferably about 75° C. to about 85° C., effectively controls the reaction and also drives off a significant amount of the water. This second method of introducing air voids into the structural matrix can be used in conjunction with, or in place of, the introduction of air through high speed, high shear mixing in the case of lower viscosity moldable mixtures used in some molding processes.

Finally, air voids may be introduced into the moldable mixture during the molding process by adding a blowing agent to the mixture, which will expand when heat is added to the mixture. Blowing agents typically consist of a low boiling point liquid and finely divided calcium carbonate (chalk). The chalk and blowing agent are uniformly mixed into the moldable mixture and kept under pressure while heated. The liquid blowing agent penetrates into the pores of the individual chalk particles, which act as points from which the blowing agent can then be vaporized upon thermal expansion of the blowing agent as the pressure is suddenly reduced.

During the molding or extrusion process, the mixture is heated while at the same time it is compressed. While the heat would normally cause the blowing agent to vaporize the increase in pressure prevents the agent from vaporizing, thereby temporarily creating an to equilibrium. When the pressure is released after the molding or extrusion of the material the blowing agent vaporizes, thereby expanding or "blowing" the moldable material. The moldable material eventually hardens with very finely dispersed voids throughout the inorganically filled structural matrix. Water can also act as a blowing agent as long as the mixture is heated above the boiling point of water and kept under pressure of up to 50 bars.

II. Specific Applications of the Materials into Articles.

The key structural component which gives strength to the articles of manufacture of the present invention is the structural matrix formed by the interaction of a mixture of water and an organic polymer binder, and subsequent drying of the mixture. Within the structural matrix are other components (such as fibers, aggregates, air voids, dispersants, and even accelerants) which add additional characteristics and properties to the materials.

A. Effect of Components on Mixture Rheology.

The amount of water that should be added to obtain a mixture having adequate workability and flowability will depend on the concentration and particle packing density of the inorganic filler or aggregate, the amount of fibers, the identity and quantity of the organic binder, and the identity and quantity of other admixtures (such as dispersants, plasticizers, or lubricants). In general, however, the addition of more water will decrease the viscosity and yield stress of the moldable mixture, thereby increasing the flowability of the mixture and decreasing the form stability of an object molded therefrom.

The water-dispersible organic polymer binder can greatly affect the rheology of the mixture depending on the identity, concentration, and extent of gelation of the organic binder. As set forth above, preferred organic polymer binders can roughly be divided into the following categories: cellulose-based, starch-based, protein-based, polysaccharide-based, and synthetic organic. Within each of these broader categories are numerous subcategories and divisions. A unifying feature of each of these materials is that they will generally dissolve in, or at least be fairly thoroughly dispersed by, water. Hence, they require adequate levels of water for their dispersion and activation (including gelation) within the moldable mixture.

Nevertheless, the organic polymer binders have greatly varying levels of water solubility or dispersibility, as well as varying levels of viscosity and yield stress. Organic polymers within the same class may have greatly varying viscosities depending on the molecular weight. For example, a 2% solution of Tylose® FL 15002 at 20° C. has a viscosity of about 15000 cps, while a similar solution of Tylose® 4000 has a viscosity of about 4000 cps. The former greatly increases the yield stress and plastic-like properties of a moldable mixture, while the latter may act more as a lubricant or plasticizer.

Other organic polymers react at different rates and different temperatures within the water. Although many organic polymer binders such as Tylose® neither polymerize or depolymerize when added to the moldable mixture, but rather gelate and then dry out to form a bonding matrix, it is within the scope of the present invention to add water soluble or water-dispersible polymerizable units to the moldable mixture which will thereafter polymerize in situ over time. The rate of the polymerization reaction can be regulated by adjusting the temperature of the mixture and/or adding a catalyst or inhibitor. Examples of polymerizable units which may be added to a moldable mixture include Cellosize and latex forming monomers.

With regard to gelation, most cellulose-based polymers (such as Tylose®) will readily gelate in water at room temperature. Others, such as many starches, will only gelate in water at higher temperatures. Certain modified starches can, however, gelate at room temperature. Hence, cellulose-based and modified starch-based polymer binders are advantageous in that a moldable mixture can be formed therefrom at room temperature. Nevertheless, they are generally significantly more expensive than typical starch-based polymers, which must be heated to gelate. A preferred starch-based polymer is National 51-6912, which may be purchased from National Starch.

Other admixtures which may be added to directly influence the rheology of the moldable mixture include dispersants, plasticizers, and lubricants. Dispersants such as sulfonyl-based materials greatly decrease the viscosity and increase the workability of the moldable mixture while keeping the amount of water constant. A corollary is that using a dispersant allows for the inclusion of less water while maintaining the same level of workability. A preferred plasticizer and lubricant is polyethylene glycol.

The amount, identity, and particle packing density of the aggregates can greatly affect the rheology and workability of the moldable mixture. Aggregates which are porous or which have a high specific surface area will tend to absorb more water than nonporous aggregates, thereby reducing the amount of water available to lubricate the particles. This results in a stiffer, more viscous mixture. Particle packing density can greatly impact the rheology of the mixture by determining the amount of interstitial space which generally must be filled by water, lubricants, organic polymers, or other liquids in order for the mixture to flow.

By way of example, an aggregate system having a packing density of 0.65 will generally require about 35% liquids (including water) by volume in order to substantially fill the interstitial space between the particles. On the other hand, an aggregate system having a packing density of 0.95 will generally require only about 5% liquids by volume in order to substantially fill the voids. This represents a seven-fold decrease in the amount of water required to fill the interstitial space, which directly correlates to the rheological properties, including the level of workability, of the mixture. The actual particle packing density will generally range somewhere between these two extremes and should be calculated when determining how much water to add to the moldable mixture. The size and morphology of the aggregate particles can also affect the rheology and flow properties of the moldable mixture to some degree.

In situations where the moldable mixture will be subjected to high pressures, such as extrusion or other high pressure molding processes, it may be possible to take advantage of the interplay between the principles of particle packing and water deficiency in order to temporarily increase the workability and flowability while compressing the mixture. For purposes of this specification and the appended claims, the terms "water deficiency" or "deficiency of water" shall refer to a moldable mixture in which there is insufficient water (and other liquids) to fully occupy the interstitial space between the particles. Because of this, there is insufficient water to adequately lubricate the particles.

However, upon applying a pressure that is great enough to temporarily increase the particle packing density, the amount of interstitial space between the particles will decrease. Because water is incompressible and maintains the same volume under pressure, the increased pressure increases the apparent amount of water that is available to lubricate the particles, thereby increasing the workability and flowability of the mixture. After the pressure is removed, usually after the molding process has ended, the aggregate particles will expand slightly, thereby increasing the amount of interstitial space and creating a partial internal vacuum. This results in an almost immediate increase in form stability.

Hydraulically settable materials such as hydraulic cement, gypsum hemihydrate, and calcium oxide can be utilized as a water absorption mechanism. These chemically react with the water, thereby reducing the effective level of water within the moldable mixture without resorting to heating or drying techniques. Such materials can greatly affect the rheology of the moldable mixtures as a function of the extent of hydration, which in turn is a function of time. In addition, it has been found that hydraulic cement increases the cohesive strength of the fresh moldable mixture and a fresh article made therefrom. It is the cohesion that holds the inorganically filled material together, enabling the material to be molded and thereafter maintain its form until it has dried sufficiently to obtain sufficient strength.

Finally, other solid components within the mixture, such as fibers, will affect the rheology of the mixture in similar fashion to the aggregates. Certain fibers may absorb water depending on their porosity and swelling capability. In addition, certain fibers can be treated to become ionically charged, which will allow them to chemically interact with ionically charged organic plasticizers, such as ionic starches.

B. Effect of Components on Final Properties.

With regard to the final dried or hardened article, some of the properties considered generally desirable to design into the structural matrix of the articles include high tensile strength (in general or along particular vectors), flexural strength, flexibility, and ability to elongate, deflect or bend. In some cases, it may be desirable to obtain articles which substantially incorporate the properties of existing articles made from paper, paperboard, or plastic materials. However, in other cases it may be desirable to obtain a structural matrix having properties not obtainable using conventional materials. These may include increased toughness, higher modulus, water resistance, or lower bulk density.

In contrast to articles formed from tree paper or paperboard, in which the properties of the sheets and subsequent articles are extremely dependent on the properties of the pulps used, the properties of the articles of the present invention are substantially independent of the properties of the fibers used in making the moldable mixture for forming. To be sure, using longer, more flexible fibers will impart more flexibility to the article than shorter, stiffer fibers. However, properties that are largely pulp-dependent in conventional papers can be designed into the present articles by adjusting the concentrations of the nonfibrous components of the moldable mixture as well as the processing techniques used. Such properties as stiffness, rigidity, surface finish, porosity, and the like are generally not dependent on the type of fibers incorporated into the current articles.

The flexibility, tensile strength, flexural strength, or modulus can be tailored to the particular performance criteria of the container or other article made therefrom by altering the components and relative concentrations of the components within the moldable mixture. In some cases, higher tensile strength may be an important feature. In others, it may be less significant. Some articles should preferably be more flexible, while others will be stiff. Some will be relatively dense, others will be thicker, lighter, and more insulating. The important thing is to achieve a material which has properties appropriate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

In general, increasing the amount of organic polymer binder will increase the tensile and flexural strength of the final hardened article, while also greatly increasing the flexibility and resilience of the article. Adding more organic polymer also decreases the stiffness of the article. Similarly, increasing the concentration of fibers within the mixture also increases the tensile strength of the final article, particularly higher tensile strength fibers, such as ceramic fibers, although such fibers are stiff and will yield a relatively stiff hardened article. Conversely, adding flexible fibers, such as natural cellulosic fibers, will greatly increase the flexibility, as well as the tensile, tear, and burst strengths of the article.

Different fibers have greatly varying degrees of tear and burst strength, flexibility, tensile strength, ability to elongate without breaking, and stiffness. In order to obtain the advantageous properties of different types of fibers, it may be preferable in some cases to combine two or more different kinds of fibers within the moldable mixture.

Certain article forming processes, such as extrusion and rolling, tend to orient the fibers in the direction of elongation of the mixture. This may be advantageous in order to maximize the tensile strength of the article or sheet in a certain direction. For example, where the sheet forming an article will be required to bend along a hinge, it is preferable for the fibers to be oriented in a way so as to more effectively bridge the two sides of the hinge or bend by being oriented perpendicular to the fold line. It may be desirable to concentrate more of the fibers in the area of a hinge or where the sheet requires increased toughness and strength. When molding an article from a sheet molded from the mixture, fiber orientation can also be achieved through rolling processes described hereinbelow.

The type of aggregate can also affect the properties of the final hardened article. Aggregates comprising generally hard, inflexible, small particles such as clay, kaolin, or chalk will generally result in an article having a smooth surface and an increased brittleness. Lightweight aggregates, such as perlite or hollow glass spheres, result in an article having lower density, lower brittleness, and greater insulating ability. Aggregates such as crushed sand, silica, gypsum, or clay are extremely inexpensive and can greatly reduce the cost of manufacturing an article therefrom. Any material with a high specific surface area gives increased drying shrinkage and shrinkage defects. Materials with lower specific surface areas are advantageous because they are less sticky, which helps inhibit the mixture from adhering to the molding apparatus.

Hydraulically settable materials such as hydraulic cement, gypsum hemihydrate, and calcium oxide provide small to significant degrees of binding within the hardened article depending on the amount in which such hydraulically settable inorganic aggregates are added. Such hydraulically settable inorganic aggregates increase the stiffness and compressive strength of the final article and, to some degree, the tensile strength. Hydraulic cement can also decrease the solubility of the article in water, thereby increasing the resistance of the article to water degradation.

Finally, other admixtures within the moldable mixtures can add a waterproofing property to the final product, such as by adding rosin and alum to the mixture. These interact to form a very water resistant component within the structural matrix. Water resistance can be introduced by treating the article surface with a 5–10% w/w starch solution in order to seal the surface porosity. In the absence of significant quantities of such waterproofing agents, water can be used to remoisten the article and temporarily increase the flexibility, bendability, and elongation before rupture. This is particularly useful where the mixture is first formed into a sheet that will subsequently be formed into another article of manufacture, such as a container. Of course, water can also facilitate the degradation of the article after it has been discarded.

As a general rule, articles which have lower concentrations of organic polymer binder and fiber but high concentrations of inorganic aggregates will be more rigid, have a higher insulation ability, have a higher compressive strength, have lower cohesiveness, resist heat damage, have lower tensile strength, and resist water degradation (particularly if they contain significant amounts of hydraulic cement, the inclusion of which can also increase the compressive strength of the final article).

Articles which have lower concentrations of organic binder but higher fiber and inorganic aggregate content will have higher tensile strength, compressive strength and toughness, but have lower flexural strengths and stiffness, with moderate flexibility, and be fairly resistant to water degradation (particularly if hydraulic cement is included in great enough amounts).

Articles which have higher concentrations of organic polymer binder and lower concentrations of fiber and inorganic aggregate will be more water soluble and degradable, easier to mold (allowing for the manufacture of thinner articles), have moderately high compressive and tensile strengths, higher toughness, moderate flexibility, and lower stiffness.

Finally, articles which have higher concentrations of organic polymer binder and fiber but low concentrations of inorganic aggregate will have properties that are most similar to paper (both tree and plant paper), will have higher tensile strength, toughness, and folding endurance, have moderate compressive strength, have very low resistance to water degradation, will have lower resistance to heat (particularly those approaching ignition point of fibers or decomposition temperature of the binder), and have higher flexibility and lower stiffness.

The articles formed using the compositions described herein will preferably have a tensile strength in the range from about 0.05 MPa to about 70 MPa, and more preferably in the range from about 5 MPa to about 40 MPa. In addition, the articles will preferably have a bulk density in the range from about 0.1 g/cm$^3$ to about 2 g/cm$^3$, and more preferably from about 0.2 g/cm$^3$ to about 1.5 g/cm$^3$. Whether an article will have a density at the lower, intermediate, or higher end of this range will generally depend on the desired performance criteria for a given usage. In light of the foregoing, the articles of the present invention will preferably have a tensile strength to bulk density ratio in the range from about 2 Mpa·cm$^3$/g to about 200 MPa·cm$^3$/g, and more preferably in the range from about 3 MPa·cm$^3$/g to about 50 MPa·cm$^3$/g.

The term "elongate" as used in the specification and appended claims with regard to the articles of the present invention means that the structural matrix of the article is capable of being stretched without substantial rupture. The ability of the structural matrix of the article to elongate before rupture may be measured by an Instron tensile test and a stress strain test.

By optimizing the mix design, it is possible to manufacture a freshly molded article which has a structural matrix capable of elongating up to about 20% before tearing or rupturing occurs, and from about 0.5% to 8% upon drying. This is usually accomplished by optimizing the amounts of fiber and organic binder within the moldable mixture and resulting matrix. Producing an article having a structural matrix capable of elongating within the specified range can be accomplished by including fibers within the hardened article in an amount of up to about 60% by volume. The greater the amount of fibers or organic binder added, or the better the matrix to fiber interface, the more elongation that can generally be achieved without rupture of the article.

The term "deflect" as used in the specification and appended claims is related to the ability of a dried article to bend or roll without rupture and change in the finished surface. The ability of the article to deflect is measured by measuring the elasticity modulus and the fracture energy of the article using means known in the art. As with any material, the bending ability of an article manufactured according to the present invention is largely dependent upon the thickness of the wall of the article.

One way to measure deflection without regard to wall thickness is to define deflection as the relative elongation of one side of the wall or sheet compared to the other side. As the wall is rolled or bent around an axis, the length of the outer side of the wall will elongate, while the inner side generally will not. Consequently, a thinner walled article can be bent a far greater degree even though the relative elongation of the outer side compared to the elongation of the inner side is about the same as in a thicker article which cannot bend nearly as far.

During the process of forming a partially dried sheet into an appropriate article the bendability of the sheet can be temporarily increased by remoistening with water. It is believed that the water is absorbed by the fibers, water-dispersible organic binder, and the interstices between the aggregate particles. Upon drying the formed article, the level of bendability will generally decrease while the toughness and hardness will generally increase.

In order to obtain an article having the desired properties of strength, bendability, insulation, toughness, weight, or other performance criteria, the thickness of the article can be altered by adjusting the space between the dies and/or rollers. Depending on the thickness and desired performance criteria, the components and their relative concentrations can be adjusted in order to accommodate a particular article thickness. The articles of the present invention may be designed to have greatly varying thicknesses; however, most articles requiring thin walls will generally have a thickness in the range from about 0.05 mm to about 3 mm. Nevertheless, in applications where insulation ability or higher strength or stiffness is more important, the wall thickness of the article may range up to about 2 cm or more.

III. Processing Techniques and Conditions.

The basic processing techniques and conditions include (1) preparing an appropriate moldable mixture; (2) molding the mixture into the desired article, including forming an article from a molded precursor; (3) increasing the form stability of the article; (4) demolding the article; and (5) optionally processing the molded article, such as drying the molded article in an accelerated manner, coating, printing, altering the surface qualities of the article, and the like.

A. Preparing a Moldable Mixture.

Although a wide variety of molding processes and mix designs may be used in the manufacture of the articles within the scope of the present invention, the mixing processes are substantially the same. Of course, different equipment will be used to conveniently provide feed stock to the molding equipment. At least some of the components used in making an appropriate moldable mixture are preferably blended together using a high shear mixer. High shear mixing provides even distribution of an organic binder, water, dispersants, fibers, durable aggregates, and other admixtures. High shear mixing improves the rheology of the mixture and increases the strength and uniformity of the final hardened article.

High shear mixing may be employed to incorporate finely dispersed air voids within the moldable mixture through the use of an air entraining agent. In those cases where a hydraulically settable material such as hydraulic cement or calcium oxide has been added to the mixture, it may be advantageous to flood the atmosphere above the high shear mixer with carbon dioxide in order to cause the carbon dioxide to react with the mixture. It has been found that carbon dioxide can increase the foam stability of a moldable mixture and cause an early false setting of hydraulic cement. It is also the constituent which reacts with calcium oxide in order to create calcium carbonate as an insoluble binding precipitate.

High shear mixers useful in creating the more homogeneous mixtures as described herein are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. Other mixers are capable of imparting varying amounts of shear to the moldable mixture. For example, a kneader mixer, as shown in FIG. 1, imparts higher shear compared to a normal cement mixer, but is low compared to an Eirich Intensive Mixer or a twin auger food extruder.

Aggregates included in higher concentrations, as well as lightweight aggregates, are generally blended into the mixture using low shear mixing. Many lightweight aggregates, such as perlite or hollow glass spheres, cannot withstand high shear conditions without breaking.

In a typical mixing process in the laboratory, the appropriate components are blended using a high shear, high speed mixer for about 1 minute. Thereafter, the remaining components are blended into the mixture using a low shear, low speed mixer for about 5 minutes. The total mixing time per batch of material is therefore about 6 minutes, although this may be varied depending upon the nature of the moldable mixture. Industrially, this mixing process can be substantially shortened by the use of appropriate mixers; specifically, the currently preferred method of mixing being a continuous mixing system.

In one embodiment, a cement mixer capable of both high and low shear mixing is used to meter and mix the materials in a batch mode. In an alternative embodiment, high shear mixers can be used to initially mix the components of the moldable mixture. Thereafter, the mixture can be transferred to a low shear mixer in order to complete the mixing process. In another embodiment, the mixing step may be combined with an extrusion step using modern extrusion equipment that includes a high shear mixing chamber.

The currently preferred embodiment for the industrial setting is equipment in which the materials incorporated into the moldable mixture are automatically and continuously metered, mixed, deaired, and extruded by a twin auger extruder apparatus. FIG. 1 depicts a mixer 10 and an auger extruder 12, which includes a feeder 14 that feeds the moldable mixture into a first interior chamber 16 of extruder 12. Within first interior chamber 16 is a first auger screw 18 which both mixes and exerts forward pressure advancing the moldable mixture through first interior chamber 16 toward an evacuation chamber 20. Typically, a negative pressure or vacuum will be applied to evacuation chamber 20 in order to remove unwanted air voids within the moldable mixture. Thereafter, the moldable mixture is fed into a second interior chamber 22. A second auger screw 24 will advance the mixture toward a die head 26. Auger screws 18 and 24 can have different flight pitches and orientations in order to assist the advancement of the mixture and to raise or lower the amount of imparted shear.

Auger extruder 12 can be used to independently mix the components for the moldable mixture, or, as shown in FIG. 1, can be fed by mixer 10. The preferable twin auger extruder apparatus utilizes uniform rotational augers wherein the augers rotate in the same direction. Counter-rotational twin auger extruders, wherein the augers rotate in the opposite directions, accomplish the same purposes. A pugmil may also be utilized for the same purposes. Equipment meeting these specifications are available from Buhler-Miag, Inc., located in Minneapolis, Minn.

The internal components of the mixer can be made of stainless steel because the abrasion to the mixer is not great due to the relatively high water content, however, the mixer components can be carbide coated for extended life, thereby resisting any abrasion from mixtures containing aggregates and the strongly basic conditions expected from mixtures containing hydraulically settable materials.

B. The General Molding Process.

1. Initial Molding Processes.

The term "molding", as used in this specification and the appended claims, is intended to include the specific molding techniques set forth herein by way of example, as well as those that are well known in the art with respect to materials such as clays, ceramics, and plastics. Examples of preferred molding techniques include "die press molding", "injection molding", "blow molding", "jiggering", and "wet sheet molding". Detailed descriptions of these methods are set forth more fully below. The term "molding" shall also include heating the molded article in order to expand and/or increase the form stability of the article, and the release of the articles from the mold (also referred to as "demolding").

Within any appropriate molding process the compression necessary to impart a desired shape to a mixture or to a sheet formed from an inorganically filled mixture is achieved by mechanical pressure, vacuum pressure, air pressure, or combinations thereof. Articles can be molded in one step by die pressing, injection molding, blow molding, and jiggering. Articles can also be molded by a two step forming process wherein the mixture is first molded into a sheet, after which the sheet is molded into the desired article.

The processes described below can be performed using conventional equipment well known to those skilled in the art of the paper, plastic, metal, and cement industries. The equipment, however, must be uniquely combined and arranged to form a functional system for production of the present articles. Furthermore, slight modifications of the equipment is preferred to optimize and increase mass production of the articles. For example, injection molding of plastic articles requires the molds to be cooled to quickly harden the molded articles. In the present invention, however, it is often preferred to heat the molds to rapidly harden the articles. The arrangement, modification, and operation of the equipment needed to manufacture the articles of present invention can be performed by those skilled in the art of using the conventional equipment in light of the present disclosure.

In order for the molding process to be cost effective it is important that the molded article become form stable immediately or shortly after the molding process. Form stability is important for the article to be ejected from the mold and should preferably be obtained in less than one minute after the molding process, more preferably in less than about 10 seconds, and most preferably in less than about 1–3 seconds. In addition, the surface of the molded article should not be too sticky, as that would make the demolding, handling, and stacking processes more difficult.

The rheological or flow properties of the moldable mixture should be optimized according the particular manufacturing process being employed. Imparting the desired properties should be balanced against the cost of achieving such properties. Die pressing, injection molding, and jiggering, for example, generally require a highly viscous mixture that can be shaped under pressure to quickly produce a form stable product, while blow molding requires a highly elastic mixture that can be blown without rupturing.

There are several modifications to conventional molding processes which are preferably employed in order to ease the manufacturing process. For example, it is frequently desirable to treat the mold with a releasing agent in order to prevent sticking. Suitable releasing agents include silicon oil, Teflon®, Deleron®, and UHW®. Preferably, the mold itself will be made of stainless steel and/or coated with a material having a very slick finish, such as Teflon®, Deleron®, or chrome plating polished to about 0.1 RMS.

The same effect can be achieved from the use of frictional forces. By spinning the head of the molding apparatus against the interior and/or exterior surfaces of the moldable mixture, any chemical and mechanical adherence (i.e., stickiness) to the mold can be overcome.

During the process of molding and/or drying the mixture, it is often desirable to heat up the mixture in order to control the air void system by allowing for proper control of the porosity and the volume in the article. However, this heating process also aids in making the mixture form stable while fresh (immediately after molding) by allowing the surface to gain strength quickly. Of course, this heating aids in rapidly removing significant amounts of the water from the mixture. The result of these advantages is that the use of the heating process can ease the manufacturing of the present articles.

2. Increasing the Form Stability.

One of the novel features of the present invention is the ability to create articles that are form stable almost immediately upon formation. The form stability of the article can be increased by heating the moldable mixture by means of heated dies for a sufficient period of time to improve the form stability of the article. In order to achieve the appropriate rheology or flow properties varying amounts of water are added to the moldable mixture. At least a portion of the water can quickly be removed by evaporation, thereby decreasing the volume percent of water and increasing the form stability of the molded article.

Furthermore, removing water on the surface of a molded article causes the surface to be locally dry, which not only decreases the stickiness of the moldable mixture but also forms a reasonably strong thin "shell" around the article, which also increases the form stability. The heating of the moldable mixture also increases the rate of gelling or hardening of the organic binders.

The ability to rapidly increase the form stability of the article while it is fresh is important, as it permits mass production of the articles. Form stability allows the articles to be quickly removed from the molding apparatus so that new articles can be formed using the same pressing or molding equipment.

Another purpose for increasing the temperature of the dies is to minimize adherence of the moldable mixture to the dies. As the steam is emitted from the moldable mixture, it creates a "cushion" between the dies and the moldable mixture. This steam boundary layer provides a substantially uniform force that pushes the moldable mixture away from the die and, thus, prevents the moldable mixture from sticking to the dies. It has also been found that if the male and female dies have varying temperatures, the moldable material will tend to remain on the die with the lower temperature upon separation of the dies.

The respective temperatures of the dies are preferably adjusted to maximize the speed of the manufacturing process and are dependent, in part, upon the duration that the dies are in contact with moldable material. In general, it is desirable that the temperature be as high as possible: the higher the temperature, the faster the drying on the surface of the molded articles, the quicker the articles can be demolded, and the more articles that can be manufactured per unit time.

Increasing the temperature beyond a certain point, however, may cause the water throughout the moldable mixture, not just on the surface of the article, to turn to steam. The sudden release in pressure associated with demolding can result in the cracking, or even explosion, of the molded article once the dies are separated. However, the negative effects of higher temperatures can often be avoided by faster closing and opening speeds of the press.

Moreover, the faster the moldable material dries or hardens, the greater the likelihood of a deformity forming within the article as a result of differential flow. That is, as the dies are pressed together, the moldable material flows into the desired shape. However, once the moldable mixture on the surface of a article starts to dry, the drier portion has different flow properties than the remaining wet moldable material. The differential in flow properties can result in deformities such as agglomerates, voids, cracks, and other irregularities in the structural matrix of the molded article.

In general, the interrelationship between time and temperature is that the temperature of the dies can be increased as the time that the dies are in contact with the moldable mixture is decreased. In addition, the temperature can be increased as the amount of water within the moldable mixture is increased.

To achieve the above desired objectives, it is preferable to heat the female and male die to a temperature within the range from between about 50° C. to about 250° C., more preferably to between about 75° C. to about 160° C., and most preferably to between about 120° C. to about 140° C. For ease in demolding, it is usually desirable for the article to remain on the male die after separation of the dies. Accordingly, the male die preferably has a lower temperature than the female die. The temperature variance between the female die and male die should preferably be in the range from about 10° C. to about 30° C.

The duration in which the heated male die and the heated female die are both in contact with the moldable material (i.e., the time that the dies are mated) is preferably within the range from about 0.05 seconds to about 30 seconds, more preferably between about 0.7 seconds to about 10 seconds, and most preferably between about 0.8 seconds to about 5 seconds.

In an alternative embodiment, the step of heating the article further includes exposing the molded article to heated air after the dies are separated, but before the article is removed from the die, that is, while the article is supported on the male die. Exposure to heated air increases the form stability of the article before it is removed from the die.

Certain binders may liquify near room temperature and stiffen if cooled. Hence, the yield stress of certain moldable mixtures may increase if cooled significantly below the original mixing temperature. In such cases, the form stability of the molded article can be increased by cooling the dies. In addition, by heating the mixture prior to pressing and then cooling the dies, a thin film of water can condense between the article and dies, thus inhibiting the article from adhering to the dies. In such cases, the dies are cooled to a temperature within a range from about −20° C. to about 40° C., more preferably within a range from about −5° C. to about 35° C., and most preferably within a range from about 0° C. to about 30° C.

In yet another embodiment, form stability can be established through rapid evaporation of nonhydrating, volatile solvents. By mixing the moldable material and other desired additives with the minimal amount of water needed for hydration of the binder and then adding an appropriate volatile solvent to the mixture, one is able to obtain a mixture that is easily moldable and that results in a high-strength article. Once the mixture has been positioned into the desired shape, the volatile solvent can be quickly removed by evaporation, thereby producing a form stable article that can be quickly removed from the mold. The volatile solvents are preferably soluble in water and uniformly dispersed in the mixture. By way of example and not by limitation, the volatile solvents include alcohols, e.g., methanol, ethanol, n-propanol, n-butanol, and n-pentanol. Such solvents are typically added in a range from about 2% and about 50% by volume of water.

Other additives which assist in rapidly producing a form stable article containing a hydraulically settable inorganic aggregate include various carbonate sources and accelerators. As previously discussed, the addition of various sources of carbonate, such as $CO_2$, result in a mixture that obtains early strength or form stability. Sodium carbonate and potassium carbonate can also be added to the mixture so as to obtain early form stability of the article. Typically, the carbonates are added to the mixture in a range from about 0.002% to about 0.5% by weight of the water, with 0.01% to about 0.15% being preferred, and 0.1% to about 0.15% being most preferred. Similarly, citric acid can also be incorporated into the mixture for obtaining early form stability. Citric acid is typically added by weight of cement in a range from about 0.01% to about 5%, with 0.05% to about 1% being preferred, and 0.1% to about 0.2% being most preferred.

The various organic binders also function to increase form stability of the article. Cellulose admixtures such as methylethylcellulose, methylcellulose, and ethylcellulose form a gel upon being heated to temperatures above about 60° C. By combining cellulose admixtures to the moldable mixture and then heating the mixture through the heated dies or other means of heat transfer, the resulting gel can assist in imparting form stability to the molded article. To be affective in creating form stability, the methylcellulose should be combined to the mixture in a range from about 0.1% to about 10% by weight of the moldable mixture.

Starch can also be combined with the methylcellulose or can be combined separately with the mixture to impart form stability to the molded article. Heating a mixture containing starch to a temperature above 100° C. melts or dissolves the starch. Allowing the mixture to cool permits the starch to solidify, which binds the cement particles and aggregate into an increased form stable condition. To be affective as a binding agent, the starch should be combined with the mixture in a range from about 0.1% to about 10% by weight of the moldable mixture. The combination of starch and methylcellulose thus increases form stability during both the heating and cooling stages of the molding process.

As previously discussed, set accelerators used in the concrete art can be added to a moldable mixture containing hydraulically settable inorganic aggregates to speed up the hydration reaction of hydraulic settable inorganic aggregates. These may be used to increase the form stability of the molded article.

In terms of the final strength of the hardened article, conventional structural techniques may be used to increase the ultimate strength of the molded article. For example, relatively thin walls of a molded article may be reinforced using a variety of structures (such as a honeycomb, angular or square reinforcing rods, triangularly shaped forms, I-beams, and corrugated materials) for added strength.

3. Demolding the Molded Article.

The molded article may be removed from the dies upon obtaining sufficient form stability. In a preferred embodiment, the molded article will remain on the male die as the dies are separated. In addition, the male and female dies are preferably rotated in opposite directions upon separation to prevent adhesion of the article to the dies.

As previously discussed, once the dies are separated, heated air can be blown over the article for a few seconds to further increase form stability. The article can then be removed from the male die without deformation. In the preferred embodiment, a standard process known as airveying is used to remove the article from the male die. Airveying is a process in which a negative pressure is applied to the article for sucking the article from off the die. The article then travels through a "U" shaped tube that deposits the article right side up.

The airveying process is preferable due to its gentle handling of the form stable article and its low operating and capital costs. Heating air which is present to dry article may be used to provide the bulk air transport carrying the article through the length of the tubes. Air ducts positioned through the male die can also be used to inject air between the mold and the article to provide a uniform force to push the article off the male die. The air inserted through the air ducts must have sufficiently low pressure to avoid damage to the molded article.

In an alternative embodiment, the article can be mechanically removed from the male die by simply picking up the article. Such a process, however, requires exceptional care so as not to deform the molded article.

4. Optional Processes.

The articles can be optionally dried in an accelerated manner, coated, and can receive printing indicia. It may also be desirable to laminate, corrugate, score, or perforate a portion of the article.

(a) Accelerated Drying

The term "drying", as used in this specification and the appended claims, includes removing water by vaporization and does not involve significant draining of liquid water (as in the manufacture of paper). Therefore, all nonvolatile yet water-soluble components remain within the organically filled matrix. The articles can dry at ambient temperatures and can even be stacked after formation by a custom automatic stacker at the end of a manufacturing line while continuing to dry. The articles can be collected, sealed, marked, stacked and wrapped in standard carton handling/palletizing equipment for subsequent shipment as the drying process continues.

The drying process can optionally be accelerated to increase the strength of the molded article. In general, once the article is formed, it must be dried in order to gain strength in the desired shape. To economically produce the articles of the present invention, the articles must be rapidly dried to a point where they have sufficient strength to proceed through the remaining manufacturing processes, i.e., printing, coating, and packaging, without deformation. Furthermore, the article must gain sufficient strength for its intended use. Of course, the required strength will vary depending on the type of article manufactured.

In a preferred embodiment, drying the article or sheet is accomplished by exposing the article to heated air, such as in a conventional drying tunnel. The drying tunnel can be configured either for batch mode drying or for a continuous conveyor process. The application of heated air drives off a portion of the water in the moldable mixture, thereby increasing the friction forces between the particles, creating a bonding film of organic binder, and increasing the strength of the resulting article. In addition, the heating of the moldable mixture also increases the rate of gelling or hardening of the organic binders and may also increase the rate of hydration of the hydraulically settable inorganic aggregate which, in turn, may impart earlier strength to the article.

To increase the rate at which water is removed from the moldable mixture, the heated air is blown over the article. The air speed, however, must not be so great as to deform the molded article. Ideally, the article is dried only to the extent that it has sufficient strength for production and transport without deformation. By permitting an article to retain a small amount of water, it will continue to harden and, thus, increase in strength during the time period it is transported and stored prior to use.

It is the ability to rapidly harden the articles that makes it possible to economically complete their mass production. Drying of the articles is influenced by five different parameters: time, temperature, air speed, surface area, and thickness of the material. Empirical studies have made the following conclusions with regard to these parameters:

1) Higher temperatures and air speeds allow for shorter drying times.
2) Upon removing a majority of the water from the article, exposing the article to temperatures above 250° C. may burn the fibers and organic binder, thereby decreasing the strength of the article.
4) Thinner walled articles require shorter drying times.
5) Higher temperatures result in lower tensile strength of the article.
6) Air speed and total time in the oven have no effect on the tensile strength of the article.

Based on the above observations, the recommended drying conditions for a molded article having a thickness in a range from about 1 mm to about 2 mm includes heating the air in the oven to a temperature in a range from about 100° C. to about 300° C., with about 140° C. to about 250° C. being more preferable, and about 150° C. to about 200° C. being most preferable. The time period during which the article is exposed to heated air can range up to about 1 hour, with less than about 15 minutes being more preferable, and less than about 1 minute being most preferable. The above values, however, may differ depending on the size, shape, thickness, and water content of the article.

In an alternative embodiment, since the fibers do not burn in the mixture at temperatures above 250° C. until a majority of the water is removed, the drying process can also be accomplished in two stages. First the article can be exposed to temperatures above 250° C., typically in the range between about 250° C. and about 500° C., so as to rapidly remove a portion of the water. Once between about 60% to about 80% of the water has been removed, the temperature is decreased to below 250° C. to remove the remainder of the water. This process increases the rate at which the article is dried but must be regulated with greater care so as not to burn the fibers. Of course, other conventional means for drying the articles (e.g., microwaves, infrared light, and the like) may be used.

(b) Coating

It is within the scope of the present invention to apply coatings or coating materials to the articles or, where applicable, to the sheets used to make the articles. Coatings can be used to alter the surface characteristics of the articles or sheets in a number of ways, including sealing and protecting the sheet or article. Coatings may provide protection against moisture, base, acid, grease, or organic solvents. They may also provide a smoother, glossier, or scuff-resistant surface and help prevent fiber "fly away". Coatings may provide reflective, electrically conductive, or insulative properties. They may even reinforce the sheet or article, particularly at a bend, fold, edge or corner. Some of the coatings can also be utilized as laminating materials or as adhesives.

Related to the concept of coating is the "sizing" of the sheet or article, which essentially refers to the sealing of the pores of the structural matrix. Sizing can be used to improve the smoothness and water resistance of the article or sheets. They can either increase or decrease the strength, modulus, and elongation (or extensibility) depending on their composition and amount used. Some sizings or coatings may soften the moldable matrix, thereby resulting in a more flexible article or sheet. Others may make the article more stiff.

The object of the coating process is usually to achieve a uniform film with minimal defects on the surface of the sheet or article. Coatings can be applied during the sheet forming process, the article forming process, or after the article is formed. The selection of a particular coating process depends on a number of substrate (i.e., sheet or article) variables, as well as coating formulation variables. The substrate variables include the strength, wetability, porosity, density, smoothness, and uniformity of the sheet or article. The coating formulation variables include total solids content, solvent base (including water solubility and volatility), surface tension, and rheology.

The coatings may be applied to the sheets or article using any coating means known in the art of manufacturing paper, paperboard plastic, polystyrene, sheet metal, or other packaging materials, including blade, puddle, air-knife, printing, Dahlgren, gravure, and powder coating. Coatings may also be applied by spraying the sheet or article with any of the coating materials listed below or by dipping the sheet or article into a vat containing an appropriate coating material. Finally, coatings may be coextruded along with the sheet in order to integrate the coating process with the extrusion process.

Appropriate organic coatings include edible oils, melamine, polyvinyl chloride, polyvinyl alcohol, polyvinyl acetate, polyacrylates, polyamides, hydroxypropylmethylcellulose, polyethylene glycol, acrylics, polyurethane, polyethylene, polylactic acid, Biopol® (a polyhydroxybutyrate-hydroxyvalerate copolymer), starches, soybean protein, polyethylene, and synthetic polymers including biodegradable polymers, waxes (such as beeswax or petroleum based wax), elastomers and mixtures thereof. Biopol® is manufactured by ICI in the United Kingdom. Appropriate inorganic coatings include sodium silicate, calcium carbonate, aluminum oxide, silicon oxide, kaolin, clay, ceramic and mixtures thereof. The inorganic coatings may also be mixed with one or more of the organic coatings.

In some cases, it may be preferable for the coating to be elastomeric or deformable, particularly for articles formed by folding or convoluting. Elastomeric coatings may be useful to strengthen an area where the article will be subject to severe bending, such as in a hinge.

A waterproof coating is desirable for articles intended to be in contact with water. If the sheets are used to manufacture article intended to come into contact with foodstuffs, the coating material will preferably comprise an FDA-approved coating. An example of a particularly useful coating is sodium silicate, which is acid resistant. Resistance to acidity is important, for example, where the article is a container exposed to foods or drinks having a high acid content, such as soft drinks or juices. Increased resistance to basic substances can be provided by an appropriate polymer or wax coating, such as those used to coat paper articles.

Polymeric coatings, such as polyethylene, are useful in forming generally thin layers having low density. Low density polyethylene is especially useful in creating articles which are liquid-tight and even pressure-tight to a certain extent. Polymeric coatings can also be utilized as an adhesive when heat sealed. Aluminum oxide and silicon oxide are useful coatings, particularly as a barrier to oxygen and moisture. The coatings can be applied to the sheet or article by any means known in the art, including the use of a high energy electron beam evaporation process, chemical plasma deposition, and sputtering. Another method of forming an aluminum oxide or silicon oxide coating involves the treating of the sheet with an aqueous solution having an appropriate pH level to cause the formation of aluminum oxide or silicon oxide on the sheet.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

(c) Printing

It may be desirable to apply print or other indicia, such as trademarks, product information, article specifications, or logos, on the surface of the article or sheet used to make such. This can be accomplished using any conventional printing means or processes known in the art of printing paper or cardboard products, including planographic, relief, intaglio, porous, and impactless printing. Conventional printers include offset, Van Dam, laser, direct transfer contact, and thermographic printers. However, essentially any hand or mechanical means can be used. In addition, the sheets or articles may be embossed or provided with a watermark.

Because the articles have a relatively high porosity like paper or cardboard, the applied ink will tend to dry rapidly. One skilled in the art will appreciate that the surface porosity and ink quantities must be compatible. In addition, decals, labels or other indicia can be attached or adhered to the article using methods known in the art.

IV. Specific Molding Processes.

A. The Die Press Molding Process.

The terms "die pressing" or "die press molding" shall refer in the specification and the appended claims to the compression of an amorphous mass of the inorganically filled moldable mixture between matched or complementary dies to form an article. The steps include positioning, forming, imparting form stability, removing, and hardening.

1. Positioning.

Figure 2:
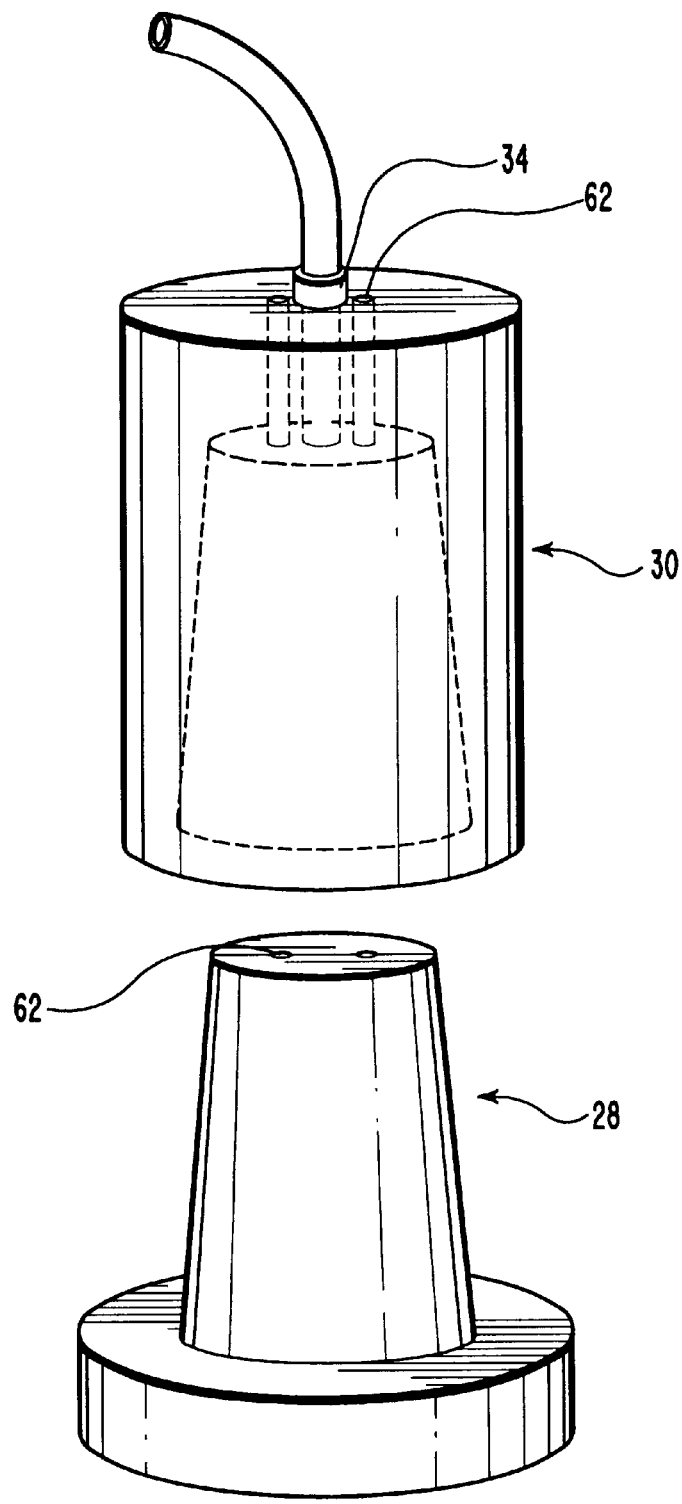
FIG. 2 is a schematic view of a male die and female die used in the die pressing process.

After the moldable mixture has been prepared as discussed above, it is positioned between a set of dies for shaping into the desired shape of the article. As shown in FIG. 2, the dies comprise a male die 28 having a desired shape and a female die 30 having a shape substantially complementary to that of male die 28. Male die 28 and female die 30 together comprise the die pressing mold. As the moldable mixture is pressed between the dies, it is formed into an article having a shape corresponding to the space between the male and female dies.

Figure 2A:
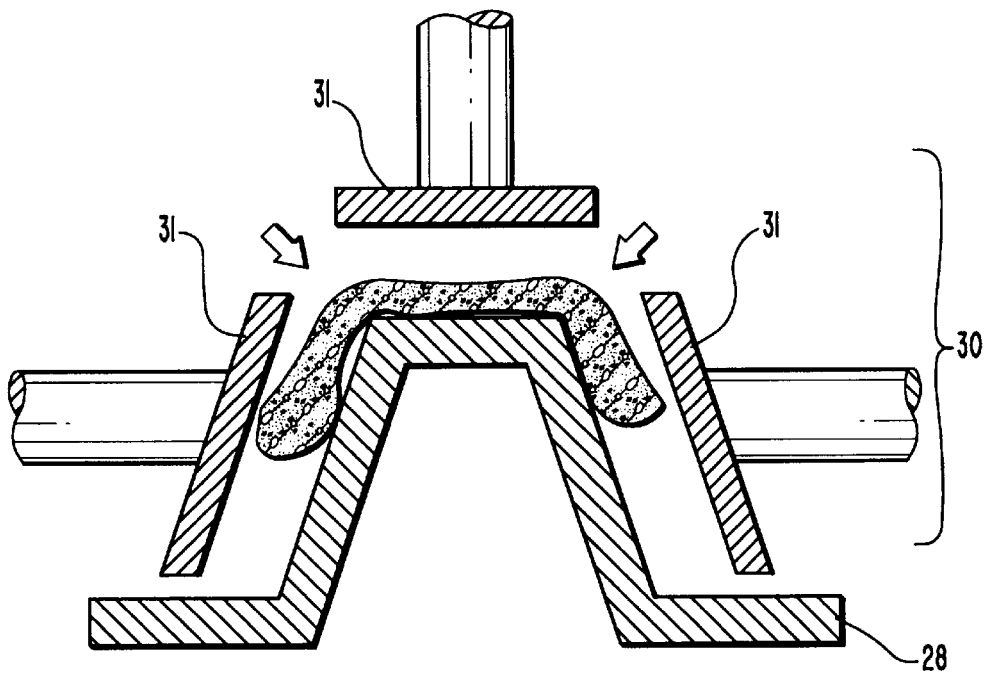
FIG. 2A is a cross-sectional view of a split die.
Figure 2B:
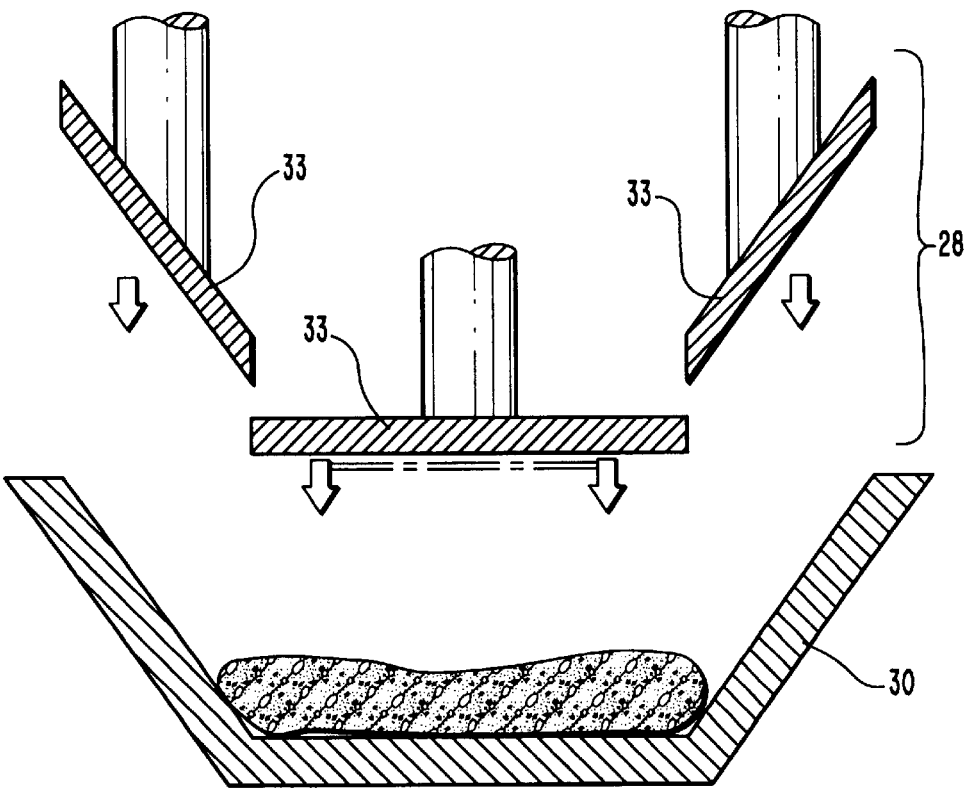
FIG. 2B is a cross-sectional view of a progressive die.

Depending on the desired shape of the article, alternative type of dies may be used. A split die 31, as seen in FIG. 2A, is a multi-component die whose components simultaneously press together at different angles to form complex shapes, especially those with negative angles, that can be easily separated from the die. In contrast, a progressive die 33, as seen in FIG. 2B, is a multi-component die whose various components press together in a delayed sequential fashion, thereby forming the article in sections. The use of progressive die 33 helps eliminate air pockets in articles with a deep draw or complex shape. Alternatively, a conventional collapsible die can also be used. The various dies can be used in combination to form a desired article.

Figure 3:
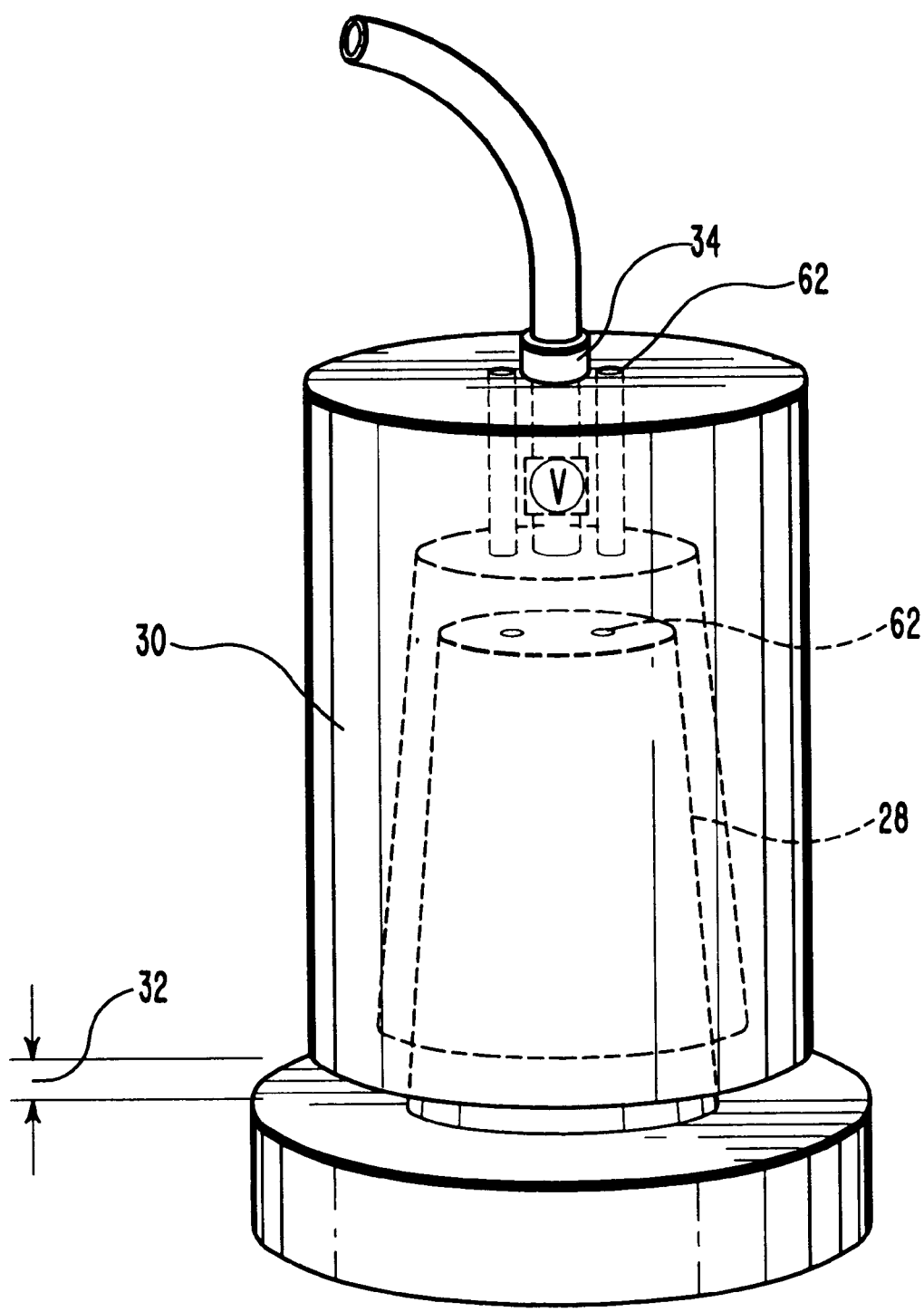
FIG. 3 is a schematic view of a male die and a female die partially mated to form a gap distance.

The present invention envisions two general methods for positioning the moldable mixture between male die 28 and female die 30. In the preferred embodiment shown in FIG. 3, male die 28 is partially inserted into female die 30 such that a gap distance 32 is created between the dies. "Gap distance 32" is defined as the distance one die must travel with respect to the other die for mating of the dies. The dies are "mated" when they are inserted into one another so as to form a mold area between the dies. The "mold area" defines the desired shape of the article and is the area that the moldable mixture is pushed into when the dies are mated.

When the dies are positioned so as to have a gap distance, a cavity remains between the dies. This "cavity" comprises the mold area between the dies, and a second area also between the dies which corresponds to the gap distance. Once the cavity is formed, the moldable mixture can be positioned into the cavity, and thus between the dies, by being injected through a hole in one of the dies or through the gap distance.

In a preferred embodiment, female die 30 is positioned vertically above male die 28. The mixture is then injected between the dies through an injection port 34 extending through female die 30. The arrangement of having female die 30 above male die 28 is preferred, since after the forming of the article the dies are separated, and the force of gravity assists in insuring that the article remains on male die 28. This is beneficial, as it is easier to subsequently remove the article from male die 28 without deforming the article.

In the alternative, however, the dies can also be positioned with male die 28 vertically above the female die 30. This arrangement is preferred when the mixture has a low viscosity, since female die 30 can function as a container for holding the moldable mixture prior to mating of the dies.

Before positioning the moldable mixture, it is preferable to minimize gap distance 32 between the dies so as to limit the movement of the mixture during the final pressing or mating of the dies. Minimizing the movement of the mixture decreases the chance of irregularities in the final article as a result of differential flow in the mixture.

Gap distance 32 between male die 28 and female die 30 is typically in a range of about 2 mm to about 5 cm, with 2 mm to about 3 cm being preferred, and 2 mm to about 1 cm being most preferred. It should be noted, however, that for unusually large objects, gap distance 32 may be much larger to facilitate positioning of the moldable mixture.

The moldable mixture is preferably positioned between the dies by a vacuum extruder such as twin auger extruder 12 so that unwanted air trapped within the mixture can be removed. Failure to remove such air (unless the air is desired to create voids to impart insulation properties) can result in the article having a defective or nonhomogeneous structure matrix.

Figure 4:
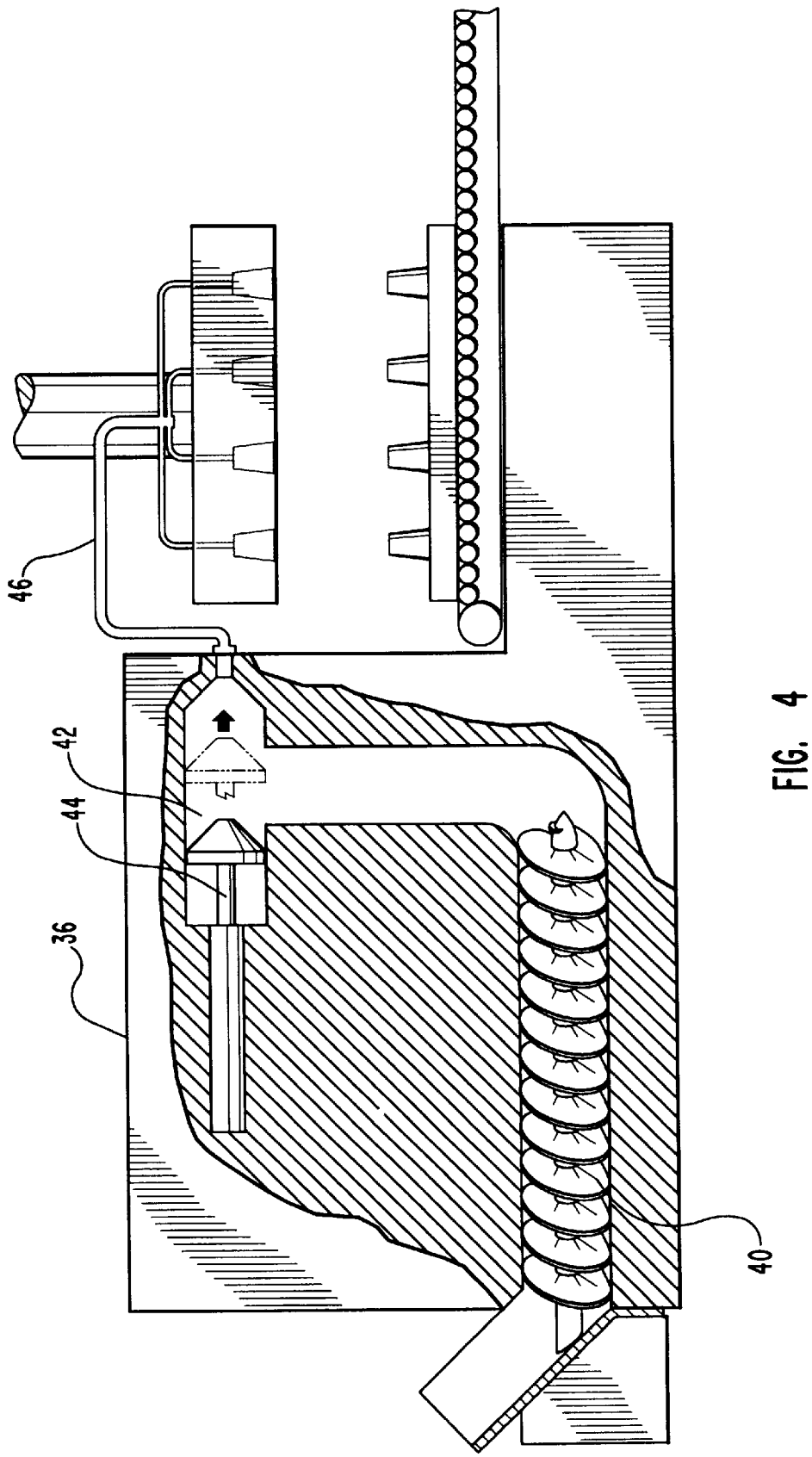
FIG. 4 is a cross-sectional view of a two-stage injector.

Actual injection of the moldable mixture is typically accomplished by either a two-stage injector or a reciprocating screw injector. As depicted in FIG. 4, a two-stage injector 36 has separate compartments for mixing or advancing and injecting. The mixture is conveyed to an extruder screw 40 which in turn feeds the mixture to a separate shooting pot 42. Once shooting pot 42 is filled, an injection piston 44 pushes a defined quantity of the mixture into a network of flow channels 46 that feed to the partially closed dies. As shown in FIG. 4, a plurality of articles can be simultaneously fashioned.

Figure 5:
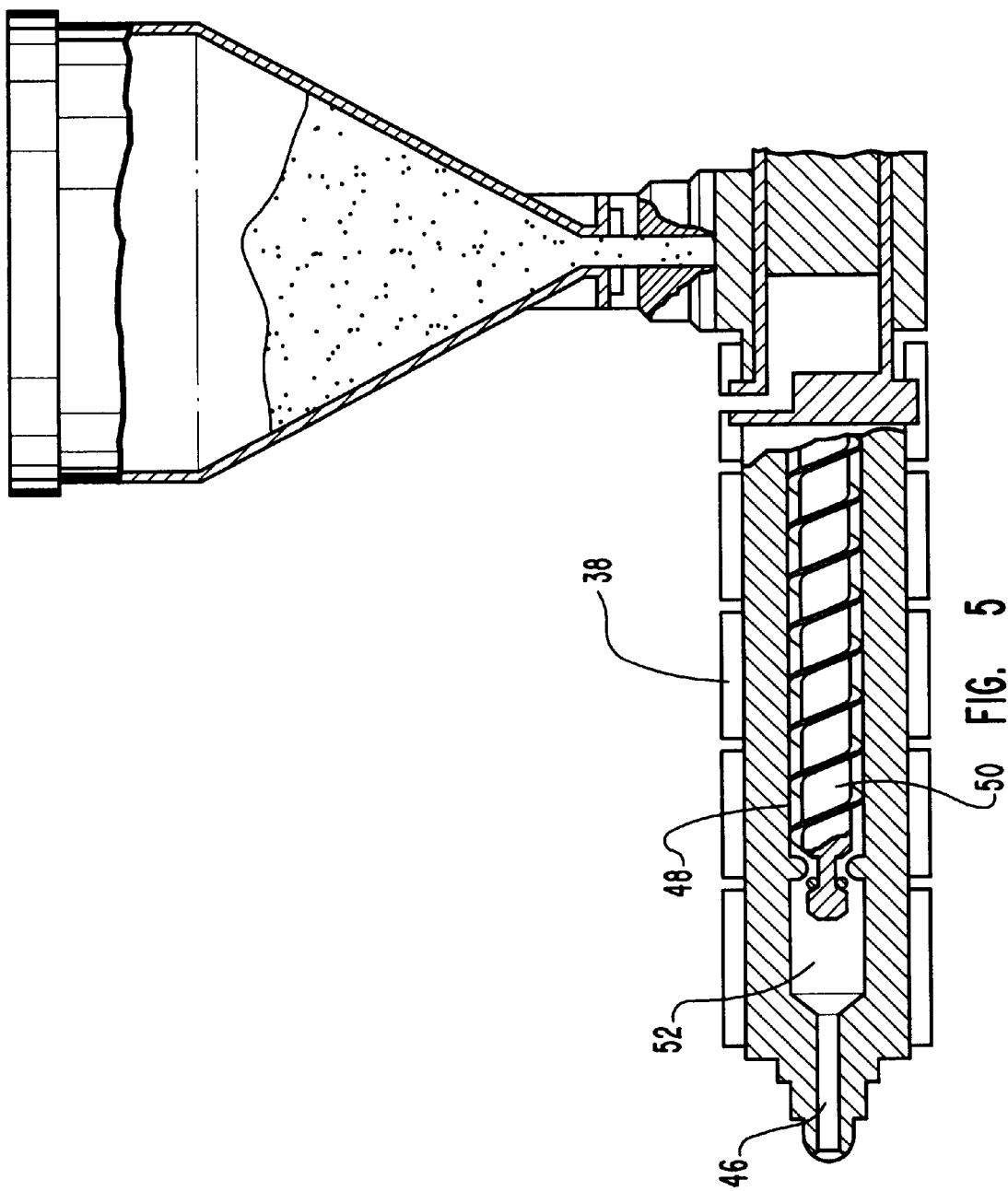
FIG. 5 is a cross-sectional view of a reciprocating screw injector.

As depicted in FIG. 5, a reciprocating screw injector 38 comprises a chamber 48 having a screw auger 50 longitudinally positioned therein. The moldable mixture is fed into chamber 48 and advanced by screw auger 50. As screw auger 50 rotates, it retracts and feeds the mixture to an injection end 52 of screw auger 50. When the required volume of the mixture has accumulated at end 52, screw auger 50 stops rotating and moves forward to inject the mixture into flow channels 46 as previously described.

Figure 6:
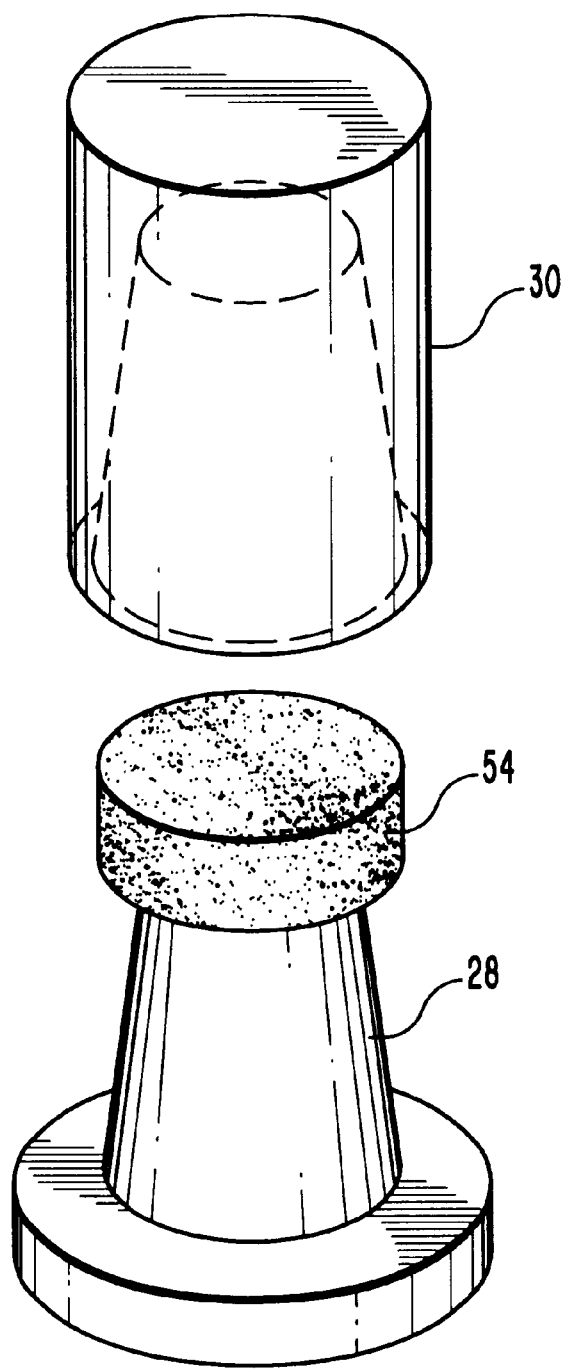
FIG. 6 is a schematic view of the mixture being positioned between the male die and the female die.

The second method for positioning the moldable mixture between the dies is performed while the dies are still fully separated. This method, as shown in FIG. 6, comprises forming a portion of the moldable material into a mass 54, the portion being sufficient to create the desired article, then placing mass 54 between the dies, typically by resting mass 54 on the top of male die 28. Subsequently, as the dies are mated, mass 54 is pressed between the dies.

Figure 7A:
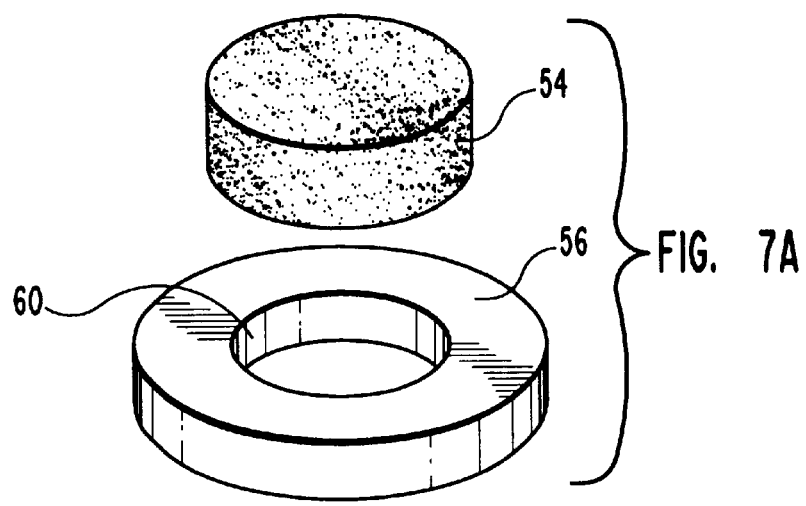
FIGS. 7A–B are a schematic view of a template being used to position the moldable mixture.
Figure 7B:
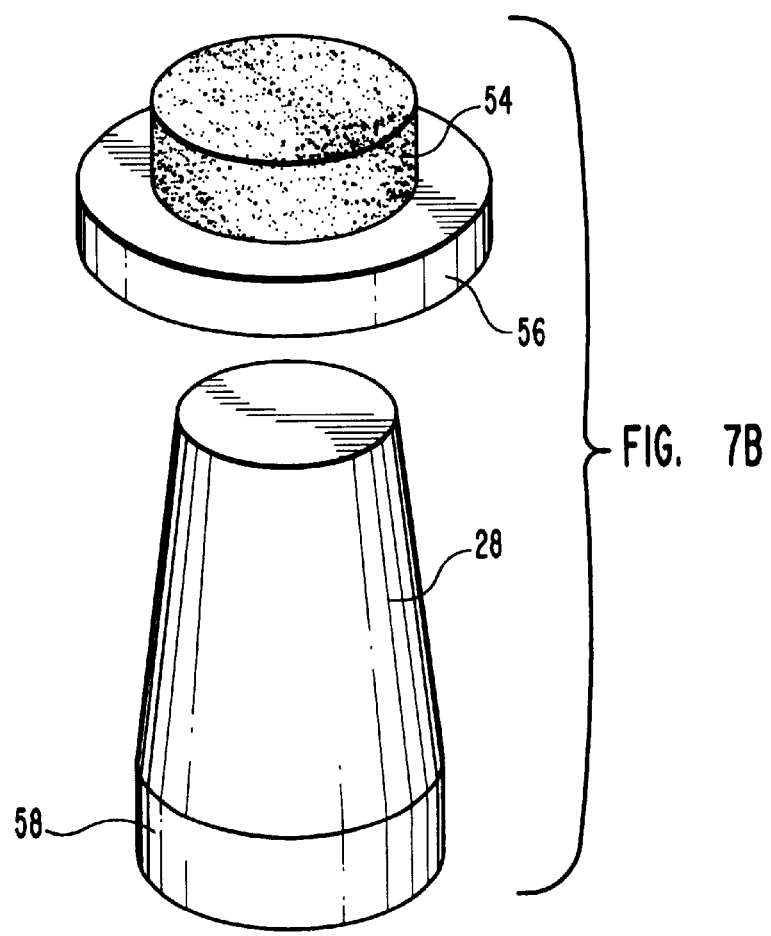

In an alternative embodiment shown in FIGS. 7A–B, a template 56 is used to position mass 54. Male die 28 has a base 58 with a circumference and template 56 has a passage 60 with a perimeter substantially complementary to the circumference of base 58 of male die 28. Mass 54 is formed having a diameter sufficiently large to span passage 60 of template 56. With mass 54 spanning passage 60, template 56 is placed between male die 28 and female die 30 such that passage 60 is complementarily aligned with the dies. Thereby, as the dies are pressed together, male die 28 travels through passage 60 of template 56 in order to press the moldable mixture between the dies.

The above method can further include the step of depositing template 56 onto male die 28, such that template 56 becomes positioned about base 58 of male dies 28 while mass 54 independently rests on male die 28. Subsequently, as the dies are pressed together, mass 54 is again pressed between the dies.

The preferred method for mechanically removing the molded article incorporates using template 56. The article is loaded onto the template via the lip of the article by either lifting template 56 or lowering male die 28. When the article is removed from the dies, the article is form stable due to its dried surface. However, the article will still have a wet mixture between its walls and, thus, it will not have reached its maximum strength. In such a condition, the article is strongest in compression along its vertical axis. Accordingly, the benefit of using template 56 is that the force applied for removing the article is applied along the strongest axis of the article, thereby minimizing possible deformation to the article.

2. Molding.

The next step in the manufacturing process is pressing the moldable mixture between male die 28 and female die 30 in order to mold the moldable mixture into the desired shape of the article. The pressure exerted by the dies forms the moldable mixture into the desired configuration of the article. Accordingly, the pressure must be sufficient to actually mold the moldable mixture between the dies. Furthermore, it is preferable that the pressure be sufficient to produce an article with a uniform and smooth surface finish.

The amount of pressure applied to the moldable mixture may also affect the strength of the resulting article. Research has found that the strength of the resultant product is increased for mixtures where the particles are closer together. The greater the pressure used to press the moldable mixture between the dies, the closer together the particles are pushed, thereby increasing the strength of the resulting article. That is to say, the less porosity that there is in the moldable mixture, the higher the strength of the resulting article.

As high pressures are applied to moldable mixtures with low concentration of water, the space between the particles is decreased. Thus, the water existing within the mixture becomes more effective in encasing the particles and reducing their friction force. In essence, as pressure is applied to a moldable mixture, the mixture becomes more fluid or workable and, thus, less water needs to be added. In turn, the strength of the resulting product is increased. In application to the present invention, the higher the pressure exerted by the dies, the lower the amount of water that needs to be added to the mixture. This principle of pressure also applies to the injection process.

Although a high pressure is generally desirable, it can also have a negative effect. To produce a lightweight article, low density aggregates (such as perlite or hollow glass spheres) are typically added to the mixture. As the pressure exerted by the dies is increased, these aggregates may be crushed, thereby increasing the density of the aggregate and the resulting article, thereby decreasing the insulating effect of the aggregates.

Accordingly, the pressure applied by the dies should be optimized so as to maximize the strength, structural integrity, and low density of the article or container. Within the present invention, the pressure exerted by the male die and the female die on the moldable mixture is preferably within a range from about 50 psi to about 20,000 psi, more preferably from about 100 psi to about 10,000 psi, and most preferably from about 150 psi to about 2000 psi. However, the amount of pressure will vary depending upon the temperature and time of the molding process.

The step of pressing further includes expelling the air from between the dies when the dies are pressed together. Failure to remove such air can result in air pockets or deformities in the structural matrix of the article. Typically, air between the dies is expelled through the gap distance between the dies as the dies are pressed together.

In an alternative embodiment shown in FIG. 2, the dies may have a plurality of vent holes 62 extending through the dies so as to make them permeable. Accordingly, as the dies are pressed together, the air between the dies is expelled through vent holes 62. Vent holes 62 thus prevent air pockets from forming within the cavity which could deform the article.

Vent holes 62 also prevent the creation of a vacuum within the cavity as the dies are separated, by allowing air to return into the cavity. Such a vacuum could exert an undue force on the newly formed article, thereby disrupting its structural integrity. Furthermore, vent holes 62 permit the escape of excess steam created by the heating process. Vent holes 62 can exist in either or both of the dies.

The amount of pressure needed to mold the mixture can also be minimized by designing mixtures which expand and flow to fill the mold similar to batter in a waffle iron. Such mixtures can be designed based on the rheology of the mixture, by incorporating air voids, by controlling the temperature of the mixture and/or increasing the water content. Utilizing mixtures capable of expanding and flowing to conform to the shape of a mold are particularly useful in the production of articles having complex shapes.

B. The Injection Molding Process.

In contrast to die pressing, injection molding entails positioning the moldable mixture under high pressure into a closed die. After the article has obtained form stability, the die is opened and the article removed and allowed to finish hardening. Injection molding requires the use of an injection unit that positions the mixture in a clamping unit. The injection unit typically comprises a reciprocating screw injector 38 (schematically illustrated in FIG. 5) or a two-stage injector 36 (schematically illustrated in FIG. 4) as previously discussed with die pressing. Injection takes place at a predetermined speed and pressure to ensure complete filling of the mold.

Figure 8:
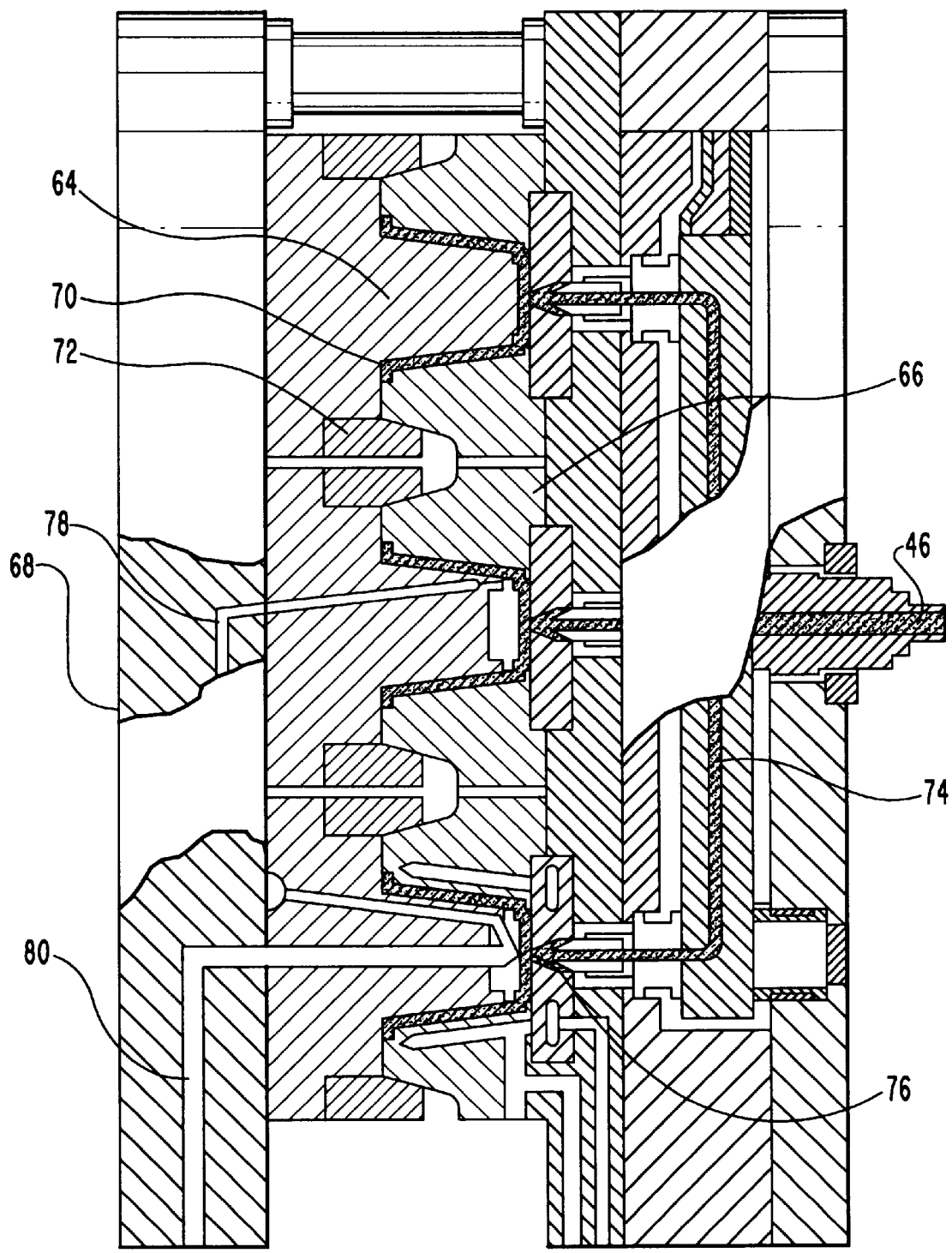
FIG. 8 is a cross-sectional view of an injection molding mold.

As depicted in FIG. 8, the moldable mixture is injected through flow channel 46 into a clamping unit comprising a core 64 being aligned with a cavity 66 having a substantially complementary shape to core 64. As core 64 and cavity 66 are pressed together and held tight by a clamping piston 68, a closed injection molding mold 70 of a desired shape is formed. The clamping unit may form a plurality of closed molds for mass production of a desired article. Locking rings 72 positioned between molds 70 help to align core 64 and cavity 66 as they are pressed together.

Similar to the injection die pressing process, as the mixture is injected, the mixture is forced through a network of flow channels 74 that feed to each closed mold 70 through a gate 76. Air channels 78, also connected to each closed mold 70, permit air to escape as the molds are filled. Once the molds are filled, gates 76 are closed to allow the molded articles to obtain form stability.

To insure consistent quality of the formed article, the clamping unit should be balanced so that it supplies the mixture to each cavity at the same pressure. Flow balance is achieved by ensuring that each flow channel 74 from the injection unit has an equal length and equal number of turns. Molds with up to about 64 cavities operate reliably with this balanced approach.

The injection molding process is most often used for thin walled articles having relatively large length-to-thickness ratios, e.g., thin-walled yogurt and margarine containers. Length is the maximum flow length in the cavity, and thickness is the average wall thickness of the part. Such ratios can be as high as 400:1. To mass produce the articles and to insure that the mold is properly filled and the matrix uniform, the mixture is injected under a pressure in a range between about 500 psi to about 40,000 psi, with about 10,000 psi to about 35,000 psi being preferred, and about 25,000 psi to about 30,000 psi being most preferred. The amount of pressure applied depends in part on the viscosity of the mixture; the higher the viscosity, the greater the pressure required.

The same principles, methods, and parameters for removal of air from the mixture, molding the mixture under pressure, and imparting form stability to the article, as discussed above, are relevant to the injection molding process. For example, as depicted in FIG. 8, heating lines 80 can be used to convey heated liquids for heating the moldable mixture in closed molds 70, thereby rapidly imparting form stability to the articles.

Finally, the two basic methods for part ejection are mechanical and air ejection. Mechanical ejection commonly uses stripper rings surrounding each mold core to physically push the parts off the core. Air ejection uses blasts of air to loosen and blow the parts off the cores. Air ejection is the more preferred method because it involves fewer moving parts and thus less maintenance. Also, parts can be made thinner and ejected earlier in the cycle because less sidewall strength is required for air ejection compared to mechanical ejection.

C. The Blow Molding Process.

Blow molding is a process used to produce hollow articles, primary bottles. Air, or occasionally nitrogen, is used to expand a quantity of moldable mixture called a parison against a female mold cavity. The two fundamental blow molding process that are applicable to the moldable mixture of the present invention include injection blow molding and extrusion blow molding.

1. Injection Blow Molding.

Figure 9:
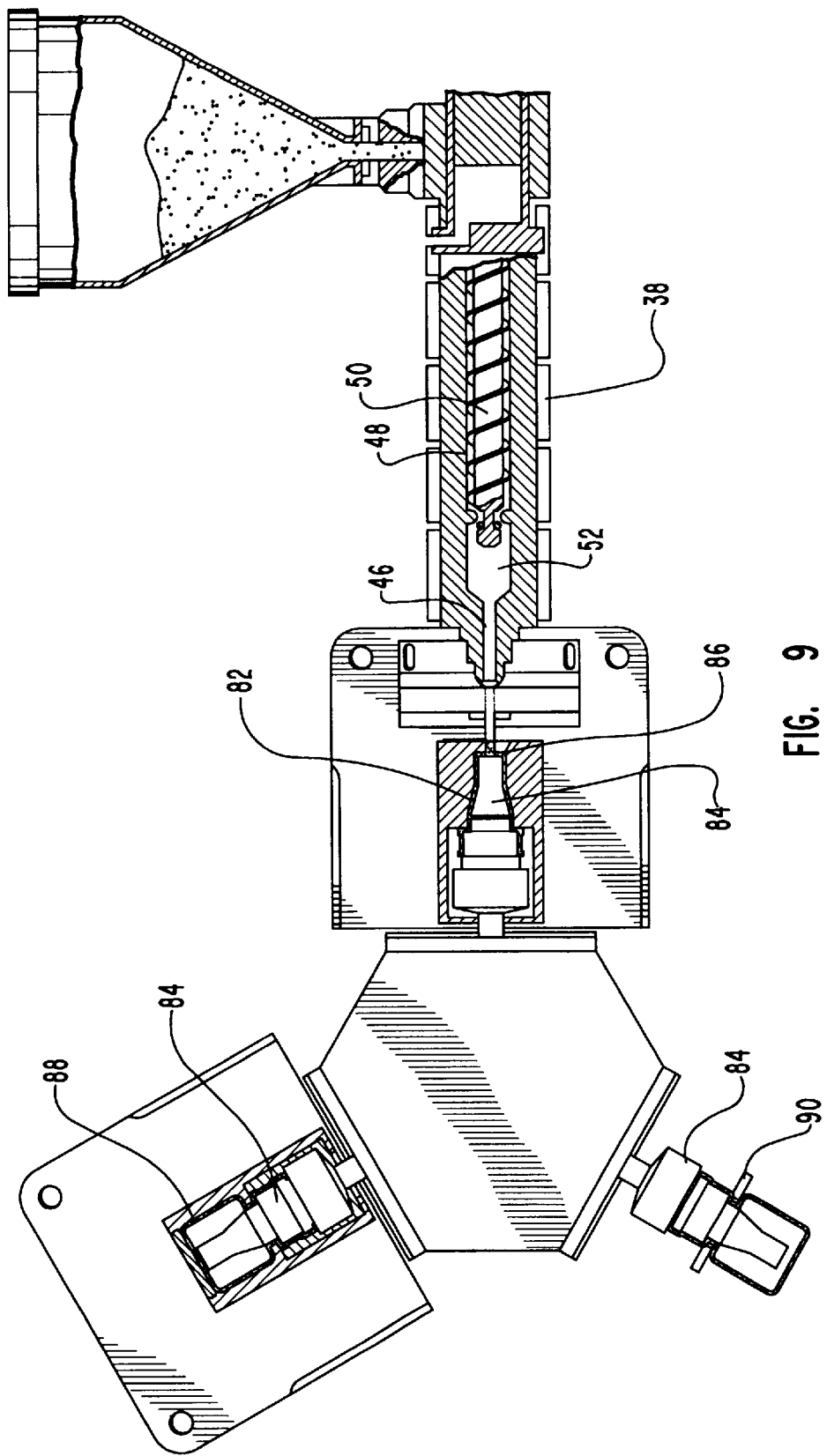
FIG. 9 is a schematic view of the three stages used in injection blow molding.
Figures 10D, 10E, 10F:
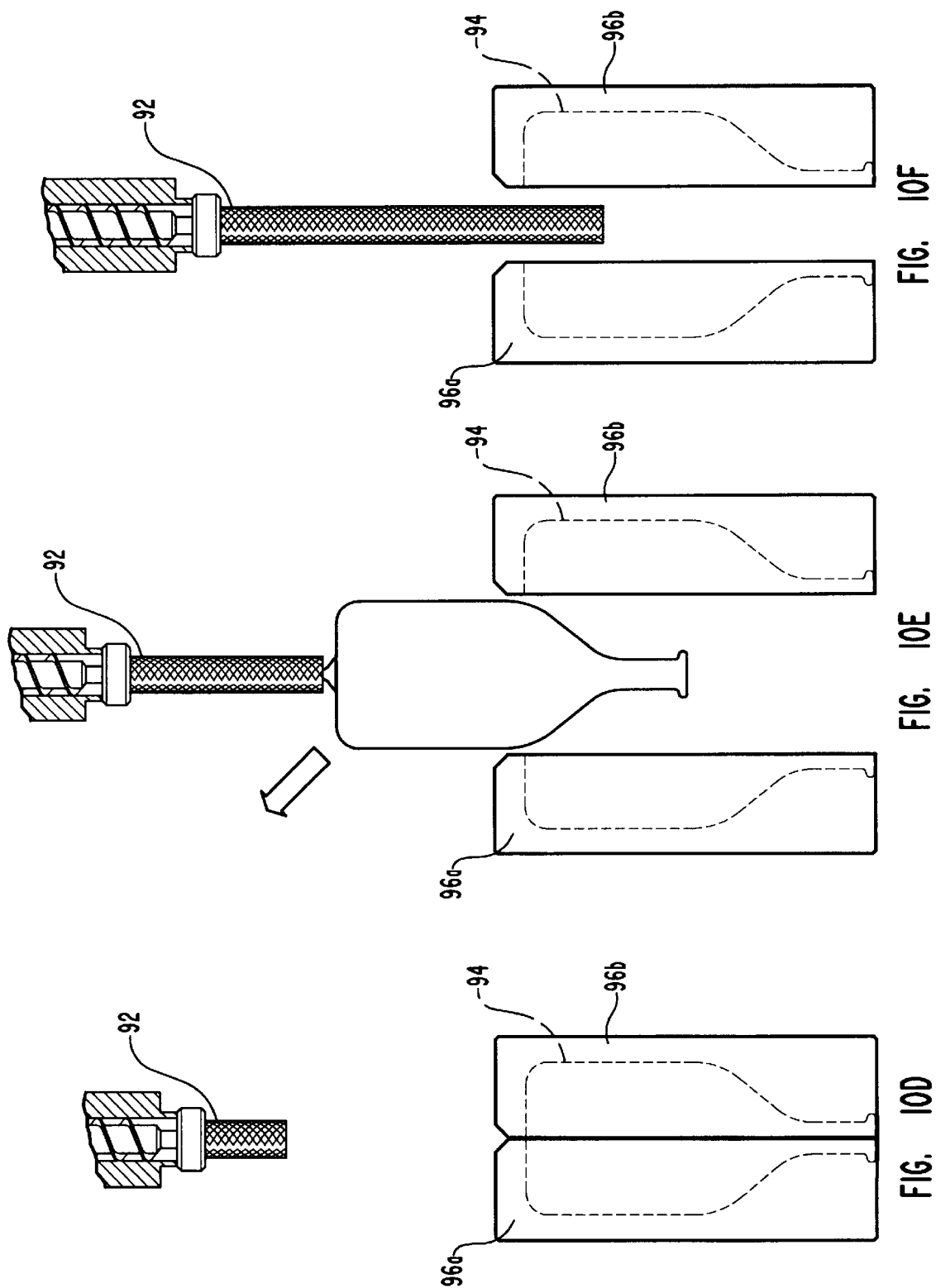
Figure 11A:
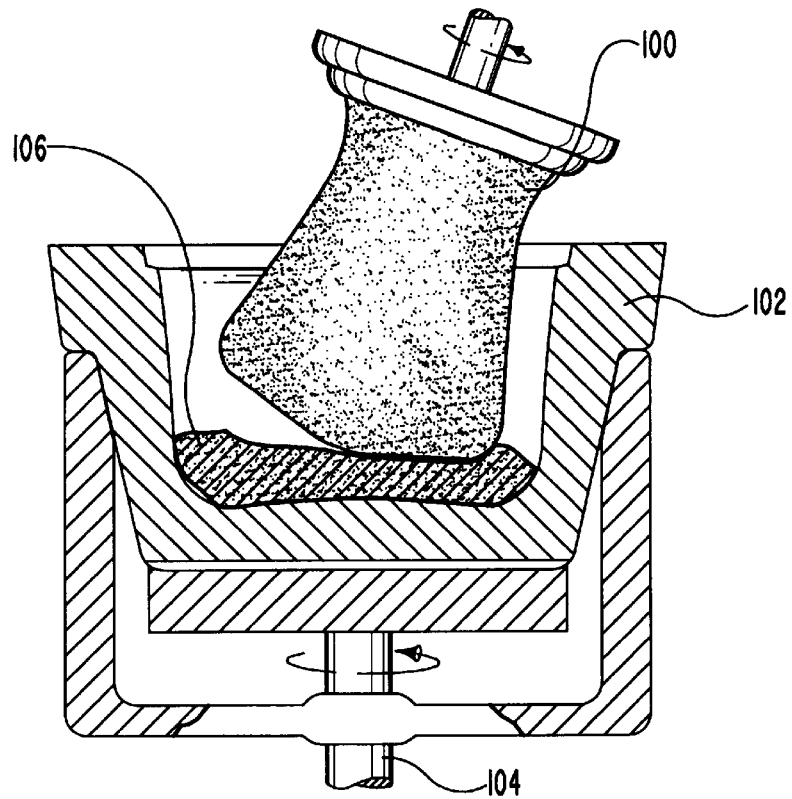
FIGS. 11A–D illustrate the processing stages in jiggering.
Figure 11B:
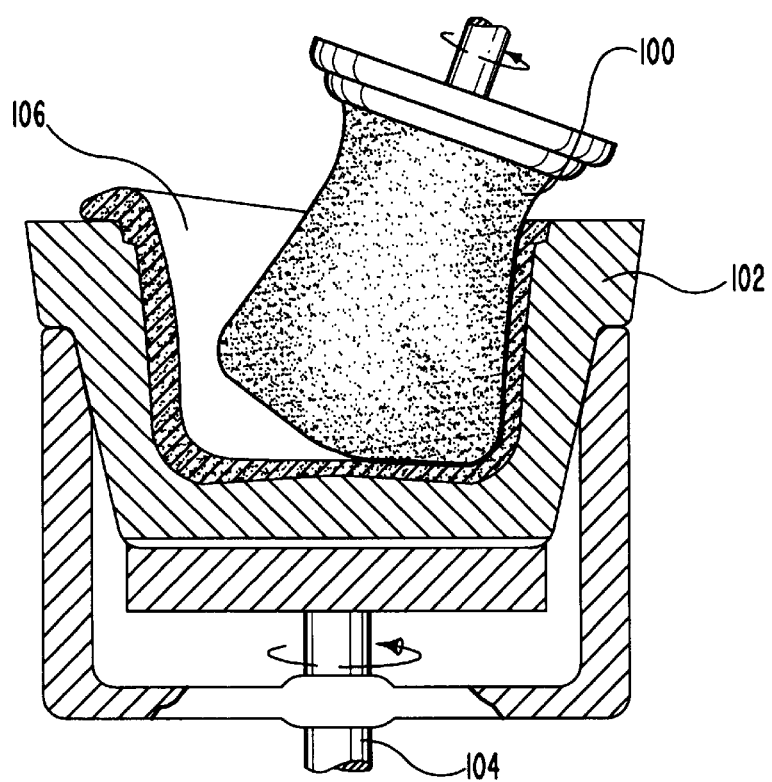
Figure 11C:
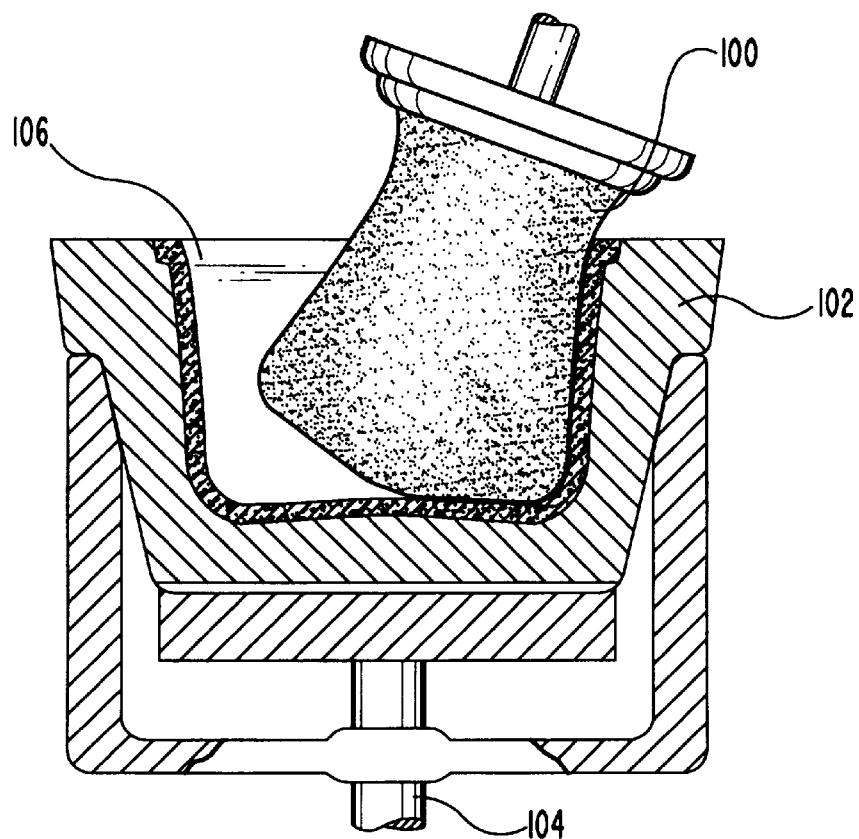
Figure 11D:
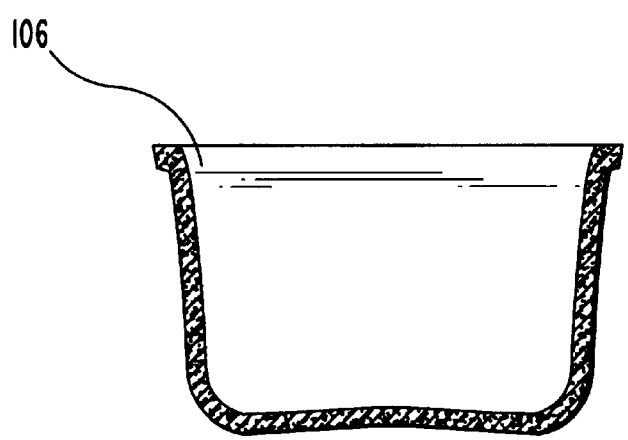

The injection blow molding process is depicted in FIG. 9 as being carried out in a three stage process. In the first stage, reciprocating screw injector 38, as previously discussed, injects the mixture through injection passage 46, into a parison cavity 82, and around a core rod 84 positioned therein. The resulting injection-molded "test tube" shaped parison 86 is then transferred on core rod 84 into injection blow molding mold 88 having the desired shape of the article. In stage two, air is blown through core rod 84 expanding parison 86 against the cavity of mold 88. The molded article is then allowed to obtain form stability. Finally, in stage three, the article is removed from mold 88 and subsequently stripped from core rod 84 by a stripper plate 90 positioned about core rod 84.

Injection blow molding is generally used for small bottles, usually less than ½ liter capacity. The process is scrap-free with extremely accurate part-weight control and neck-finish detail.

2. Extrusion Blow Molding.

As shown in FIGS. 1 OA-F, in extrusion blow molding once the moldable mixture is prepared, the mixture is extruded as a tube 92 into free air. Extruding can be accomplished through a continuous or intermittent extruder as previously discussed depending on the desired manufacturing process. Tube 92, also called a parison, is captured in a cavity 94 between two halves 96a and 96b of an extrusion blow molding mold 96 having a desired shape. A blow pin 98 (not shown) is then inserted into tube 92 through which air enters, as indicated by arrow 98, and expands tube 92 against the mold cavity 94. Once the mixture is blown into its desired shape, the article is allowed to obtain form stability. The two halves of mold 96 are then separated and the article is removed for hardening. Unlike injection blow molding, flash is a by-product of the process which must be trimmed and reclaimed. Flash is formed when tube 92 is pinched together and sealed by two halves 96 of the mold.

For the moldable mixture of the present invention to function with the above described blow molding processes, the mixture must have a sufficiently high viscosity for a self support parison while at the same time have sufficient elasticity to expand under blowing into the desired shape of the article. As previously discussed, the rheology of the moldable mixture can be microstructurally engineered with the addition of a variety of admixtures to possess the desired properties. Such a mixture will typically have a high concentration of organic binder which functions to increase both stability and elasticity.

The same principles, methods, and parameters for removal of air from the mixture, molding the mixture under pressure, imparting form stability to the article, and removal of the article from the mold as discussed above are relevant to the blow molding processes. For example, as with the other processes previously described, form stability of the blow molded article can be achieved through heating of the dies, various set accelerators, or water deficiency.

D. The Jiggering Process.

Jiggering is basically a mechanized version of the potter's wheel and is a process used to make open mouthed, symmetrical articles, e.g., bowels, pots, and plates. As depicted in FIGS. 11A–D, the process requires the use of a roller head 100, jiggering mold 102, and spindle 104. Once the moldable mixture is prepared as previously discussed, an adequate amount of the mixture 106 is fashioned into a disk and positioned at the bottom of mold 102. Fashioning of the mixture 106 into disk is not critical but serves as a uniform object that can be more easily and uniformly molded.

Mixture 106 is positioned in mold 102, after which mold 102 is placed on spindle 104 and rotated thereby. Roller head 100 which is also spinning is then lowered into mold 102 so as to press the moldable mixture 106 against the sides of mold 102. Such a process requires the moldable mixture to have a rheology close to that of clay. Once the material is uniformly dispersed about the surface of mold 102, roller head 100 is removed, any excess material is scraped off from the edge of mold 102, and the molded article is allowed to gain form stability.

In a preferred embodiment, roller head 100 and mold 102 are made of a polished metal so as to produce an article with a smooth finished surface and to help prevent adhesion between the molded mixture and roller head 100 and mold 102. Furthermore, it is also preferred that roller head 100 and mold 102 be capable of being heated, similar to the dye pressing molds, so as to quickly impart form stability to the article while simultaneously creating a steam barrier that limits adhesion of the article to mold 102 and roller head 100. After obtaining form stability, the article can be removed from the mold, such as by blowing air between the mold and article or by mechanical means.

The same principles, methods, and parameters for removal of air from the mixture, molding the mixture under pressure, and imparting form stability to the article as discussed above are relevant to the jiggering processes.

E. Molding Articles From Wet Sheets.

The term "wet sheet molding" as used in the specification and the claims involves at least two molding steps, including first molding a sheet from an inorganically filled moldable mixture and then molding the sheet into an article while the sheet is fresh. Examples of sheet forming methods include extrusion and rolling. Examples of molding a wet inorganically filled sheet include die press molding, vacuum forming, air pressure forming, and twin sheet forming.

The sheet may be formed by extruding a moldable mixture through a die having a width and thickness corresponding to the desired dimensions of the sheet. The term "extrusion" as used in the specification and the appended claims includes the passing of an inorganically filled mixture through a die to form an article having an appropriate form, such as a sheet. One of ordinary skill in the art will appreciate that the extrusion of the inorganically filled mixture need not formerly employ the use of an "extruder" as the term is used in the art. The purpose of the extrusion step can be achieved with extruders such as piston extruders and auger extruders or by other mechanisms known to those skilled in the art to effect the extrusion or flow of material through an appropriate opening. The force needed to cause a moldable mixture to flow may, for example, be supplied by gravity.

The sheet may also be formed by passing a moldable mixture between a pair of rollers. The term "rolling" as used in the specification and the appended claims includes passing either an amorphous mass or a sheet of the inorganically filled material between at least one pair of rollers. Rolling an amorphous mass results in the formation of a sheet and rolling a sheet results in a decrease of the thickness of the sheet and improved uniformity and surface quality of the sheet.

A combination of extrusion and rolling is often preferable to mold a sheet. A fresh sheet is then molded into the desired shape prior to complete hardening or drying of the sheet. As mentioned above, the sheet can be molded into an article by die press molding, vacuum forming, air pressure forming, and twin sheet forming. The term "vacuum forming" as used in the specification and the appended claims includes drape forming, straight vacuum forming, drape vacuum forming, snapback vacuum forming, billow/air slip vacuum forming, billow drape forming, plug-assist forming, billow/plug-assist/snapback forming. The term "air pressure forming" as used in the specification and the appended claims includes utilizing compressed air and atmospheric pressure with platens and/or molds and pressure boxes capable of locking up and holding the necessary pressure to form articles. The term "twin sheet forming" as used in the specification and the appended claims includes binding two sheets together to produce articles with hollow parts.

1. Extrusion.

Figure 12:
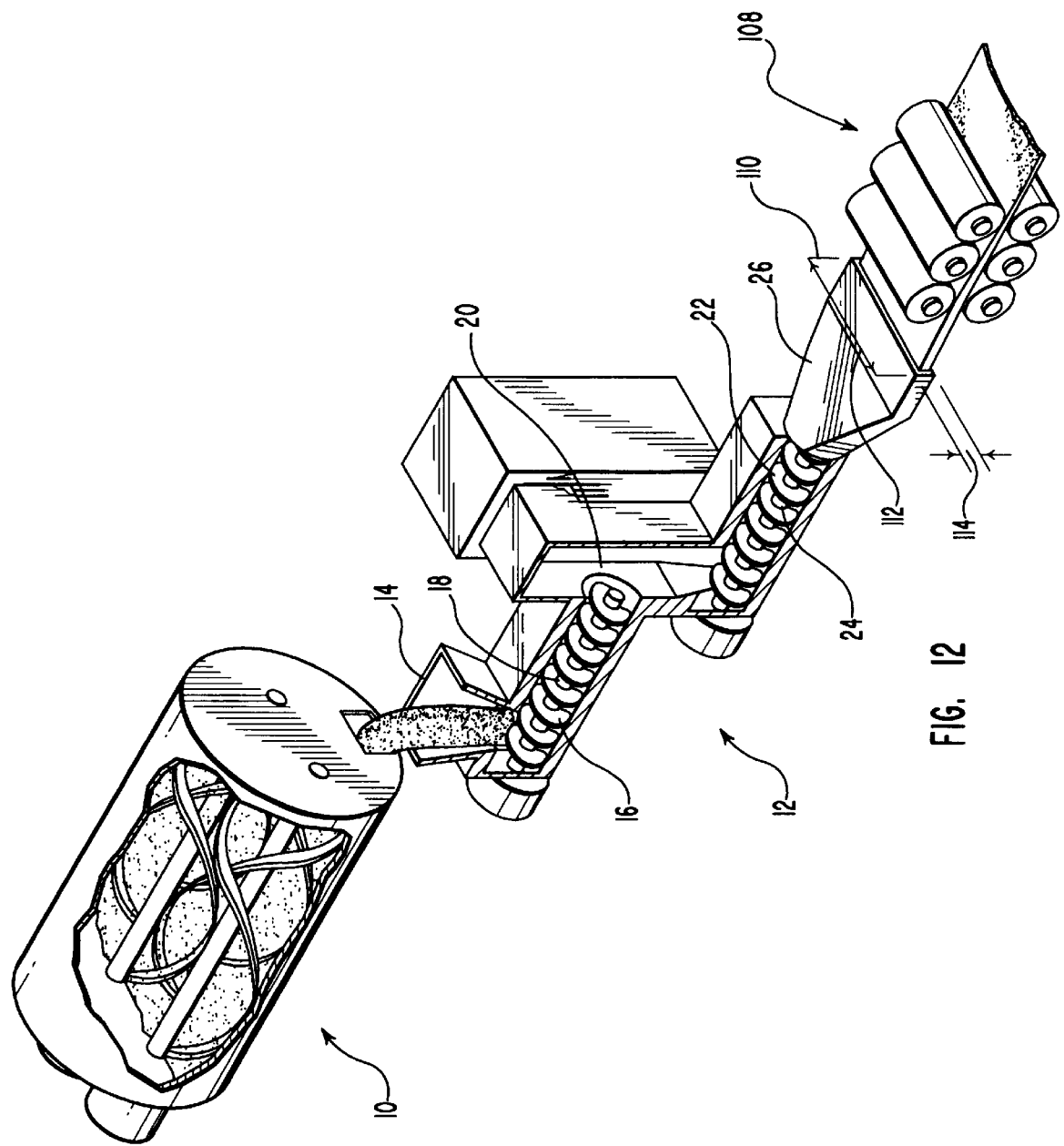
FIG. 12 is a comprehensive view of the preferred system used in manufacturing sheets in the wet sheet molding process, including a mixer, a twin auger extruder, a die head, and a plurality of reduction rollers.

In a preferred embodiment, an appropriate moldable mixture is transported to a sheet forming apparatus comprising an extruder and a set or series of rollers. Reference is now made to FIG. 12, which illustrates a currently preferred system including a mixer 10 and twin auger extruder 12, acting in conjunction with reduction rollers 108. In an alternative embodiment, a sheet may be formed by eliminating extruder 12 and feeding the mixture directly between reduction rollers 108. If an extruder is used to form a sheet, the reduction rollers aid in forming a sheet having a more precise thickness.

FIG. 12 shows auger extruder 12 having die head 26 with a die slit 110 including a die width 112 and a die thickness 114. The cross-sectional shape of the die slit 110 is configured to create a sheet of a desired width and thickness that will generally correspond to the die width 112 and die thickness 114.

Auger extruder 12 can also be replaced by a piston extruder such as two stage injector 36 or reciprocating screw injector 38 as previously discussed. A piston extruder may be advantageous where greater pressures are required. Nevertheless, due to the highly plastic-like nature of mixtures typically employed in the present invention, it is not generally necessary, or even advantageous, to exert pressures greater than those achieved using an auger extruder. Furthermore, piston extruders are less able than auger extruders in continuously forming a sheet.

Although the preferred width and thickness of the die will depend upon the width and thickness of the particular sheet to be manufactured, the thickness of the extruded sheet will usually be at least twice, and sometime many times, the thickness of the final rolled sheet. The amount of reduction (and, correspondingly, the thickness multiplier) will depend upon the properties of the sheet in question. Because the reduction process helps control fiber orientation, the amount of reduction will often correspond to the degree of desired orientation. In addition, the greater the thickness reduction, the greater the elongation of the sheet. In a typical manufacturing process, an extruded sheet with a thickness of about 6 mm may be rolled into a sheet with a thickness between about 0.2 mm and about 0.5 mm.

In addition to narrow die slits to form flat sheets, other die shapes may be used to form other objects or shapes. For example, in some cases it may not be desirable to extrude an extremely wide sheet. To accomplish this, a pipe-shaped object may be extruded and continuously cut and unfolded using a knife located just outside the die head.

The amount of pressure that is applied in order to extrude a moldable mixture will generally depend on the pressure needed to force the mixture through the die head, as well as the desired rate of extrusion. It should be understood that the rate of extrusion should be controlled in order for the rate of sheet formation to correspond to the speed at which the sheet is subsequently passed through the reduction rollers during the reduction step.

It will be understood that an important factor which determines the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

The ability of the moldable mixture to be extruded through the die head, as well as the rate at which it is extruded, is generally a function of the rheology of the mixture, as well as the operating parameters and properties of the machinery. Factors such as the amount of water, organic binder, dispersant, or the level of initial hydration of the hydraulically settable inorganic aggregates all affect the rheological properties of the mixture. The rate of extrusion may, therefore, be controlled by controlling the mix design and the rate of setting or hardening of the moldable mixture.

As set forth above, adequate pressure is necessary in order to temporarily increase the workability of the moldable mixture in the case where the mixture has a deficiency of water and has a degree of particle packing optimization. As the mixture is compressed within the extruder, the compressive forces bring the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and initial strength.

In light of each of the factors listed above, the amount of pressure which will be applied by the extruder in order to extrude the mixture will preferably be within the range from between about 50 kPa to about 70 MPa, more preferably within the range from between about 150 kPa to about 30 MPa, and most preferably within the range from between about 350 kPa to about 3.5 MPa.

The extrusion of a moldable mixture through the die head will orient the individual fibers within the moldable mixture in the lengthwise direction of the extruded sheet. As will be seen hereinbelow, the rolling process will further orient the fibers in the lengthwise or "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with rolling, which will have bidirectionally oriented fibers.

The purpose of the extrusion step is to provide a continuous, well-regulated supply of material to the rollers. The extrusion step preferably orients the fibers in the direction of the flow of the material. These may be achieved by other mechanisms known to those skilled in the art to effect the "extrusion" or flow of material through an appropriate opening. The force needed to cause a mixture to flow may, for example, be supplied by gravity.

2. Rolling.

Although the articles of the present invention can be directly formed from the extruded sheets, it is preferred to "roll" the extruded sheet by passing it between at least one pair of rollers, the purpose of which is to improve the uniformity and surface quality of the sheet and, in most cases, reduce the thickness of the sheet. In cases where it is desirable to greatly reduce the thickness of the sheet, it may be necessary to reduce the thickness of the sheet in steps, wherein the sheet is passed through several pairs of rollers, each pair having progressively narrower gap distances therebetween.

Figure 13:
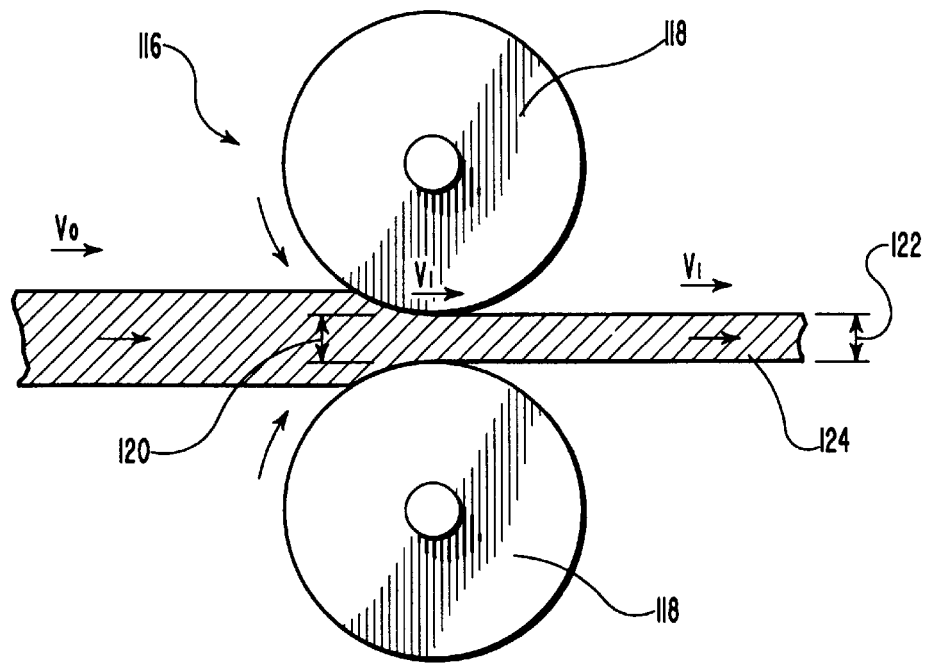
FIG. 13 is a cross-sectional view of a pair of reduction rollers.

Reference should be made to FIG. 12 which shows one embodiment of the present invention in which a series of rollers are employed during the rolling step. The rollers within each of the roller pairs have similar diameters, although in some cases it may be preferable to use smaller diameter rollers in combination with larger diameter rollers. As seen in FIG. 13, a set or pair of rollers 116 normally includes two individual rollers 118 positioned adjacent to one another with a predetermined gap distance 120 therebetween. The gap distance 120 between the two individual rollers 118 corresponds to the desired thickness 122 of the reduced sheet 124 after it passes between set of rollers 116.

As the thickness of the sheet is reduced upon passing through a pair of rollers, it will also elongate in the forward moving (or "Y") direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction.

Another consequence of sheet elongation is that the sheet will "speed up" as it passes between a pair of reduction rollers. Reference is again made to FIG. 13 to illustrate that the tangential speed v, of the outer surface of the rollers will closely correspond to the speed $v_1$ of the reduced, elongated sheet as it exits the rollers, not the speed of the sheet as it enters the gap between the rollers.

By way of example, if the sheet thickness is reduced by 50% and assuming there is no widening of the sheet during the reduction process the sheet will elongate to twice its original length. This corresponds to a doubling of the sheet's velocity before it enters the rollers compared to when it exits the rollers. Thus, as in FIG. 13, if the sheet thickness is reduced by 50%, then $v_1=2\times v_0$; the velocity doubles from point "a" to point "b." The acceleration of the sheet and the downward pressure of the rollers imparts a large amount of shearing forces on the sheet, which forces can harm the moldable matrix if too great.

The application of an excessively large shearing force can disrupt the integrity of the structural matrix of the sheet, thereby creating flaws within and weakening the sheet. Because of this, the thickness of the sheet should be reduced in steps small enough to prevent undue damage to the sheet. In light of typical production parameters (such as, e.g., minimizing the number of reduction steps, orienting the fibers, and controlling the rheology of the moldable mixture) the reduction in thickness of a sheet will preferably not exceed about 80% during any single reduction step (i.e., while passing between any one set of rollers).

The diameter of each of the rollers should be optimized depending on the properties of the moldable mixture and the amount of thickness reduction of the sheets. When optimizing the diameter of the rollers, two competing interests should be considered. The first relates to the fact that smaller diameter rollers tend to impart a greater amount of shearing force into the sheet as it passes between the rollers. This is because the downward angle of compression onto the sheet (and average acceleration) is, on average, greater when using smaller rollers than when using larger diameter rollers.

Consequently, from this perspective, larger diameter rollers appear to be advantageous compared to smaller diameter rollers because less shearing forces would be expected to introduce fewer flaws into the structural matrix.

However, the use of larger diameter rollers has the drawback of the moldable material coming into contact with the roller for a greater period of time, thereby resulting in an increase in drying of the sheet during the rolling process in the case where the rollers are heated to prevent adhesion. (Because more of the sheet comes into contact with a larger diameter roller, heating is even more important when using larger diameter rollers to prevent adhesion). While some drying is advantageous, drying the sheet too quickly during the rolling process could result in the introduction of fractures and other flaws within the matrix. A dryer sheet is less able to conform to a new shape without a rupture in the structural matrix compared to a wetter sheet subjected to the same level of shearing forces. Consequently, from this perspective the use of smaller diameter rollers is advantageous for reducing the drying effect of the reduction rollers.

In light of this, the diameter of the rollers should preferably be optimized and be sufficiently small to prevent overdrying of the material during the rolling process, while also being sufficiently large to reduce the amount of shearing force imparted to the sheet, thereby allowing a greater reduction of sheet thickness during each reduction step. By maximizing the amount of sheet thickness reduction, the number of reducing steps can be minimized.

As set forth above, it is preferable to treat the roller surfaces in order to prevent sticking or adhesion of the sheet to the rollers. One method entails heating the rollers, which causes some of the water within the moldable mixture to evaporate and to create a steam barrier between the sheet and the rollers. Evaporation of some of the water also reduces the amount of water within the mixture, thereby increasing the form stability of the sheet while in a wet state. The temperature of the rollers, however, must not be so high as to dry or harden the surface of the sheet to the point which would create residual stresses, fractures, flaking, or other deformities or irregularities in the sheet. Accordingly, the rollers are preferably heated to a temperature within a range from about 50° C. to about 140° C., more preferably from about 70° C. to about 120° C., and most preferably from about 85° C. to about 105° C.

Generally, the stickiness of the moldable mixture increases as the amount of water in the mixture is increased. Therefore, the rollers should generally be heated to a higher temperature in cases where the mixture contains more water, which is advantageous because sheets containing a higher water content must generally have more of the water removed in order to obtain adequate form stability while in a wet state.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the structural matrix.

In an alternative embodiment, adhesion between the sheets and rollers can be reduced by cooling the rollers to or below room temperature. Heating the mixture in the extruder to a relatively high temperature, for example, and then cooling the sheet surface causes the vaporizing water to condense, which is thought to create a thin film of water between the sheet and the roller. The rollers should be cool enough to prevent the surface of the sheet from adhering to the rollers, but not so cold to cause the sheet to freeze or become so stiff or inflexible that it will fracture or shatter during the rolling process.

Overcooling the material can also greatly retard the hydration reaction, although this may be desirable in some cases. Accordingly, where cooling a heated mixture is relied upon to prevent adhesion of the sheet it is preferable to cool the rollers to a temperature within the range from between about −20° C. to about 40° C., more preferably to between about 0° C. to about 35° C., and most preferably to between about 5° C. to about 30° C. Conversely, it will generally be preferable to heat the extruding mixture to a temperature within the range from between about 20° C. to about 80° C. The temperature will correlate with the temperature of the rollers.

Another way to reduce the level of adhesion between the rollers and the sheet is to treat the roller surfaces with a nonstick coating such as polished stainless steel, chrome, nickel, or Teflon®.

3. Molding.

Figure 14:
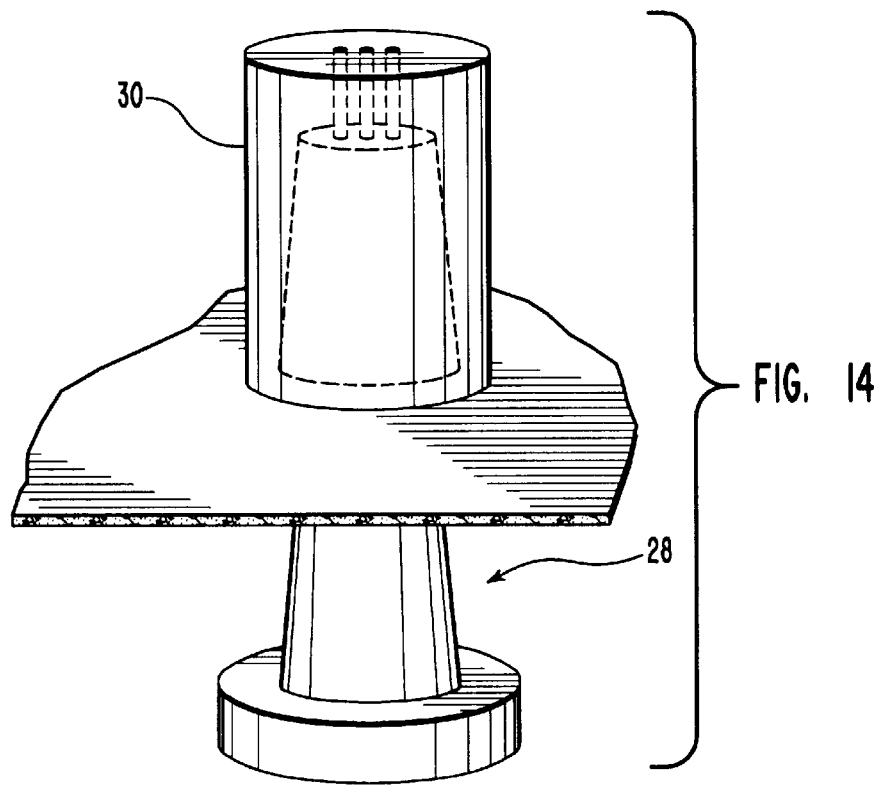
FIG. 14 is a schematic view of a male die and female die used in molding a wet sheet into a desired article.

Once the sheet is formed, the next step is to fashion a portion of the sheet into the desired shape of the article. As shown in FIG. 14, this process is similar to die press molding in that the sheet is pressed between male die 28 of a desired shape and female die 30 having a substantially complementary shape to male die 28. As a portion of the sheet is pressed between the dies, the mixture is formed into an article having the complementary shape of the dies.

Although solid single piece dies (the male die and the female die each comprising one solid piece) are the preferred dies based on ease and economy, alternative dies include split dies, progressive dies, and collapsible dies as previously discussed.

Just as in the die press molding process, the amount of pressure exerted by the dies onto the sheet serves several functions which must be considered when determining how much pressure to apply. While a sheet of material is used as compared with directly injecting the material, the parameters and the cautions discussed with the die pressing process will generally apply to the wet sheet molding process.

In an alternative method for fashioning the article from the sheet, the various methods of vacuum forming, as commonly used in the plastics industry, can be incorporated. Vacuum forming uses atmospheric pressure (about 14.7 psi) to force the sheet to conform to a mold. Both male and female molds can be used for vacuum forming. The term "vacuum mold" as used in the specification and appended claims is intended to include either or both the male mold and female mold used in vacuum forming.

Figure 15A:
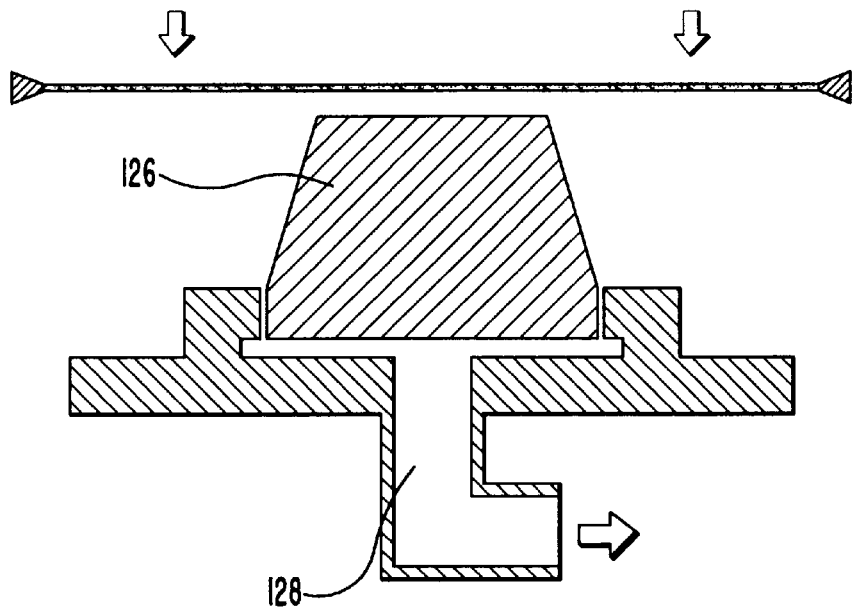
FIGS. 15A–B are cross-sectional views of the molds used in the drape forming process.
Figure 15B:
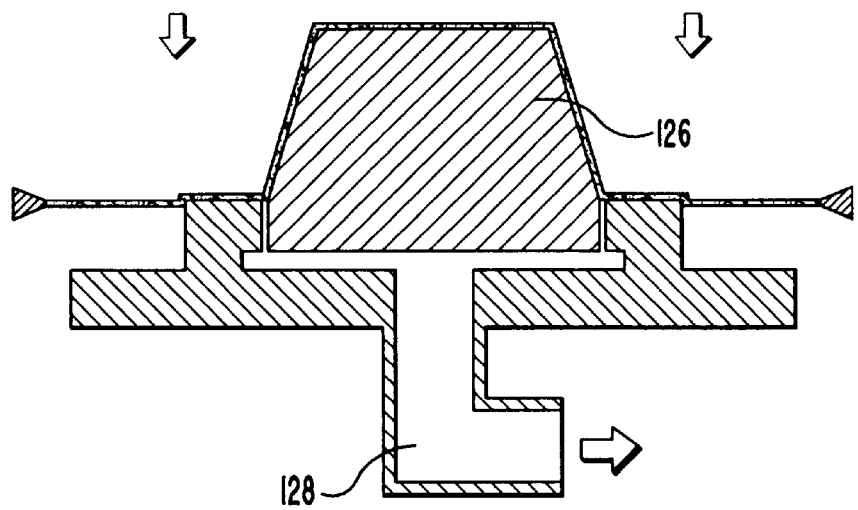

Drape forming shown in FIGS. 15A–B uses a male vacuum mold 126 having a vacuum port 128 communicating therewith. The sheet is positioned over the top of mold 126, or mold 126 is placed into the sheet. The air between the sheet and mold 126 is then evacuated through vacuum port 128, contouring the sheet around mold 126. The resulting product is thickest in the center of the part, where the material first touches mold 126. The product is thinnest in high-draw areas around the periphery, which contacts mold 126 last.

Figure 16A:
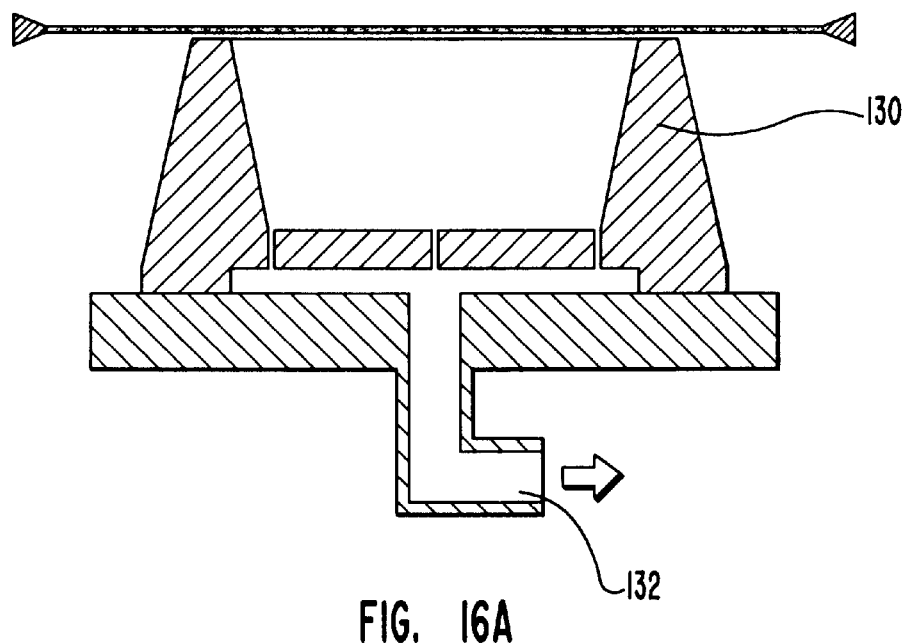
FIGS. 16A–B are cross-sectional views of the molds used in straight vacuum forming.
Figure 16B:
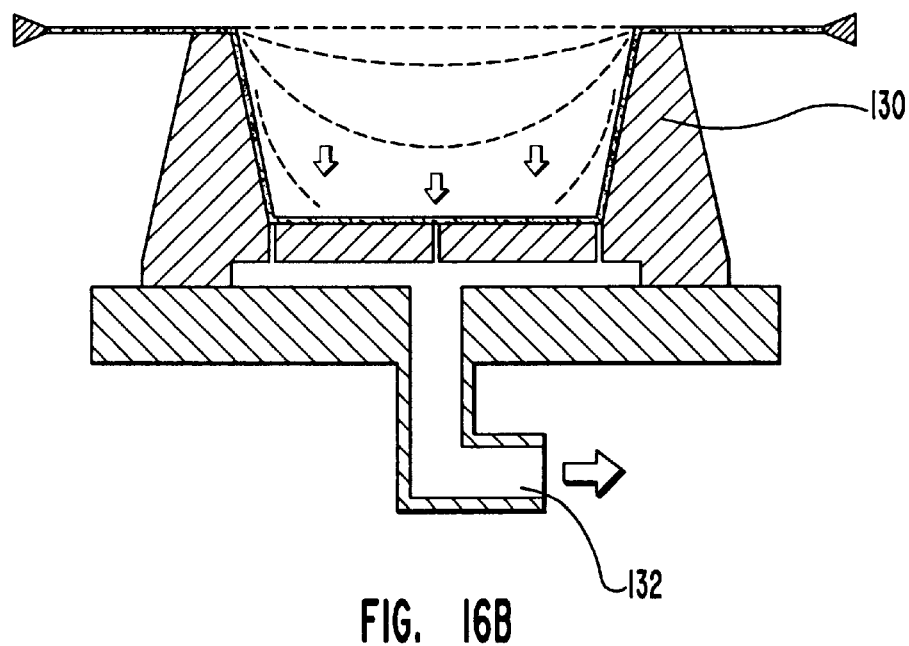

Straight vacuum forming shown in FIGS. 16A–B uses a female vacuum mold 130 having a vacuum port 132 communicating therewith. The sheet is sealed against the top of female mold 130. The mold cavity is then evacuated through vacuum port 132, and atmospheric pressure pushes the material against the sidewalls of the cavity. This forming technique results in material distribution (thin in the middle and thick around the edges) that is essentially opposite of that obtained when the same part is produced by drape forming on male mold 126.

Figure 17A:
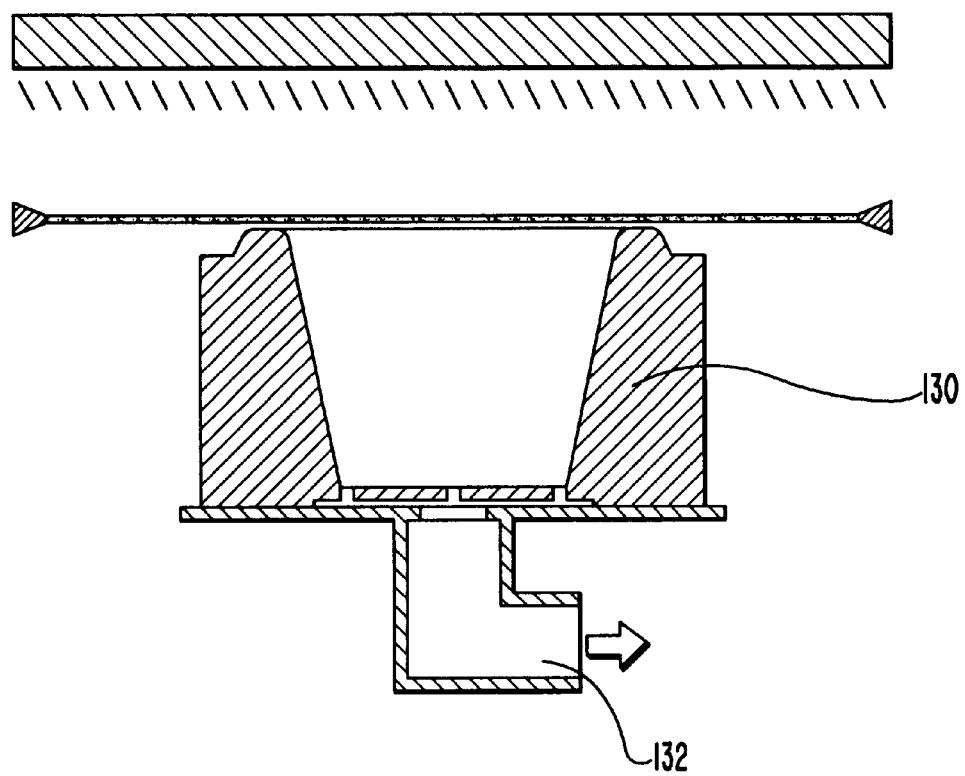
FIGS. 17A–B are cross-sectional views of the molds used in drape vacuum forming.
Figure 17B:
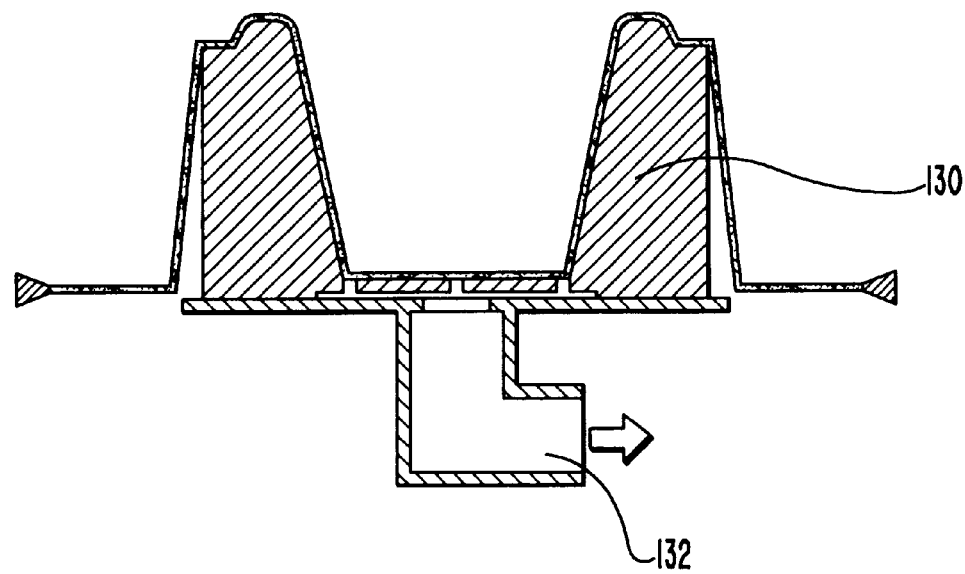

As shown in FIGS. 17A–B, drape vacuum forming, as opposed to drape forming, is similar to straight vacuum forming except that the edges of the sheet are pressed all the way to the base of female mold 130 before the cavity is evacuated. This provides a better vacuum for the molding process.

Figure 18A:
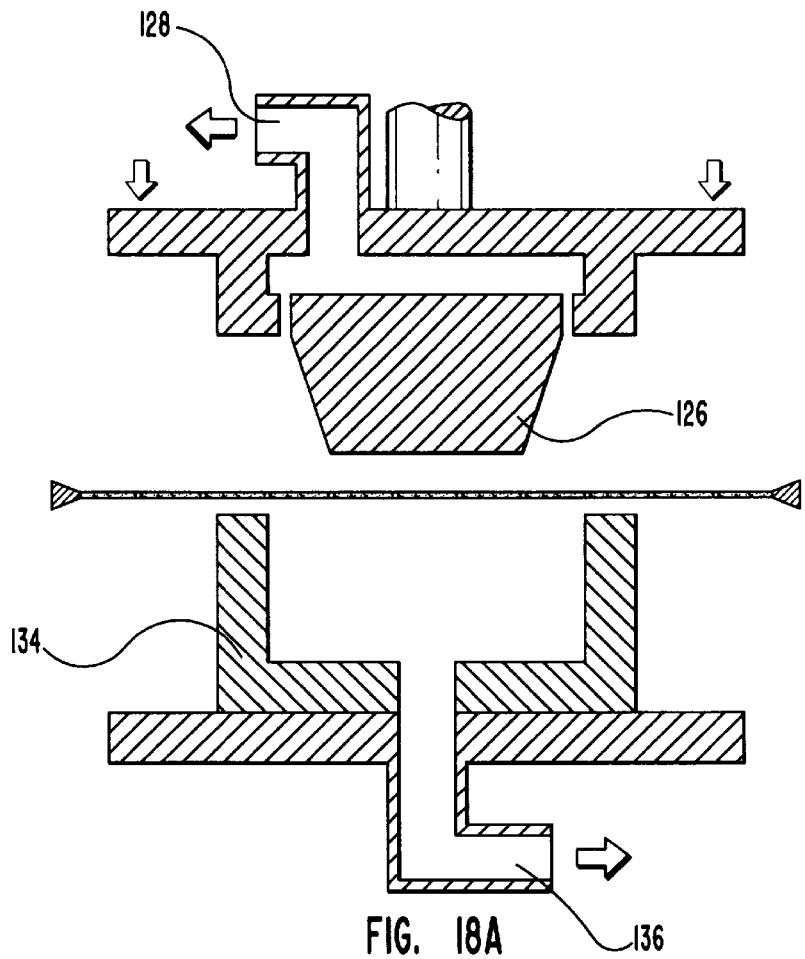
FIGS. 18A–B are cross-sectional views of the molds used in snapback vacuum forming.
Figure 18B:
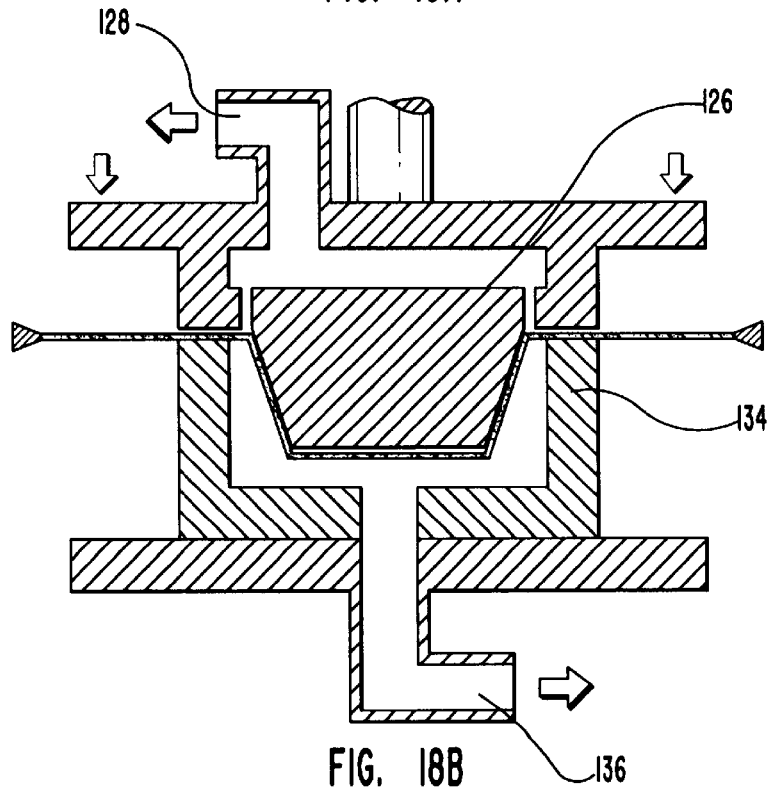

Snapback, billow/air slip, and billow drape are multi-step vacuum forming techniques designed to improve the wall thickness uniformity of products produced on male molds by prestretching the sheet prior to its contacting the mold. Stretching the sheet freely in air without touching anything allows the material to thin out uniformly. As a result, the sheet's surface area is also increased so that it more closely matches that of the mold. Snapback vacuum forming, as shown in FIGS. 18A–B, utilizes a vacuum box 134 having a box port 136 in conjunction with male vacuum mold 126. The sheet is sealed against vacuum box 134, and a partial vacuum, sufficient to stretch the sheet a desired amount is applied to vacuum box 134 through box port 136. Male vacuum mold 126 is then pushed into the concave sheet. Vacuum box 134 is vented to the atmosphere and a vacuum is drawn on male vacuum mold 126. The atmosphere pressure then forces the material against male vacuum mold 126.

Figure 19A:
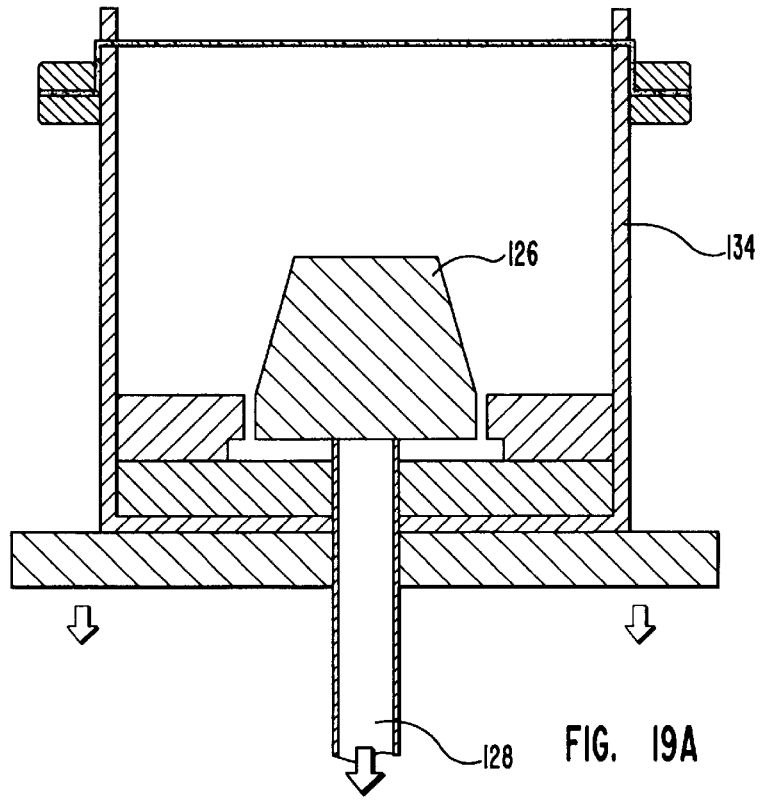
FIGS. 19A–B are cross-sectional views of the molds used in billow/air-slip vacuum forming.
Figure 19B:
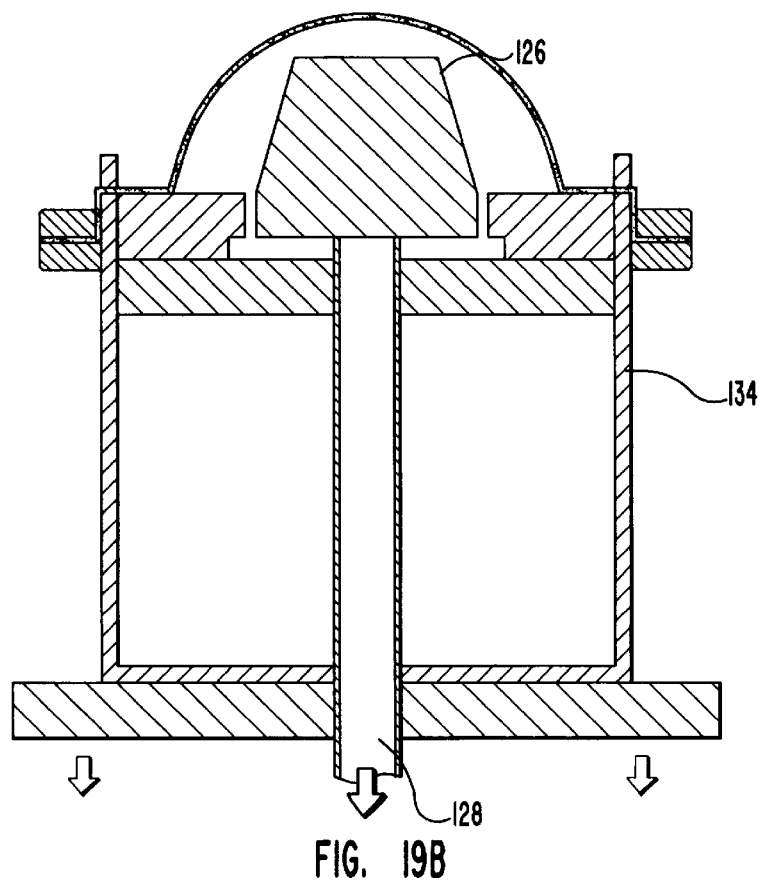

Billow/air-slip vacuum forming, illustrated in FIGS. 19A–B, utilizes vacuum box 134 with male vacuum mold 126 movably positioned within. The sheet is sealed against vacuum box 134. Box 134 is pressured with compressed air and the sheet billows up to form a bubble that provides the appropriate stretching. Male vacuum mold 126 is pushed up into the convex bubble. Vacuum box 134 and male vacuum mold 126 are then evacuated and the sheet is forced against male vacuum mold 126.

Figure 20A:
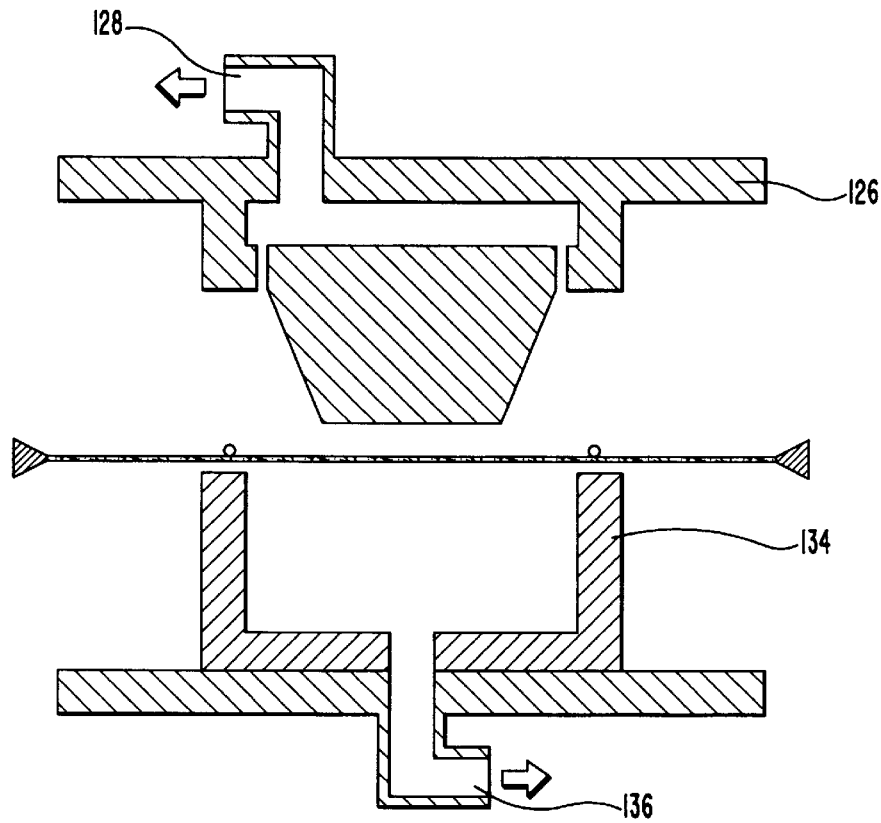
FIGS. 20A–B are cross-sectional views of the molds used in billow/drape vacuum forming.
Figure 20B:
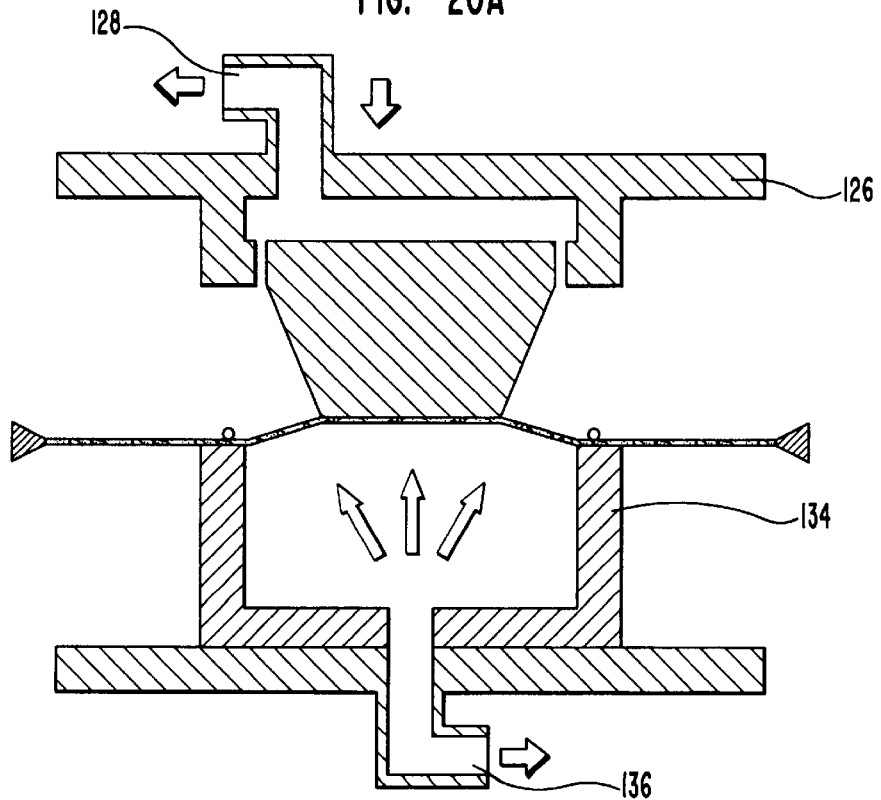

Billow drape vacuum forming is a reverse draw technique that utilizes vacuum box 134 to blow a bubble in the sheet, as shown in FIGS. 20A–B. Male vacuum mold 126, mounted opposite vacuum box 134, is pushed into the convex bubble. The air in the bubble is vented to the atmosphere in a controlled manner. By matching the amount of air being vented to that being displaced by male vacuum mold 126, the sheet material is wiped or draped against male vacuum mold 126. When male vacuum mold 126 completely penetrates the sheet, a vacuum is applied to male vacuum mold 126 and vacuum box 134 is vented to the atmosphere to complete the forming operation.

Plug-assist and billow/plug-assist/snap back are multistep vacuum forming techniques designed to improve the wall thickness uniformity of parts produced with female molds. They utilize mechanical assists (plugs) to force more material into high dry areas of the part.

Figure 21A:
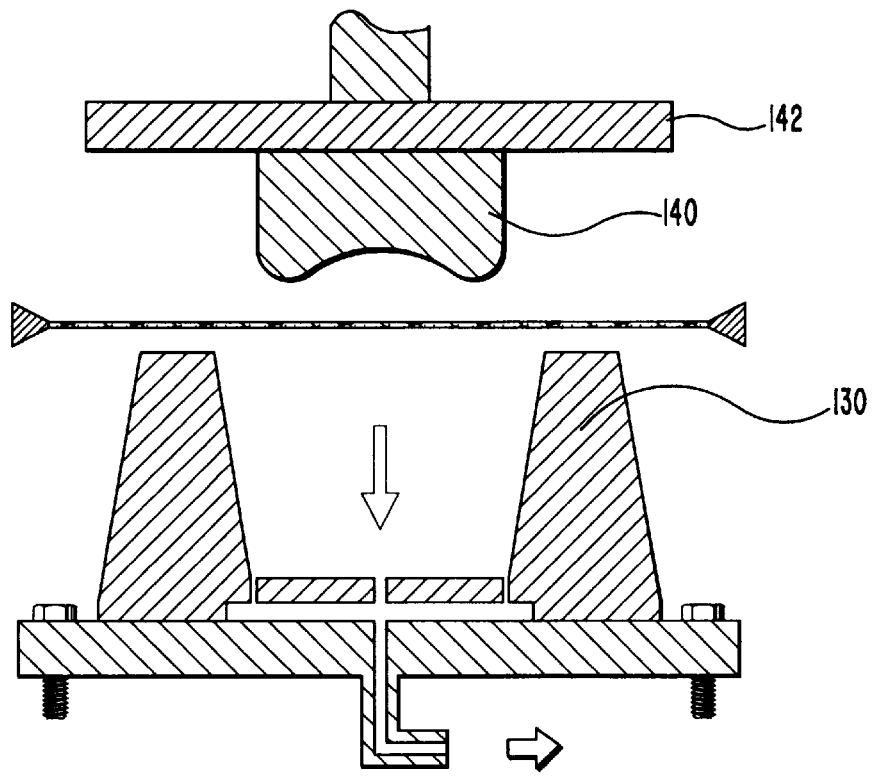
FIGS. 21A–B are cross-sectional views of the molds used in plug assist vacuum forming.
Figure 21B:
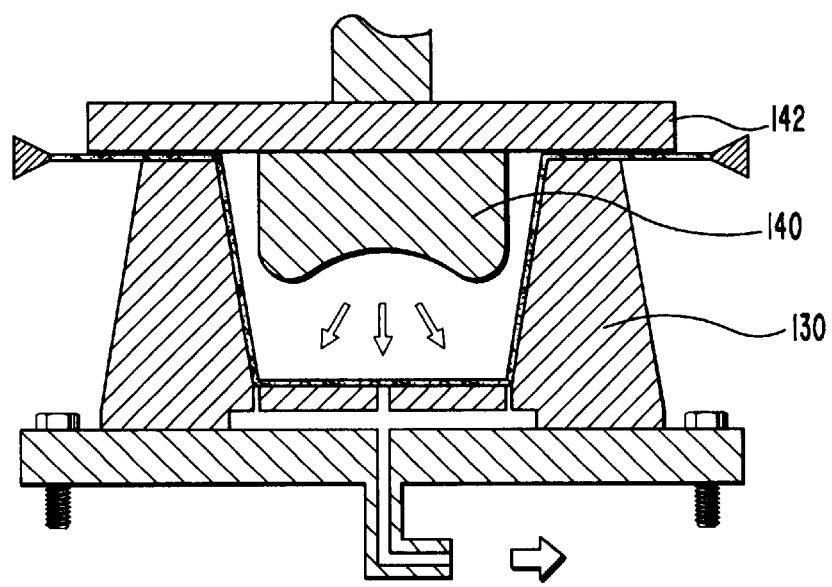

Plug assist vacuum forming, which is shown in FIGS. 21A–B, is used in conjunction with straight vacuum or drape forming techniques. A plug 140 is mounted on a platen 142 opposite female vacuum mold 130. The sheet is sealed against the female vacuum mold 130, and plug 140 pushes the material into female vacuum mold 130 prior to drawing a vacuum. When the female vacuum mold 130 is evacuated, the material is forced off plug 140 and up against the mold cavity.

Figure 22A:
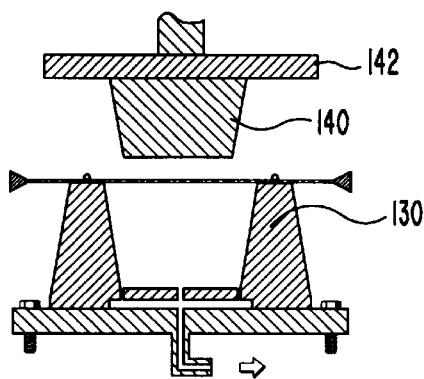
FIGS. 22A–C are cross-sectional views of the molds used in billow/plug assist/snapback forming.
Figure 22B:
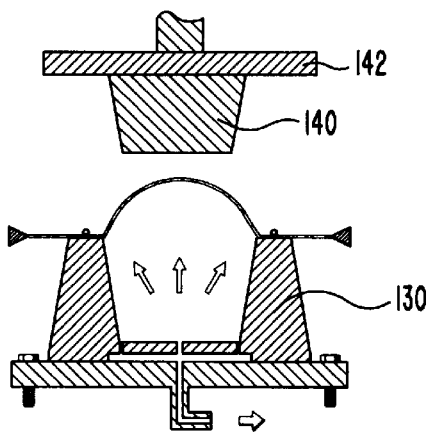
Figure 22C:
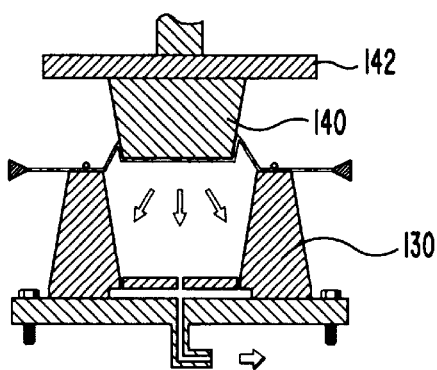

Billow/plug-assist/snap back forming combines several different forming techniques, as shown in FIGS. 22A–C. The sheet is sealed against female vacuum mold 130. Mold 130 is pressurized to stretch the sheet by blowing a bubble. Plug 140 mounted on platen 142 opposite female vacuum mold 130 is forced into the convex bubble, and controlled venting of the displaced air in the bubble causes the material to be draped over plug 140. When plug 140 is fully extended, female vacuum mold 130 is evacuated and the material is pushed off plug 140 and on to female vacuum mold 130.

Pressure forming uses compressed air in addition to atmospheric pressure. Pressures typically range from about 40 Pa to about 200 Pa. Pressure forming requires special equipment with platens and/or molds in pressure boxes capable of locking up and holding the necessary pressure. Pressure forming can be incorporated into any of the vacuum forming techniques previously described.

Figure 23A:
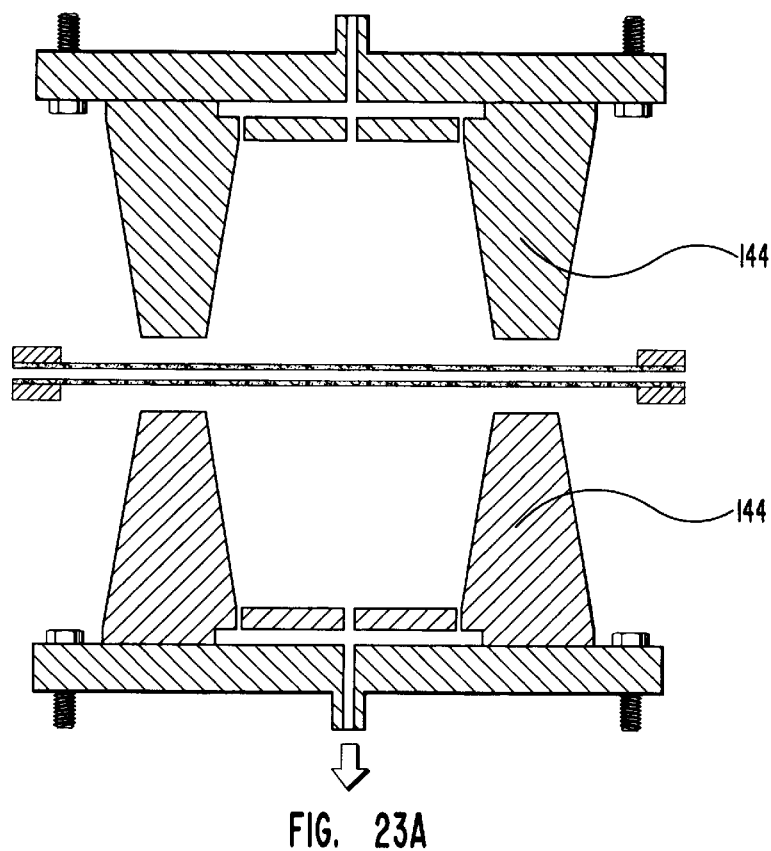
FIGS. 23A–C are cross-sectional views of the molds used in twin sheet forming
Figure 23B:
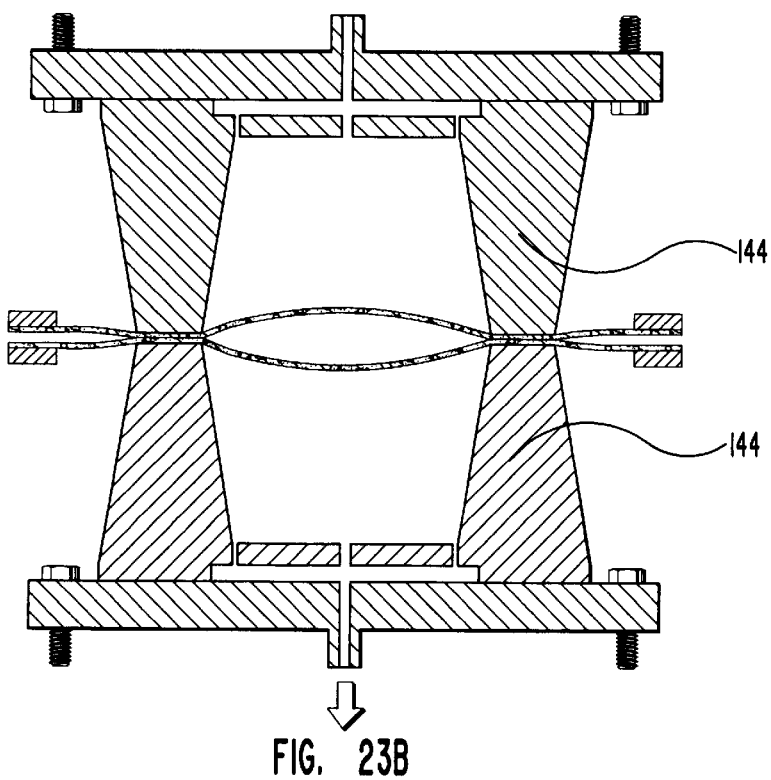
Figure 23C:
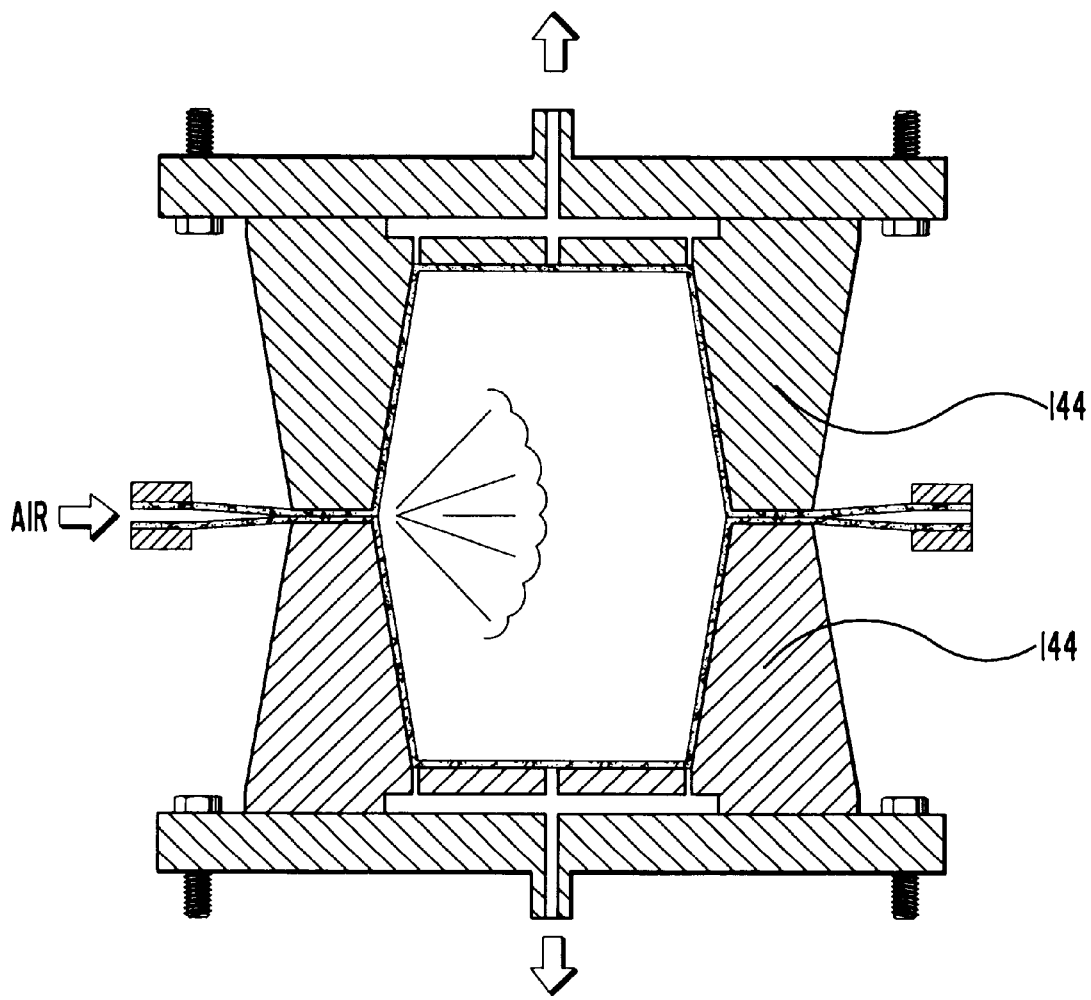

A twin sheet forming process, shown in FIGS. 23A–C, produces hollow parts. Two sheets are positioned between two female pressure molds 144 with matching perimeters or contact surfaces. The cavity contours of female pressure molds 144 may or may not be identical. Female pressure molds 144 come together and bind the two sheets together where the molds meet. The two sheets may be either pressure formed simultaneously or vacuum formed subsequently utilizing conventional forming techniques.

The term "vacuum forming processes" as used in the appended claims is intended to include pressure forming and twin sheet forming processes in addition to the specifically enumerated vacuum forming techniques. In an alternative embodiment, it may also be beneficial to subsequently press the vacuum shaped article between corresponding shaped solid dies so as to improve the surface finish of the article.

V. Examples of the Preferred Methods of Manufacture.

The following examples are presented in order to more specifically teach the methods of forming articles according to the present invention. The examples include various mix designs, used in conjunction with a number of different manufacturing processes in order to create the articles of the present invention. Those examples that are written in the past tense are actual working examples that have been carried out. Those examples that are written in the present tense are to be considered hypothetical or "prophetic" examples, although they are based on actual mix designs and conditions which have actually been carried out.

EXAMPLE 1

A wide variety of articles, including cups, plates, bowls, and breakfast platters were directly molded from an inorganically filled mixture having the following components:

| | |
|---|---|
| Vegetable Starch | 5 kg |
| Calcium Carbonate | 1.25 kg |
| Water | 6.25 kg |
| Magnesium Stearate | 31.5 g |
| Agar gum | 31.5 g |

The inorganically filled mixture was made by gelating the vegetable starch with the water, and thereafter adding the remaining ingredients. The starch was either natural or modified starch derived from potatoes, wheat, or corn. It was found that corn starch gave the strongest final molded article because of its higher film strength.

The mixtures had the consistency of pancake batter and could be poured directly into heated molds (140° C.–240°

C.) that were coated with a nonstick surface. The heated molds drove off a significant amount of the water, which further helped to reduce sticking between the mixture and the mold surfaces. Within 1–3 minutes the articles could be demolded with complete form stability. The hardened materials had an inorganic content of about 20% by weight of the solid materials (excluding any residual water remaining within the structural matrix).

Because of the expansion of the material by the heated mold, the articles were extremely lightweight and had finely dispersed air voids evenly distributed throughout the hardened material. The density of the molded products ranged between 0.1–0.6 g/cm$^3$, with the density increasing as the amount of thermal expansion was decreased. As hotter molds were used, the voids were smaller and more evenly dispersed and the articles could be demolded more quickly. Raising the pH of the mixture yielded a higher density product. As the density of the materials decreased, the insulating ability increased, although with a decrease in toughness and strength.

EXAMPLE 2

The procedures of Example 1 were repeated in every respect except that the inorganic materials content was increased to about 30%. In particular, the amount of calcium carbonate was increased to 2.14 kg, which required the addition of 7.1 kg water, 36 g magnesium stearate, and 36 g agar gum to maintain the same rheology. The resulting articles exhibited increased toughness without a proportionate increase in density, which fell within the range from about 0.15–0.6 g/cm$^3$.

EXAMPLE 3

The procedures of Example 1 were repeated in every respect except that the inorganic materials content was increased to about 40%. In particular, the amount of calcium carbonate was increased to 3.3 kg, which required the addition of 8.3 kg water, 42 g magnesium stearate, and 42 g agar gum to maintain the same rheology. The resulting articles exhibited increased toughness without a proportionate increase in density, which still fell within the range from about 0.2–0.6 g/cm$^3$.

EXAMPLES 4–7

Any of the mix designs set forth in Examples 1–3 are altered by replacing all or part of the calcium carbonate with any of the following:

| Example | Inorganic filler |
| --- | --- |
| 4 | kaolin clay |
| 5 | montmorillonite clay |
| 6 | mica |
| 7 | fused silica |

Kaolin clay, montmorillonite clay, and mica each work better if a dispersant such as melamine-formaldehyde condensate, naphthalene-formaldehyde condensate, polyacrylic acid, and metaphosphates is added. The dispersant is added in an amount within the range from about 1–2% of the solids within the inorganically filled mixture. Polyacrylic acid creates a mixture having thixotropic properties. The use of dispersants allows for a reduced water content, better flowability, and reduced baking time, which allows for a less energy intensive process.

The inorganically filled mixtures made by these examples have strength and weight properties similar to those of the articles of Examples 1–3.

EXAMPLE 8

A variety of articles are manufactured from an inorganically filled mixture having 10 kg mica, 3 kg water, 0.5 kg starch, and 50 g magnesium stearate. The inorganically filled mixtures are formed by first gelating the starch and water together and then adding the remaining ingredients to form a mixture having a dough-like consistency. The inorganically filled mixture may be molded into the desired article by die press molding according to the procedures set forth in the die pressing section.

Alternatively, the inorganically filled mixture could also be molded by jiggering, injection molding, or by blow molding (usually with slightly more added water to reduce the viscosity of the mixture in the case of blow molding).

EXAMPLES 9–12

The procedures set forth in Example 8 are repeated in every respect, except that the amounts of starch and magnesium stearate are increased to the following amounts:

| Example | Starch | Mg Stearate |
| --- | --- | --- |
| 9 | 1 kg | 55 g |
| 10 | 2 kg | 60 g |
| 11 | 3 kg | 65 g |
| 12 | 4 kg | 70 g |

Increasing the amount of starch results in a product having increased tensile strength and toughness. In addition, the molded material will have higher strength in the wet, or unhardened state.

EXAMPLES 13–18

Highly inorganically filled articles were prepared from moldable mixtures that included the following components:

| Example | CaCO$_3$ | Fiber | Tylose ® | Water |
| --- | --- | --- | --- | --- |
| 13 | 6 kg | 0.25 kg | 0.1 kg | 1.8 kg |
| 14 | 5 kg | 0.25 kg | 0.1 kg | 1.7 kg |
| 15 | 4 kg | 0.25 kg | 0.1 kg | 1.6 kg |
| 16 | 3 kg | 0.25 kg | 0.1 kg | 1.5 kg |
| 17 | 2 kg | 0.25 kg | 0.1 kg | 1.4 kg |
| 18 | 1 kg | 0.25 kg | 0.1 kg | 1.3 kg |

The fiber that was used in each of these examples was southern pine. The water, Tylose® Fl 15002, and fibers were first mixed for 10 minutes under high shear in a Hobart kneader-mixer. Thereafter, the calcium carbonate was added to the mixture, which was mixed for an additional 4 minutes under low shear.

The particle packing density of the calcium carbonate in each of these mixtures was about 0.63, and the resulting mixtures had the following percentages by volume of the total solids of inorganic aggregate, respectively: 89.7%, 87.9%, 85.3%, 81.3%, 74.4%, and 59.2%. These corresponded to the following percentages by weight of the total solids: 94.5%, 93.5%, 92.0%, 89.6%, 85.1%, and 74.1%. The articles of Examples 13–18 contained the following amounts of fiber as a percentage by volume of the total solids, respectively: 7.2%, 8.5%, 10.3%, 13.1%, 18.0%, and 28.7%. These amounts would be considerably less if measured in weight percentage.

The moldable mixtures were first extruded using a de-airing auger extruder through a 30 cm×0.6 cm die to form continuous sheets having corresponding dimensions of width and thickness. The extruded sheet was then passed between a pair of reduction rollers having a gap distance therebetween corresponding to the thickness of the sheet formed. Because calcium carbonate has a low specific surface area, these mixtures have a low adhesiveness to the rollers. The sheets formed in these examples had thicknesses of 1.0 mm, 1.25 mm, 1.5 mm, and 1.75 mm. The rolled sheet, still in the wet condition, was then pressed between a male die and a female die into the shape of a bowl.

As less calcium carbonate was used, the tensile strength, flexibility, and molding endurance of the sheet and article increased. However, adding more calcium carbonate yielded a sheet and article with a smoother surface and easier placeability through the rollers, which reduced the amount of internal defects. Increasing the amount of $CaCO_3$ had the effect of decreasing the porosity of the sheet, which ranged from 37.4% to 70.3% by volume of the final dried articles.

EXAMPLES 19–24

Highly inorganically filled articles were prepared from moldable mixtures that included the following components:

| Example | $CaCO_3$ | Fiber | Tylose ® | Water | Glass Spheres |
|---|---|---|---|---|---|
| 19 | 1.0 kg | 0.2 kg | 0.1 kg | 2.1 kg | 0.5 kg |
| 20 | 1.0 kg | 0.3 kg | 0.1 kg | 2.1 kg | 0.5 kg |
| 21 | 1.0 kg | 0.4 kg | 0.1 kg | 2.1 kg | 0.5 kg |
| 22 | 1.0 kg | 0.5 kg | 0.1 kg | 2.1 kg | 0.5 kg |
| 23 | 1.0 kg | 0.6 kg | 0.1 kg | 2.1 kg | 0.5 kg |
| 24 | 1.0 kg | 0.7 kg | 0.1 kg | 2.1 kg | 0.5 kg |

The fiber that was used in each of these examples was southern pine. The water, Tylose® FL 15002, and fibers were first mixed for 10 minutes in a Hobart kneader-mixer. Thereafter, the calcium carbonate and hollow glass spheres were added to the mixture, which was mixed for an additional 6 minutes under low shear. The particle packing density of the combined calcium carbonate and hollow glass spheres in each of these mixtures was 0.73, and the resulting mixtures had the following percentages by volume of the total solids of inorganic aggregate, respectively: 88.5%, 85.3%, 82.3%, 79.6%, 77.0%, and 74.5%.

The moldable mixtures were extruded using a de-airing auger extruder through a 30 cm×0.6 cm die to form continuous sheets having corresponding dimensions of width and thickness. The extruded sheet was then passed between a pair of reduction rollers having a gap distance therebetween corresponding to the thickness of the sheet formed. Because calcium carbonate and glass spheres each have a low specific surface area these mixtures have a low adhesiveness to the rollers. The sheets formed in these examples had thicknesses of 1.0 mm, 1.25 mm, 1.5 mm, and 1.75 mm. The sheet, still in the wet condition, was then pressed between a male die and a female die into the shape of a bowl.

When calcium carbonate particles having an average diameter of 35 microns were used (maximum 100 microns), the resulting article had a matte surface. However, when much smaller particles are used (98% of them being smaller than 2 microns), the resulting article had a glossy surface. Increasing the fiber in the mixture increased the moldability of the sheet and the tensile strength and flexibility of the final hardened article.

EXAMPLE 25

Examples 19–24 were repeated in every respect except that 1.0 kg kaolin was substituted for the calcium carbonate. In all other respects the mixtures were prepared in substantially the same manner. Kaolin is essentially a naturally occurring clay in which 98% of the particles are smaller than about 2 microns. The particle packing density of the combined kaolin and hollow glass spheres in each of these mixtures was 0.69, and the resulting mixtures had the following percentages by volume of the total solids of inorganic aggregate, respectively: 88.5%, 85.3%, 82.3%, 79.6%, 77.0%, and 74.5%. The kaolin yielded articles having a glossy surface finish.

EXAMPLES 26–30

Highly inorganically filled articles are prepared from moldable mixtures that include the following components:

| Example | $CaCO_3$ | Fiber | Tylose ® | Water | Glass Spheres |
|---|---|---|---|---|---|
| 26 | 0.9 kg | 0.5 kg | 0.1 kg | 1.7 kg | 0.2 kg |
| 27 | 0.7 kg | 0.5 kg | 0.1 kg | 1.6 kg | 0.2 kg |
| 28 | 0.6 kg | 0.5 kg | 0.1 kg | 1.5 kg | 0.2 kg |
| 29 | 0.5 kg | 0.5 kg | 0.1 kg | 1.4 kg | 0.2 kg |
| 30 | 0.4 kg | 0.5 kg | 0.1 kg | 1.4 kg | 0.2 kg |

The resulting mixtures have the following percentages by volume of the total solids of inorganic aggregate, respectively: 49.8%, 39.6%, 36.3%, 32.7%, and 28.6%. The mixtures have the following percentages by volume of the total solids of fibers, respectively: 49.8%, 50.4%, 53.1%, 56.1% and 59.5%. The mixtures have the following percentages by volume of the total solids of Tylose® respectively: 10%, 10.1%, 10.6% 11.2% and 11.9%. Decreasing the calcium carbonate in the mixture increases the moldability of the sheet and substantially increases the tensile strength and flexibility of the final hardened article.

EXAMPLES 31–34

Highly inorganically filled articles are prepared from moldable mixtures that include the following components:

| Example | $CaCO_3$ | Fiber | Tylose ® | Water | Glass Spheres |
|---|---|---|---|---|---|
| 31 | 0.1 kg | 0.05 kg | 0.1 kg | 0.3 kg | 0.01 kg |
| 32 | 0.1 kg | 0.04 kg | 0.1 kg | 0.3 kg | 0.01 kg |
| 33 | 0.1 kg | 0.03 kg | 0.1 kg | 0.3 kg | 0.01 kg |
| 34 | 1.0 kg | 0.01 kg | 0.5 kg | 1.3 kg | 0.5 kg |

The resulting mixtures have the following percentages by volume of the total solids of inorganic aggregate, respectively: 31.7%, 33.2%, 34.9%, and 74.0%. The mixtures also have the following percentages by volume of the total solids of fibers, respectively: 22.8%, 19.1%, 15.0%, and 0.5%. The mixtures have the following percentages by volume of the total solids of Tylose® respectively: 45.5%, 47.7%, 50.1% and 25.0%. Decreasing the fiber in the mixture results in a decrease in the tensile strength and flexibility of the final hardened article.

EXAMPLES 35–40

Highly inorganically filled articles are prepared from moldable mixtures that include the following components:

| Example | Finely Ground Granite | Cellulose Fiber | Tylose ® FL 1500 | Water | Glass Spheres |
|---|---|---|---|---|---|
| 35 | 1.0 kg | 0.2 kg | 0.1 kg | 2.1 kg | 0.5 kg |
| 36 | 1.0 kg | 0.3 kg | 0.1 kg | 2.1 kg | 0.5 kg |
| 37 | 1.0 kg | 0.4 kg | 0.1 kg | 2.1 kg | 0.5 kg |
| 38 | 1.0 kg | 0.5 kg | 0.1 kg | 2.1 kg | 0.5 kg |
| 39 | 1.0 kg | 0.6 kg | 0.1 kg | 2.1 kg | 0.5 kg |
| 40 | 1.0 kg | 0.7 kg | 0.1 kg | 2.1 kg | 0.5 kg |

The fiber that is used in each of these examples is southern pine. The water, Tylose® FL 15002, and fibers are first mixed for 10 minutes in a Hobart kneader-mixer. Thereafter, the finely ground quartz and hollow glass spheres are added to the mixture, which is mixed for an additional 6 minutes under low shear. The particle packing density of the combined fused silica and hollow glass spheres in each of these mixtures is about 0.73, and the resulting mixtures have the following percentages by volume of the total solids of inorganic aggregate, respectively: 88.5%, 85.3%, 82.3%, 79.6%, 77.0%, and 74.5%.

The moldable mixtures are extruded using a de-airing auger extruder through a 30 cm×0.6 cm die to form continuous sheets having corresponding dimensions of width and thickness. The extruded sheet is then passed between a pair of reduction rollers having a gap distance therebetween corresponding to the thickness of the sheet formed. The low specific surface area of the glass spheres causes these mixtures to have lower adhesiveness to the rollers. The sheets formed in these examples have thicknesses of 0.85 mm, 1.0 mm, 1.2 mm, and 1.4 mm. The wet sheet is then pressed between a male die and a female die into the shape of a bowl.

Increasing the fiber in the mixture increases the moldability of the sheet and increases the tensile strength and flexibility of the final hardened article.

EXAMPLE 41

The compositions of Examples 35–40 are repeated except that 1.0 kg finely ground quartz is substituted for the finely ground granite. In all other respects the mixtures are prepared in substantially the same manner. The particle packing density of the combined finely ground granite and hollow glass spheres in each of these mixtures is about 0.74, and the resulting mixtures have the following percentages by volume of the total solids of inorganic aggregate, respectively: 88.5%, 85.3%, 82.3%, 79.6%, 77.0%, and 74.5%.

Decreasing the amount of aggregate increases the effective amounts of organic binder and fibers. Including more aggregate yields articles which have greater stiffness, are more brittle, and have greater compressive strength. Increasing the amount of fiber and organic binder yields articles which have greater flexibility, toughness, and tensile strength.

EXAMPLE 42

The compositions of Examples 35–40 are repeated except that 1.0 kg finely ground basalt is substituted for the finely ground granite. In all other respects the mixtures are prepared in substantially the same manner. The particle packing density of the combined finely ground granite and hollow glass spheres in each of these mixtures is about 0.74, and the resulting mixtures have the following percentages by volume of the total solids of inorganic aggregate, respectively: 88.5%, 85.3%, 82.3%, 79.6%, 77.0%, and 74.5%.

Decreasing the amount of aggregate increases the effective amounts of organic binder and fibers. Including more aggregate yields articles which have greater stiffness, are more brittle, and have greater compressive strength. Increasing the amount of fiber and organic binder yields articles which have greater flexibility, toughness, and tensile strength.

EXAMPLES 43–47

Highly inorganically filled articles were prepared from moldable mixtures that include the following components:

| Example | $CaCO_3$ | Fiber | Tylose ® | Water | Glass Spheres |
|---|---|---|---|---|---|
| 43 | 1.0 kg | 0.2 kg | 0.1 kg | 2.1 kg | 0.0 kg |
| 44 | 1.0 kg | 0.2 kg | 0.1 kg | 2.1 kg | 0.5 kg |
| 45 | 1.0 kg | 0.2 kg | 0.1 kg | 2.1 kg | 1.0 kg |
| 46 | 1.0 kg | 0.2 kg | 0.1 kg | 2.1 kg | 1.5 kg |
| 47 | 1.0 kg | 0.2 kg | 0.1 kg | 2.1 kg | 2.0 kg |

The fiber that was used in each of these examples is southern pine. The water, Tylose® FL 15002, and fibers were first mixed for 10 minutes in a Hobart kneader-mixer. Thereafter, the calcium carbonate and hollow glass spheres were added to the mixture, which was mixed for an additional 6 minutes under low shear. The particle packing density of the combined calcium carbonate and hollow glass spheres in each of these mixtures was about 0.73, and the resulting mixtures had the following percentages by volume of the total solids of inorganic aggregate, respectively: 62.8%, 88.5%, 93.2%, 95.2%, and 96.6%. The densities (expressed as g/cm$^3$) of the resulting articles were 2.0, 0.87, 0.66, 0.57, and 0.52, respectively.

The moldable mixtures were extruded using a de-airing auger extruder through a 30 cm×0.6 cm die to form continuous sheets having corresponding dimensions of width and thickness. The extruded sheets were then passed between a pair of reduction rollers having a gap distance therebetween corresponding to the thickness of the sheets formed. The sheet was then pressed between a male die and a female die to form a bowl. Because calcium carbonate and glass spheres each have a low specific surface area these mixtures had a low adhesiveness to the rollers and dies. The sheets formed in these examples had thicknesses of 0.5 mm, 0.8 mm, 1.0 mm, and 1.2 mm.

Alternatively, the mixtures were extruded into a variety of articles, including bars, cylindrical rods, pipes, hollow bars, multi-cell structures, and the like. The extruded articles were form stable immediately or very shortly after being extruded.

EXAMPLES 48–52

Flexible, cushioning articles are formed from inorganically filled mixtures containing 2.0 kg water, 0.1 kg Tylose® Fl, 15002, and 2% abaca fibers by volume of the mixture, along with the following quantities of plastic spheres:

| Example | Plastic Spheres |
|---------|-----------------|
| 48 | 1.12 kg |
| 49 | 0.9213 kg |
| 50 | 0.7225 kg |
| 51 | 0.5238 kg |
| 52 | 0.3251 kg |

The "plastic spheres" are made from polypropylene and have average particle sizes less than 100 microns and an average density of 0.02 g/cm$^3$. The inorganically filled mixtures are made by first mixing together the water, Tylose®, and fibers under high shear conditions for 5 minutes and then mixing the plastic spheres into the mixture under low shear conditions. The resulting inorganically filled mixture is extruded through a die and then passed between a pair of rollers to form sheets that are 5 mm thick. The sheets are then pressed, while in a wet condition, between a male die and a female die to form a bowl-shaped packaging container. The inorganically filled articles are very flexible and relatively strong in comparison to similar materials made from polystyrene.

Alternatively, the mixtures were extruded into a variety of articles, including bars, cylindrical rods, pipes, hollow bars, multi-cell structures, and the like. The extruded articles were form stable immediately or very shortly after being extruded. These packaging materials can be physically compressed without crumbling, even when subjected to forces that are greater than forces normally experienced by polystyrene materials.

EXAMPLES 53–56

Flexible inorganically filled articles are made according to Examples 48–52, except that the amount of abaca fibers in the inorganically filled mixture are increased to the following amounts, as measured by volume percent:

| Example | Abaca Fiber |
|---------|-------------|
| 53 | 4% |
| 54 | 6% |
| 55 | 8% |
| 56 | 10% |

The resulting inorganically filled articles made therefrom have substantially the same densities and flexibilities as those in Examples 48–52, but with increasing tensile strengths as the amount of abaca fiber is increased.

EXAMPLE 57

Using any of the foregoing compositions, the inorganically filled mixture is pressed or molded into the shape of a carton. Depending on the composition, the carton will exhibit high strength, durability, flexibility, low weight, and/or low density.

EXAMPLE 58

Using any of the foregoing compositions, the inorganically filled mixture is molded into the shape of a crate. This can be carried out by extruding a multi-cell structure or corrugated sheet, or by molding any other appropriate structure of adequate strength. Depending on the composition, the crate will exhibit high strength, durability, flexibility, low weight, and/or low density.

EXAMPLE 59

Using any of the foregoing compositions, the inorganically filled mixture is molded or pressed into the shape of a lid. Depending on the composition, the lid will exhibit high strength, durability, flexibility, low weight, and/or low density.

EXAMPLE 60

Using any of the foregoing compositions, the inorganically filled mixture is molded into the shape of a partition. Depending on the composition, the partition will exhibit high strength, durability, flexibility, low weight, and/or low density.

EXAMPLE 61

Using any of the foregoing compositions, the inorganically filled mixture is molded into the shape of a liner. Depending on the composition, the liner will exhibit high strength, durability, flexibility, low weight, and/or low density.

EXAMPLE 62

Using any of the foregoing compositions, the inorganically filled mixture is molded into the shape of a box. This may be carried out by extrusion, and/or calendering, and/or score cutting, and/or folding. Depending on the composition, the box will exhibit high strength, durability, flexibility, low weight, and/or low density.

EXAMPLE 63

Using any of the foregoing compositions, the inorganically filled mixture is blow molded into the shape of a bottle. Depending on the composition, the bottle will exhibit high strength, durability, flexibility, low weight, and/or low density.

EXAMPLE 64

Using any of the foregoing compositions, the inorganically filled mixture is molded into the shape of a utensil. Depending on the composition, the utensil will exhibit high strength, durability, flexibility, low weight, and/or low density.

VI. Summary.

From the foregoing, it will be appreciated that the present invention provides improved compositions, methods, and systems for manufacturing inorganically filled articles that can be formed into a variety of objects presently formed from paper, cardboard, polystyrene, metal, glass, or plastic.

The present invention also provides compositions, methods, and systems which yield inorganically filled articles which have properties similar to those of paper, paperboard, polystyrene, metal, glass, and plastic. Such compositions can be formed into a variety of containers and other objects using the same or similar manufacturing apparatus and techniques as those presently used to form such objects from paper, paperboard, polystyrene, metal, glass, or plastic.

The present invention further provides compositions, methods, and systems for manufacturing inorganically filled articles which do not result in the generation of wastes involved in the manufacture of paper, paperboard, plastic, metal, glass, or polystyrene materials.

The present invention further provides compositions which contain less water to be removed during the manufacturing process (as compared to paper manufacturing) in order to shorten the processing time and reduce the initial equipment capital investment. Further, the articles are readily degradable into substances which are nontoxic and are commonly found in the earth.

In addition, the present invention provides compositions, methods, and systems which make possible the manufacture of sheets, containers, and other objects at a cost comparable to, and even superior to, existing methods of manufacturing paper or polystyrene products.

The present invention also provides methods and systems of manufacture which are less energy intensive, conserve valuable natural resources, and require lower initial capital investments compared to those used in making articles from existing materials.

Additionally, the present invention provides compositions, methods, and systems for mass producing inorganically filled articles which can rapidly be formed and substantially dried within a matter of minutes from the beginning of the manufacturing process.

Finally, the compositions and methods allow for the production of highly inorganically filled materials having greater flexibility, tensile strength, toughness, moldability, and mass-producibility compared to materials having a high content of inorganic filler.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An inorganically filled composition comprising:
   water having a concentration in a range from about 10% to about 80% by weight of the inorganically filled composition;
   a water-dispersible organic binder selected from the group consisting of polysaccharides, proteins, water-soluble polymers, derivatives of the foregoing, and mixtures of the foregoing, the organic binder having a concentration in a range from about 5% to about 80% by weight of total solids in the inorganically filled composition;
   an inorganic aggregate having a concentration in a range from about 20% to about 95% by weight of total solids in the inorganically filled composition; and
   a fibrous material substantially uniformly dispersed throughout the inorganically filled composition,
   wherein the inorganically filled composition and the binder are substantially unfoamed.

2. An inorganically filled composition as defined in claim 1, wherein the inorganic aggregate has a concentration in a range from about 30% to about 80% by weight of total solids in the inorganically filled composition.

3. An inorganically filled composition as defined in claim 1, wherein the inorganic aggregate has a concentration in a range from about 40% to about 70% by weight of total solids in the inorganically filled composition.

4. An inorganically filled composition as defined in claim 1, wherein the inorganic aggregate comprises individual particles that are size optimized in order to achieve a predetermined particle packing density of the inorganic aggregate.

5. An inorganically filled composition as defined in claim 4, wherein the particle packing density of the inorganic aggregate is in a range from about 0.65 to about 0.99.

6. An inorganically filled composition as defined in claim 4, wherein the particle packing density of the inorganic aggregate is in a range from about 0.75 to about 0.9.

7. An inorganically filled composition as defined in claim 1, wherein the inorganic aggregate is selected from the group consisting of perlite, vermiculite, hollow glass spheres, porous ceramic spheres, expanded clay, lightweight expanded geologic materials, pumice, microspheres, and mixtures thereof.

8. An inorganically filled composition as defined in claim 1, wherein the inorganic aggregate is selected from the group consisting of clay, gypsum, calcium carbonate, mica, silica, alumina, metals, sand, gravel, sandstone, limestone, hydrated hydraulic cement particles, and mixtures thereof.

9. An inorganically filled composition as defined in claim 1, wherein the inorganically filled matrix further includes an organic aggregate selected from the group consisting of seeds, starches, gelatins, polymers, cork, agar materials, and mixtures of the foregoing.

10. An inorganically filled composition as defined in claim 1, wherein the inorganic aggregate includes a hydraulically settable material.

11. An inorganically filled composition as defined in claim 10, wherein the hydraulically settable material comprises a portland cement.

12. An inorganically filled composition as defined in claim 10, wherein the hydraulically settable material is selected from the group consisting of calcium sulfate hemihydrate and calcium oxide.

13. An inorganically filled composition as defined in claim 1, wherein the water has a concentration in a range from about 25% to about 70% by weight of the inorganically filled composition.

14. An inorganically filled composition as defined in claim 1, wherein the water has a concentration in a range from about 40% to about 60% by weight of the inorganically filled composition.

15. An inorganically filled composition as defined in claim 1, wherein the inorganically filled composition has a yield stress in a range between about 2 kPa to about 5 MPa.

16. An inorganically filled composition as defined in claim 1, wherein the inorganically filled composition has a yield stress in a range between about 100 kPa to about 1 MPa.

17. An inorganically filled composition as defined in claim 1, wherein the inorganically filled composition has a yield stress in a range between about 200 kPa to about 700 kPa.

18. An inorganically filled composition as defined in claim 1, wherein the inorganically filled composition has a yield stress such that the composition can be molded into a desired article and maintain its shape without external support.

19. An inorganically filled composition as defined in claim 1, wherein the fibrous material has a concentration in a range from about 0.5% to about 60% by volume of total solids in the inorganically filled composition.

20. An inorganically filled composition as defined in claim 1, wherein the fibrous material has a concentration in a range from about 2% to about 40% by volume of total solids in the inorganically filled composition.

21. An inorganically filled composition as defined in claim 1, wherein the fibrous material has a concentration in a range from about 5% to about 20% by volume of total solids in the inorganically filled composition.

22. An inorganically filled composition as defined in claim 1, wherein the fibrous material includes organic fibers selected from the group consisting of hemp, cotton, bagasse, abaca, flax, southern pine, southern hardwood fibers, and mixtures thereof.

23. An inorganically filled composition as defined in claim 1, wherein the fibrous material includes inorganic fibers selected from the group consisting of glass, silica, ceramic, graphite, metal fibers, and mixtures thereof.

24. An inorganically filled composition as defined in claim 1, wherein the fibrous material includes individual fibers having an average aspect ratio of at least about 10:1.

25. An inorganically filled composition as defined in claim 1, wherein the fibrous material includes individual fibers having an average aspect ratio of at least about 100:1.

26. An inorganically filled composition as defined in claim 1, wherein the fibrous material includes individual fibers having an average aspect ratio of at least about 200:1.

27. An inorganically filled composition as defined in claim 1, wherein the water-dispersible organic binder has a concentration in a range from about 20% to about 70% by weight of total solids in the inorganically filled composition.

28. An inorganically filled composition as defined in claim 1, wherein the water-dispersible organic binder has a concentration in a range from about 30% to about 60% by weight of total solids in the inorganically filled composition.

29. An inorganically filled composition as defined in claim 1, wherein the water-dispersible organic binder comprises a cellulosic ether.

30. An inorganically filled composition as defined in claim 29, wherein the cellulosic ether is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

31. An inorganically filled composition as defined in claim 1, wherein the water-dispersible organic binder comprises at least one starch-based material selected from the group consisting of starch and starch derivatives.

32. An inorganically filled composition as defined in claim 31, wherein the starch-based material is selected from the group consisting of amylopectin, amylose, seagel, starch acetates, starch hydroxyethyl ethers, ionic starches, long-chain alkylstarches, dextrins, amine starches, phosphate starches, dialdehyde starches, and mixtures or derivatives thereof.

33. An inorganically filled composition as defined in claim 31, wherein the starch-based material is selected from the group consisting of ungelatinized starch granules, gelatinized starch, modified starch, and mixtures thereof.

34. An inorganically filled composition as defined in claim 1, wherein the water-dispersible organic binder comprises at least one protein-based material selected from the group consisting of protein and protein derivatives.

35. An inorganically filled composition as defined in claim 34, wherein the protein-based material is selected from the group consisting of prolamine, collagen, gelatin, glue, casein, and mixtures or derivatives thereof.

36. An inorganically filled composition as defined in claim 1, wherein the water-dispersible organic binder comprises a polysaccharide gum selected from the group consisting of alginic acid, phycocolloids, agar, gum arabic, guar gum, locust bean gum, gum karaya, gum tragacanth, and mixtures thereof.

37. An inorganically filled composition as defined in claim 1, wherein the water-dispersible organic binder comprises a synthetic organic water-soluble polymer selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, derivatives of the foregoing, and mixtures of the foregoing.

38. An inorganically filled composition as defined in claim 1, further including a dispersant.

39. An inorganically filled composition as defined in claim 1, further including a latex.

40. An inorganically filled composition as defined in claim 1, wherein the composition has a rheology that allows it to be molded by at least one process selected from the group consisting of blow molding, jiggering, die press molding, injection molding, extrusion, rolling, wet sheet molding, and vacuum forming.

41. An inorganically filled composition comprising:
water having a concentration in a range from about 5% to about 50% by volume of the inorganically filled mixture;
a fibrous material substantially homogeneously dispersed throughout the inorganically filled composition;
a water-dispersible organic binder selected from the group consisting of polysaccharides, proteins, water-soluble polymers, derivatives of the foregoing, and mixtures of the foregoing; and
an inorganic aggregate having a concentration in a range from about 30% to about 98% by volume of total solids in the inorganically filled composition,
wherein the inorganically filled composition and the binder are substantially unfoamed.

42. An inorganically filled composition as defined in claim 41, wherein the inorganic aggregate has a concentration in a range from about 50% to about 90% by volume of total solids in the inorganically filled composition.

43. An inorganically filled composition as defined in claim 41, wherein the inorganic aggregate has a concentration in a range from about 60% to about 80% by volume of total solids in the inorganically filled composition.

44. An inorganically filled composition as defined in claim 41, wherein the water and organic binder are mixed together in proportions such that the water cannot be removed by drainage in a liquid state from the inorganically filled composition.

45. An inorganically filled composition as defined in claim 41, wherein the inorganically filled composition and articles manufactured therefrom are readily degradable into natural components commonly found in the earth.

46. An inorganically filled composition comprising:
water and a water-dispersible organic binder mixed together in proportions such that the water cannot be removed by drainage in a liquid state from the inorganically filled composition and so that the inorganically filled composition has a yield stress in a range from about 2 kPa to about 5 MPa;
a fibrous material substantially uniformly dispersed throughout the inorganically filled composition; and
an inorganic aggregate having a concentration in a range from about 30% to about 98% by volume of total solids in the inorganically filled composition.

47. An inorganically filled composition comprising:
water and a water-dispersible organic binder mixed together in proportions such that the water cannot be removed by drainage in a liquid state from the inorganically filled composition;
an inorganic aggregate having a concentration in a range from about 20% to about 95% by weight of total solids in the inorganically filled composition; and a fibrous material substantially uniformly dispersed throughout the inorganically filled composition and having a concentration in a range from about 0.5% to about 60% by volume of total solids in the inorganically filled composition, wherein the inorganically filled composition and the binder are substantially unfoamed.

48. An inorganically filled composition comprising:

a water-dispersible organic binder selected from the group consisting of polysaccharides, proteins, water-soluble polymers, derivatives of the foregoing, and mixtures of the foregoing, the organic binder having a concentration greater than about 5% by weight of total solids in the inorganically filled composition;

an inorganic aggregate having a concentration greater than about 20% by weight of total solids in the inorganically filled composition; and a fibrous material substantially uniformly dispersed throughout the inorganically filled composition and having a concentration in a range from about 0.5% to about 60% by volume of total solids in the inorganically filled composition; and water in an amount in order that the inorganically filled composition has a yield stress in a range from about 2 kPa to about 5 MPa.

* * * * *

UNITED STATES PATENT AND TRADEMARK OFFICE
CERTIFICATE OF CORRECTION

PATENT NO.   : 6,090,195
DATED        : July 18, 2000
INVENTOR(S)  : Per Just Anderson; Simon K. Hodson It is certified that error appears in the above-identified patent and that said Letters Patent is hereby corrected as shown below:

Column 13,
Line 16, after "will" delete [is]

Column 20,
Line 15, after "be" change "effected" to -- affected --

Column 30,
Line 12, before "able" change "arc" to -- are --

Column 31,
Line 10, before "superplasticizer"" insert -- " --
Lines 37-38, after "Both" change "Mearicrete" to -- Mearlcrete --
Line 38, after "and" change "Mearicel" to -- Mearlcel --

Column 32,
Line 55, before "equilibrium" delete [to]

Column 45,
Line 33, before "Thinner" change "4)" to -- 3) --
Line 34, before "Higher" change "5)" to -- 4) --
Line 36, before "Air speed" change "6)" to -- 5) --
Line 61, before "the" change "bum" to -- burn --

Column 47,
Line 1, before "article" insert -- an --

Column 52,
Line 35, after "FIGS." change "1 OA-F" to -- 10 A-F --

UNITED STATES PATENT AND TRADEMARK OFFICE
CERTIFICATE OF CORRECTION

PATENT NO.   : 6,090,195
DATED        : July 18, 2000
INVENTOR(S)  : Per Just Anderson; Simon K. Hodson It is certified that error appears in the above-identified patent and that said Letters Patent is hereby corrected as shown below:

Column 56,
Line 39, after "speed" change "v," to -- $v_1$ --

Column 59,
Line 59, before "vacuum" change "Plug assist" to -- Plug-assist --

Column 62,
Line 54, change "Fl 15002" to -- FL 15002 --

Column 66,
Line 66, change "Fl 15002" to -- FL 15002 --

Signed and Sealed this

Twenty-fifth Day of December, 2001

Attest:

JAMES E. ROGAN
*Attesting Officer*     *Director of the United States Patent and Trademark Office*